(12) United States Patent
Lester et al.

(10) Patent No.: US 12,037,154 B2
(45) Date of Patent: Jul. 16, 2024

(54) METHOD OF PERFORMING A TASK IN REGISTRATION WITH A SEAL IN MATERIALS AND FLEXIBLE CONTAINERS MADE BY METHOD

(71) Applicant: The Procter & Gamble Company, Cincinnati, OH (US)

(72) Inventors: Joseph Craig Lester, Liberty Township, OH (US); Michael Paul Hausfeld, Sharonville, OH (US); Mark Mason Hargett, Liberty Township, OH (US); Marc Richard Bourgeois, Liberty Township, OH (US); Benjamin Jacob Clare, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 249 days.

(21) Appl. No.: 17/352,604

(22) Filed: Jun. 21, 2021

(65) Prior Publication Data
US 2021/0309403 A1    Oct. 7, 2021

Related U.S. Application Data

(62) Division of application No. 15/980,937, filed on May 16, 2018, now abandoned.

(51) Int. Cl.
*B65B 61/02*    (2006.01)
*B29D 22/00*    (2006.01)
(Continued)

(52) U.S. Cl.
CPC ............ *B65B 61/02* (2013.01); *B29D 22/003* (2013.01); *B65B 43/26* (2013.01); *B65B 51/10* (2013.01);
(Continued)

(58) Field of Classification Search
CPC ..... B65B 61/02; B65B 61/005; B65B 61/025; B65B 41/18; B65B 43/26; B65B 51/10;
(Continued)

(56) References Cited

U.S. PATENT DOCUMENTS 2,898,717 A    8/1959  Nicoli
3,774,016 A *  11/1973 Sterns .................. B23D 36/005
                                            700/51
(Continued)

FOREIGN PATENT DOCUMENTS

CN          1640777       7/2005
CN        102046391 A     5/2011
(Continued)

OTHER PUBLICATIONS

All Office Actions; U.S. Appl. No. 15/980,937.
(Continued)

*Primary Examiner* — Joshua G Kotis
*Assistant Examiner* — Scott A Howell
(74) *Attorney, Agent, or Firm* — Kathleen Y. Carter

(57) ABSTRACT

A method for performing a task in registration with a discrete seal in at least one material is described herein. The method involves simultaneously forming a discrete seal and a fiducial/eye mark in the at least one material. The method includes providing a detection device; providing a unit operation mechanism; and performing an operation on the material(s) in registration with the discrete seal. The task performed in registration with the discrete seal is based upon the location of the eye mark that was simultaneously formed with the discrete seal. A method of making flexible containers using cutting to form the outer periphery of the packages is described herein. Also described herein are flexible containers and container blanks made by such a method.

5 Claims, 22 Drawing Sheets

(51) Int. Cl.
*B29K 101/12* (2006.01)
*B65B 43/26* (2006.01)
*B65B 51/10* (2006.01)
*B65B 57/00* (2006.01)
*B65B 61/00* (2006.01)

(52) U.S. Cl.
CPC ............ *B65B 57/00* (2013.01); *B65B 61/005* (2013.01); *B29K 2101/12* (2013.01)

(58) Field of Classification Search
CPC .... B65B 57/00; B29K 2101/12; B29D 22/003
See application file for complete search history.

(56) References Cited

U.S. PATENT DOCUMENTS

| | | | |
|---|---|---|---|
| 3,975,885 A | 8/1976 | Carlisle | |
| 4,018,029 A * | 4/1977 | Safranski | B65B 61/26 53/131.5 |
| 4,044,867 A | 8/1977 | Fisher | |
| 4,949,530 A | 8/1990 | Pharo | |
| 5,137,154 A | 8/1992 | Cohen | |
| 5,140,801 A | 8/1992 | Wild | |
| 5,170,609 A | 12/1992 | Bullock et al. | |
| 5,782,733 A | 7/1998 | Yeager | |
| 5,960,975 A | 10/1999 | Lennartsson | |
| 6,088,994 A * | 7/2000 | Nakagawa | B29C 66/4312 53/374.6 |
| 6,244,466 B1 | 6/2001 | Naslund | |
| 6,520,491 B2 | 2/2003 | Timlick | |
| 6,758,737 B2 | 7/2004 | Svensson | |
| 6,834,480 B1 * | 12/2004 | Ishino | B65B 61/28 53/551 |
| 7,207,717 B2 | 4/2007 | Steele | |
| 7,584,593 B2 | 9/2009 | Murray | |
| 7,823,796 B2 | 11/2010 | Schaedel | |
| 8,181,428 B2 | 5/2012 | Gustafsson | |
| 8,240,533 B2 | 8/2012 | Wetsch | |
| 8,540,094 B2 | 9/2013 | Riedl | |
| 8,661,772 B2 | 3/2014 | Yasuhira | |
| 8,662,751 B2 | 3/2014 | Forss | |
| 9,139,317 B2 | 9/2015 | Gess | |
| 9,327,867 B2 | 5/2016 | Stanley et al. | |
| 9,334,074 B2 * | 5/2016 | Spix | B65B 61/065 |
| 9,586,744 B2 | 3/2017 | Arent et al. | |
| 9,694,942 B2 | 7/2017 | Stanley et al. | |
| 9,731,889 B2 | 8/2017 | Stanley et al. | |
| 9,988,190 B2 | 6/2018 | Berg, Jr. | |
| 10,000,303 B2 | 6/2018 | Malcolm | |
| 10,513,078 B2 | 12/2019 | Rabiea | |
| 2003/0094394 A1 | 5/2003 | Anderson et al. | |
| 2004/0035865 A1 | 2/2004 | Rosen | |
| 2004/0252914 A1 * | 12/2004 | Hsiang | B65D 33/14 383/63 |
| 2005/0126941 A1 | 6/2005 | Ferri et al. | |
| 2005/0133941 A1 | 6/2005 | Schuhmacher | |
| 2006/0030471 A1 | 2/2006 | Schaller et al. | |
| 2007/0092164 A1 | 4/2007 | Yasuhira | |
| 2008/0193263 A1 | 8/2008 | Wetsch | |
| 2010/0111453 A1 * | 5/2010 | Dierl | B65D 75/5838 53/484 |
| 2010/0308062 A1 | 12/2010 | Helou, Jr. | |
| 2011/0079608 A1 * | 4/2011 | Mamiye | B65D 81/3261 383/41 |
| 2012/0097634 A1 | 4/2012 | Riedl | |
| 2012/0195526 A1 * | 8/2012 | Moehlenbrock | B65B 51/02 383/42 |
| 2013/0025243 A1 * | 1/2013 | Spix | B65B 57/02 83/13 |
| 2013/0292287 A1 | 11/2013 | Stanley et al. | |
| 2013/0292353 A1 | 11/2013 | Stanley et al. | |
| 2013/0292395 A1 | 11/2013 | Stanley et al. | |
| 2013/0292413 A1 | 11/2013 | Stanley et al. | |
| 2013/0292415 A1 | 11/2013 | Stanley et al. | |
| 2013/0294711 A1 | 11/2013 | Stanley et al. | |
| 2013/0337244 A1 | 12/2013 | Stanley et al. | |
| 2014/0033654 A1 | 2/2014 | Stanley et al. | |
| 2014/0033655 A1 | 2/2014 | Stanley et al. | |
| 2014/0250834 A1 * | 9/2014 | Yoshikane | B65B 3/04 141/4 |
| 2015/0033671 A1 | 2/2015 | Stanley et al. | |
| 2015/0034670 A1 | 2/2015 | Stanley et al. | |
| 2015/0036950 A1 | 2/2015 | Stanley et al. | |
| 2015/0121810 A1 | 5/2015 | Bourgeois et al. | |
| 2015/0122373 A1 | 5/2015 | Bourgeois et al. | |
| 2015/0122840 A1 | 5/2015 | Cox et al. | |
| 2015/0122841 A1 | 5/2015 | McGuire et al. | |
| 2015/0122842 A1 | 5/2015 | Berg, Jr. et al. | |
| 2015/0122846 A1 | 5/2015 | Stanley et al. | |
| 2015/0125099 A1 | 5/2015 | Ishihara et al. | |
| 2015/0125574 A1 | 5/2015 | Arent et al. | |
| 2015/0126349 A1 | 5/2015 | Ishihara et al. | |
| 2016/0128874 A1 | 5/2016 | Schneider et al. | |
| 2016/0176578 A1 | 6/2016 | Stanley et al. | |
| 2016/0176582 A1 | 6/2016 | McGuire et al. | |
| 2016/0176583 A1 | 6/2016 | Ishihara et al. | |
| 2016/0176584 A1 | 6/2016 | Ishihara et al. | |
| 2016/0176597 A1 | 6/2016 | Ishihara et al. | |
| 2016/0221727 A1 | 8/2016 | Stanley et al. | |
| 2016/0297569 A1 | 10/2016 | Berg, Jr. et al. | |
| 2016/0297589 A1 | 10/2016 | You et al. | |
| 2016/0297590 A1 | 10/2016 | You et al. | |
| 2016/0297591 A1 | 10/2016 | You et al. | |
| 2016/0325518 A1 | 11/2016 | Ishihara et al. | |
| 2016/0354254 A1 | 12/2016 | Eimann et al. | |
| 2016/0362228 A1 | 12/2016 | McGuire et al. | |
| 2017/0001782 A1 | 1/2017 | Arent et al. | |
| 2017/0080634 A1 | 3/2017 | Honegger | |
| 2017/0095968 A1 * | 4/2017 | Rabiea | B31B 70/988 |
| 2017/0233116 A1 | 8/2017 | Stanley et al. | |
| 2017/0266056 A1 | 9/2017 | Eimann et al. | |
| 2017/0266057 A1 | 9/2017 | Eimann et al. | |
| 2017/0266941 A1 | 9/2017 | Eimann et al. | |
| 2017/0305609 A1 | 10/2017 | McGuire et al. | |
| 2017/0305627 A1 | 10/2017 | Arent et al. | |
| 2018/0050570 A1 * | 2/2018 | Beliveau | B31B 70/005 |
| 2018/0079574 A1 | 3/2018 | Ishihara et al. | |
| 2018/0236741 A1 | 8/2018 | Hargett et al. | |
| 2018/0237172 A1 | 8/2018 | Lester et al. | |
| 2018/0257836 A1 | 9/2018 | McGuire et al. | |
| 2018/0297725 A1 | 10/2018 | Bourgeois et al. | |
| 2018/0312283 A1 | 11/2018 | Bourgeois et al. | |
| 2018/0312286 A1 | 11/2018 | Lester et al. | |
| 2018/0361605 A1 * | 12/2018 | Mossberg | B26D 5/36 |
| 2019/0352033 A1 | 11/2019 | Lester et al. | |

FOREIGN PATENT DOCUMENTS

| | | | |
|---|---|---|---|
| CN | 102483810 A | 5/2012 | |
| CN | 102656017 A | 9/2012 | |
| CN | 102939058 A | 2/2013 | |
| CN | 103387069 A | 11/2013 | |
| CN | 107406184 A | 11/2017 | |
| DE | 102005002301 | 2/2006 | |
| EP | 2631195 A1 | 8/2013 | |
| GB | 2032343 A * | 5/1980 | B29C 59/02 |
| GB | 2032343 A | 5/1980 | |
| JP | AH107159 | 1/1998 | |
| JP | 2005343492 | 12/2005 | |
| JP | 2006027697 | 2/2006 | |
| JP | 2006240651 | 9/2006 | |
| JP | 2009184690 | 8/2009 | |
| JP | 4639677 | 2/2011 | |
| JP | 2012025394 | 2/2012 | |
| RU | 2038815 | 7/1995 | |
| WO | 1996001775 | 1/1996 | |
| WO | 2005063589 | 7/2005 | |
| WO | 2008064508 | 6/2008 | |

(56) References Cited

FOREIGN PATENT DOCUMENTS

WO    2012073004    6/2012
WO    2013124201    8/2013

OTHER PUBLICATIONS

Campbell, Phillip John, "The Rigidified Standing Pouch—A Concept For Flexible Packaging", A Thesis Written In Partial Fulfillment Of The Requirements For The Degree Of Master Of Industrial Design, North Carolina State University School Of Design Raleigh, 1993, pp. 1-35.

Extended European Search Report and Search Opinion; Application No. 19173767.5; dated Sep. 26, 2019; 7 pages.

* cited by examiner

METHOD OF PERFORMING A TASK IN REGISTRATION WITH A SEAL IN MATERIALS AND FLEXIBLE CONTAINERS MADE BY METHOD

FIELD OF THE INVENTION

A method for performing a task in registration with a discrete seal in at least one material is described herein. The method may comprise one or more steps in a process of making flexible containers. Also described herein are flexible containers and container blanks made by such a method.

BACKGROUND OF THE INVENTION

One conventional type of container for fluent products is a rigid container made from solid material(s). Examples of conventional rigid containers include molded plastic bottles, glass jars, metal cans, cardboard boxes, etc. These conventional rigid containers are well-known and generally useful; however their designs present several notable difficulties.

For instance, some conventional rigid containers for fluent products can be expensive to make. Often rigid plastic containers are made by molding (e.g., blow molding) processes. Such processes are subject to a number of disadvantages. Such processes are typically energy intensive processes. Such processes can also require complex equipment. In addition, changing the size and/or shape of a container can be time consuming and expensive.

Flexible containers have been developed to address the disadvantages associated with rigid containers. Flexible containers include stand up pouches such as those for containing snacks and the like. Patent publications disclosing new types of flexible containers and methods of making the same include: the following U.S. Patents and Publications: U.S. Pat. No. 9,731,889 B2; US 2013/0292353 A1; US 2013/0292415 A1; US 2014/0033654 A1; US 2015/0121810 A1; US 2015/0122840 A1; US 2015/0125099 A1; US 2015/0126349 A1; US 2016/0325518 A1; US 2017/0001782 A1; and US 2017/0305609 A1 (The Procter & Gamble Flexible Inflatable Container patent publications).

Processes which involve the need for precisely cutting relative to a seal through materials having a discrete seal therebetween include processes of making flexible containers. In a manufacturing operation (which may, but need not be a high speed process), such flexible containers may be made in the form of adjacent container blanks that are formed in a continuous web of material. The container blanks will need to be singulated (that is, the individual containers will need to be cut out of a web of joined flexible container blanks) in such processes. In some cases, the adjacent container blanks may share an elongated seal therebetween, which seal will be cut along its width (e.g., divided into two portions) to form a portion of a peripheral seal for each container. In other cases, such as when the container blanks have shaped edges that are not nested, the cutting may remove a piece of trim between adjacent container blanks. The cut through the seal between adjacent container blanks must be precisely placed so that the containers will be properly sealed, and will not leak. It is also desirable for the width of the seal for each container to be as small as possible, and for the seal on the containers to have a soft edge for handing by a user.

The cutting mechanism needs to be provided with the exact location to make the cut. There are a number of problems in attempting to precisely locate the cuts through the flexible materials that will form such containers. There can be variability in the size of the containers, such that evenly spacing cuts will not result in the cuts being made in the proper locations. The artwork on the container is typically not suitable for use as a reference by a vision system since the artwork may not necessarily be located in the exact location that it should be. A vision system typically cannot use the location of the seal in order to determine where to cut, particularly when the seal does not provide a well-defined visible element that can be accurately read by the vision system. Vision systems typically need a feature with a crisp (or visually sharp) edge in order to properly locate the feature.

Thus, there is a need for a method for precisely cutting relative to a seal through materials having a discrete seal therebetween and/or performing other tasks in registration with a seal in flexible and other materials.

SUMMARY OF THE INVENTION

A method for performing a task in registration with a seal in at least one material having a discrete seal therein is provided. The method may comprise precisely locating a seal and performing a second operation on the material(s) relative to the seal in the material(s). In certain cases, the second operation may comprise a step of precisely cutting relative to a seal through materials having a discrete seal therebetween. The method may comprise one or more steps in a process of making flexible containers. Also described herein are flexible containers and container blanks made by such a method.

In one embodiment, a method for performing a task in registration with a seal in at least one thermoplastic material having a discrete seal therein is provided. The thermoplastic material may be a flexible, semi-rigid, or rigid material, depending on the desired use of the method. The method may comprise the steps of:
  a. providing at least one thermoplastic material;
  b. providing a sealing mechanism;
  c. with said sealing mechanism, simultaneously forming:
    i. a discrete seal in said at least one thermoplastic material; and
    ii. an eye mark in said at least one thermoplastic material, wherein said eye mark has edges that are sufficiently well-defined so that they can be located with a detection device, wherein said eye mark is registered with said discrete seal;
  d. providing a detection device, and locating said eye mark with said detection device; and
  e. providing a unit operation mechanism;
  f. transmitting information relating to the location of the eye mark at least indirectly to said unit operation mechanism; and
  g. performing an operation on said at least one thermoplastic material relative to said seal at a location on said at least one thermoplastic material that is determined based upon the location of the eye mark, with said unit operation mechanism.

In certain cases, the method may comprise a step of precisely cutting relative to a seal through materials having a discrete seal therebetween. The method may comprise one or more steps in a process of making flexible containers.

Also described herein are flexible containers and container blanks made by such a method. In one embodiment, the flexible container blank comprises:
  a. a first layer of flexible thermoplastic material; and
  b. a second layer of flexible thermoplastic material joined to the first layer of flexible thermoplastic material, wherein the first layer and the second layer:
    are configured into a structure that defines a product volume therein;
    are sealed along at least a portion of their periphery by a discrete autogenous seal; and
at least one of the first and second layers has an eye mark formed therein that is sufficiently well-defined so that the eye mark can be located with a detection device, wherein the eye mark is registered with the discrete autogenous seal.

DETAILED DESCRIPTION OF THE INVENTION

Figure 1:
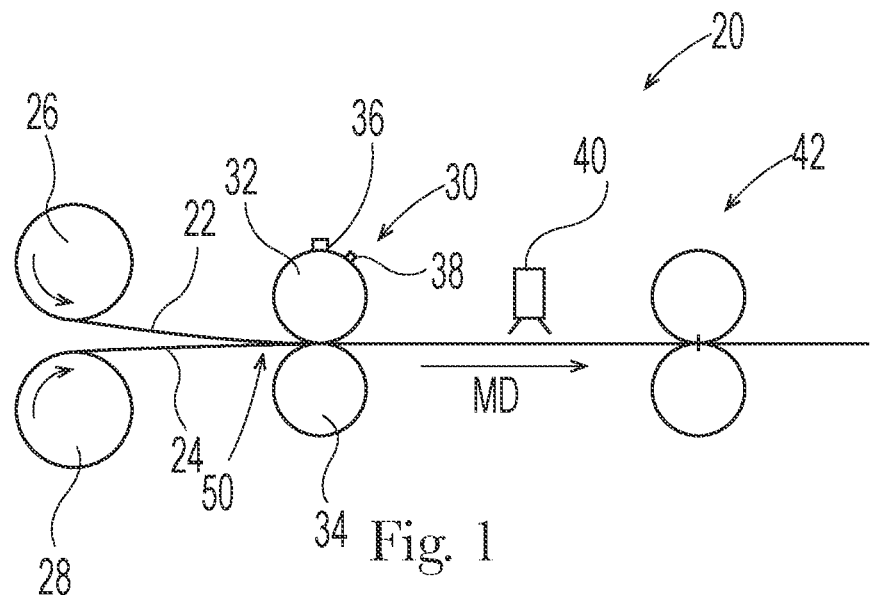
FIG. 1 is a schematic side view of a process and apparatus for performing a task in registration with a seal in at least one flexible material.

I. Introduction.

A method for performing a task in registration with a seal in at least one material having a discrete seal therein is provided. In certain cases, the method may comprise a step of precisely cutting relative to a seal through two or more materials or layers of material having a discrete seal therebetween. The method may comprise one or more of the steps in a process of making flexible containers. Also described herein are flexible containers and container blanks made by such a method.

Definitions

The term "about" when used herein with respect to a value, modifies a particular value, by referring to a range equal to the particular value, plus or minus twenty percent (+/−20%). The term "about" can also be used to modify a particular condition, by referring to a range of conditions that are within twenty percent (+/−20%) of the particular condition. For any of the embodiments of flexible containers, disclosed herein, any disclosure of a particular value or condition is also intended to be a disclosure of various alternative embodiments of that flexible container, with the value or condition being variable within the range of about (i.e. within 20%).

When the term "about" refers to the flatness of one or more flexible materials, the phrase "about flat" means that the flexible material fits between two parallel planes set apart by a separation distance that is equal to the average overall thickness of the material plus 5.0 millimeters.

The term "approximately" when used herein with respect to a value, modifies a particular value, by referring to a range equal to the particular value, plus or minus fifteen percent (+/−15%). The term "approximately" can also be used to modify a particular condition, by referring to a range of conditions that are within fifteen percent (+/−15%) of the particular condition. For any of the embodiments of flexible containers, disclosed herein, any disclosure of a particular value or condition is also intended to be a disclosure of various alternative embodiments of that flexible container, with the value or condition being variable within the range of approximately (i.e. within 15%).

When the term "approximately" refers to the flatness of one or more flexible materials, the phrase "approximately flat" means that the flexible material fits between two parallel planes set apart by a separation distance that is equal to the average overall thickness of the material plus 3.0 millimeters.

The term "at least partially separating" as used herein, refers to partially or completely separating a material at one or more locations within the material in any manner including, but not limited to, by any of the following operations: cutting; liquefying under tension; perforating; scoring; thinning; or, weakening.

The term "autogenous seal" as used herein, refers to a seal that is formed in a material, or between two or more materials that is formed of the material(s) themselves (rather than by applying a separate material such as an adhesive to the materials to form a seal in the same).

The terms "container" and "package" may be used herein interchangeably.

The term "cutting" as used herein, refers to cutting in any suitable manner including, but not limited to: hot knife, hot wire, ultrasonic, die cutting, water jet cutting (which may be programmable), and laser cutting.

The term "cutting relative to a seal" as used herein, may refer to any of the following: cutting through a seal; cutting at the edge of a seal; and cutting outside a seal.

The term "detection device" as used herein, refers to any type of device that is capable of locating the eye mark. The detection device can include, but is not limited to: a vision system, an electronic sensor, an ultrasonic sensor, and a photo eye. The detection device, depending on the type thereof, may detect eye marks in the form of shapes and/or changes in height of features on a material.

The term "discrete seal" as used herein, refers to a seal in a material, or between the face of two overlapping materials or components that has a configuration that is smaller in size than the material, or in the case of overlapping materials, smaller in size than the portion of such materials that overlap.

The terms "eye mark" and "fiducial" as used herein are interchangeable, and refer to marks or features on materials in manufacturing processes that are used as reference points (such as by detection devices). While the term "eye mark" is sometimes used to refer to printed fiducials, the terms eye mark and fiducials, as used herein, can refer to marks or features that are formed in any suitable matter. Suitable manners of forming eye marks or fiducials include, but are not limited to: printing; marking (including but not limited to by visible marks, and by ultra violet markers); forming the eye mark or fiducial using a sealing mechanism (that is, forming a seal using a process similar to that used to form the seal, but with a more well-defined edge); deforming; forming holes (such as pinholes, or the like). Thus, in some cases (such as when the eye mark is formed by a sealing mechanism), the eye mark may comprise a discrete melted and deformed feature in (or portion of) a web or piece of material.

The term "flexible container" as used herein, refers to a container with a product space, wherein one or more flexible materials form 50-100% of the overall surface area of the one or more materials that define the three-dimensional space of the product space. For any of the embodiments of flexible containers, disclosed herein, in various embodiments, the flexible container can be configured to have a product space, wherein one or more flexible materials form a particular percentage of the overall area of the one or more materials that define the three-dimensional space, and the particular percentage is any integer value for percentage between 50% and 100%, or within any range formed by any of these values, such as: 60-100%, or 70-100%, or 80-100%, or 90-100%, etc. One kind of flexible container is a film-based container, which is a flexible container made from one or more flexible materials, which include a film.

The term "flexible material" as used herein, when referring to a flexible container, refers to a thin, easily deformable, sheet-like material, having a flexibility factor within the range of 1,000-2,500,000 N/m. For any of the embodiments of flexible containers, disclosed herein, in various embodiments, any of the flexible materials can be configured to have a flexibility factor of 1,000-2,500,000 N/m, or any integer value for flexibility factor from 1,000-2,500,000 N/m, or within any range formed by any of these values, such as 1,000-1,500,000 N/m, 1,500-1,000,000 N/m, 2,500-800,000 N/m, 5,000-700,000 N/m, 10,000-600,000 N/m, 15,000-500,000 N/m, 20,000-400,000 N/m, 25,000-300,000 N/m, 30,000-200,000 N/m, 35,000-100,000 N/m, 40,000-90,000 N/m, or 45,000-85,000 N/m, etc. Throughout the present disclosure the terms "flexible material", "flexible sheet", "sheet", and "sheet-like material" are used interchangeably and are intended to have the same meaning. Examples of materials that can be flexible materials include one or more of any of the following: films (such as plastic films), elastomers, foamed sheets, foils, fabrics (including wovens and nonwovens), biosourced materials, and papers, in any configuration, as separate material(s), or as layer(s) of a laminate, or as part(s) of a composite material, in a microlayered or nanolayered structure, and in any combination, as described herein or as known in the art.

The term "flexibility factor" as used herein, when referring to a flexible container, refers to a material parameter for a thin, easily deformable, sheet-like material, wherein the parameter is measured in Newtons per meter, and the flexibility factor is equal to the product of the value for the Young's modulus of the material (measured in Pascals) and the value for the overall thickness of the material (measured in meters).

The terms "method" and "process" may be used interchangeably herein.

The term "nearly" when used herein with respect to a value, modifies a particular value, by referring to a range equal to the particular value, plus or minus five percent (+/−5%). The term "nearly" can also be used to modify a particular condition, by referring to a range of conditions that are within five percent (+/−5%) of the particular condition. For any of the embodiments of flexible containers, disclosed herein, any disclosure of a particular value or condition is also intended to be a disclosure of various alternative embodiments of that flexible container, with the value or condition being variable within the range of nearly (i.e. within 5%).

When the term "nearly" refers to the flatness of one or more flexible materials, the phrase "nearly flat" means that the flexible material fits between two parallel planes set apart by a separation distance that is equal to the average overall thickness of the material plus 1.0 millimeter.

The term "plurality", as used herein, means more than one.

The term "sealing mechanism" as used herein, refers to any type of device that is capable of forming an autogenous seal in one or more materials. The sealing mechanism can comprise a heat sealing mechanism, a pressure sealing mechanism, and combinations thereof (heat and pressure mechanisms). The sealing mechanism may be in the form of platens or rolls with projections thereon.

The term "substantially" when used herein with respect to a value, modifies a particular value, by referring to a range equal to the particular value, plus or minus ten percent (+/−10%). The term "substantially" can also be used to modify a particular condition, by referring to a range of conditions that are within ten percent (+/−10%) of the particular condition. For any of the embodiments of flexible containers, disclosed herein, any disclosure of a particular value or condition is also intended to be a disclosure of various alternative embodiments of that flexible container, with the value or condition being variable within the range of substantially (i.e. within 10%).

When the term "substantially" refers to the flatness of one or more flexible materials, the phrase "substantially flat" means that the flexible material fits between two parallel planes set apart by a separation distance that is equal to the average overall thickness of the material plus 2.0 millimeters.

The term "unit operation mechanism" as used herein, refers to any type of mechanism that is capable of performing an operation (a step in a process) on one or more materials and/or handling one or more materials. Types of unit operation mechanisms 42 include, but are not limited to any mechanisms for: at least partially separating one or more materials into different portions (as defined above); sealing; embossing; punching; piercing; decorating (including, but not limited to, printing); labeling; bar coding; transferring the materials (or articles created therefrom) between stations or pieces of equipment; opening and/or closing portions of structures formed by the materials; filling structures formed by the materials; expandable material dosing; and, adhering to another article or material. Thus, the unit operation can comprise any step in a process that takes place subsequent to the formation of the discrete seal, wherein the step is directly or indirectly dependent upon the location of the seal.

II. Process and Apparatus for Performing a Task in Registration with a Seal.

The process and apparatus can be used for performing a task in registration with a seal in a material. The material can be any suitable type of material, and may have any suitable degree of flexibility from flexible to rigid. FIG. 1 shows one non-limiting example of a process and apparatus for performing a task in registration with a seal in at least one flexible material.

The apparatus 20 shown in FIG. 1 comprises: a supply of a first material 22 from a first supply mechanism such as a first roll 26, a supply of a second material 24, from a second supply mechanism such a second roll 28; a sealing mechanism 30 that comprises two seal-forming components 32 and 34; a detection device 40; and a unit operation mechanism 42. The first and second materials 22 and 24 can be provided in any suitable form. In the embodiment shown in FIG. 1, the first material 22 and second material 24 are provided in the form of webs of material that are moving in the machine direction (MD). The webs of material may be moving in a continuous manner, or in an intermittent manner.

The first and second materials 22 and 24 may comprise flexible materials. The first and second materials 22 and 24 can comprise single layer materials, or laminates of two or more layers. In various embodiments of the process described herein, the first and second materials 22 and 24 can be folded portions of same material, separate pieces of material; or, as shown in FIG. 1, separate webs of material.

As examples, flexible materials such as films and non-wovens can be made from one or more thermoplastic polymers, as described herein and/or as known in the art. Thermoplastic polymers can include polyolefins such as polyethylene and/or copolymers thereof, including low density, high density, linear low density, or ultra-low density polyethylenes. Polypropylene and/or polypropylene copolymers, including atactic polypropylene; isotactic polypropylene, syndiotactic polypropylene, and/or combinations thereof can also be used. Polybutylene is also a useful polyolefin.

Other suitable polymers include polyamides or copolymers thereof, such as Nylon 6, Nylon 11, Nylon 12, Nylon 46, Nylon 66; polyesters and/or copolymers thereof, such as maleic anhydride polypropylene copolymer, polyethylene terephthalate; olefin carboxylic acid copolymers such as ethylene/acrylic acid copolymer, ethylene/maleic acid copolymer, ethylene/methacrylic acid copolymer, ethylene/vinyl acetate copolymers or combinations thereof; polyacrylates, polymethacrylates, and/or their copolymers such as poly(methyl methacrylates).

Other nonlimiting examples of polymers include polyesters, polycarbonates, polyvinyl acetates, poly(oxymethylene), styrene copolymers, polyacrylates, polymethacrylates, poly(methyl methacrylates), polystyrene/methyl methacrylate copolymers, polyetherimides, polysulfones, and/or combinations thereof. In some embodiments, thermoplastic polymers can include polypropylene, polyethylene, polyamides, polyvinyl alcohol, ethylene acrylic acid, polyolefin carboxylic acid copolymers, polyesters, and/or combinations thereof. Biodegradable thermoplastic polymers also are contemplated for use herein. A thermoplastic polymer component of a flexible material can be a single polymer species as described above or a blend of two or more thermoplastic polymers as described above.

Also as examples, flexible materials can further include one or more additives, as described herein and/or as known in the art. Non-limiting examples of classes of such additives include perfumes, dyes, pigments, nanoparticles, antistatic agents, photoactives, other polymers materials (e.g., polypropylene, polyethylene, ethylene vinyl acetate, polymethylpentene any combination thereof, or the like), a filler (e.g., glass, talc, calcium carbonate, or the like), a mold release agent, a flame retardant, an electrically conductive agent, an antioxidant, an impact modifier, a stabilizer (e.g., a UV absorber), wetting agents, and other classes of additives known in the art, and combinations thereof. Other filler materials can comprise fibers, structural reinforcing agents, and all types of biosourced materials such as oils (hydrogenated soy bean oil), fats, starch, etc. Film antistatic agents include cationic, anionic, and/or, nonionic agents. The films disclosed herein can contain a single additive or a mixture of any number of additives.

Thermoplastic polymers, and their variations, as disclosed herein can be formed into a film and can comprise many different configurations, depending on the film properties desired. The properties of the film can be manipulated by varying, for example, the thickness, or in the case of multilayered films, the number of layers, the chemistry of the layers, i.e., hydrophobic or hydrophilic, and the types of polymers used to form the polymeric layers. The films disclosed herein can be multi-layer films. For multi-layer films, each respective layer can be made from any material disclosed herein or known in the art, in any manner disclosed herein or known in the art. For any of the flexible materials, materials that are safe/approved for food contact may be selected. Additionally, materials that are approved for medical usage, or materials that can be sterilized through retort, autoclave, or radiation treatment, or other sterilization processes known in the art, may be used.

In various embodiments, part, parts, or all of a flexible material can be coated or uncoated, treated or untreated, processed or unprocessed, in any manner known in the art. In various embodiments, parts, parts, or about all, or approximately all, or substantially all, or nearly all, or all of a flexible material can made of sustainable, bio-sourced, recycled, recyclable, and/or biodegradable material. Part, parts, or about all, or approximately all, or substantially all, or nearly all, or all of any of the flexible materials described herein can be partially or completely translucent, partially or completely transparent, or partially or completely opaque.

With regard to films and elastomers for use as flexible materials, these can be formed in any manner known in the art, such as casting, extruding (blown or flat; singly or with coextrusion), calendering, depositing solution(s), skiving, etc. then slitting, cutting, and/or converting the films and/or elastomers into the desired sizes or shapes, as sheets or webs, as will be understood by one skilled in the art. With regard to blown films, multiple processes can be used including: collapsed bubble to create a blocked film, and double and or triple bubble processes. Flexible materials may further be subjected to any number or orienting, tenter frame, tenter hook, stretching, or activation processes. With regard to foamed sheets for use as flexible materials, these can be formed in any manner known in the art, by mixing base ingredients, adding the foaming mixture to a mold or shaping apparatus, then curing, cutting, and/or converting the foam into the desired sizes or shapes, as sheets or webs. With regard to nonwoven fabrics, these can be formed in any manner known in the art using spunbonded fibers and/or meltblown fibers, staple-length and/or continuous fibers, with any layering, mixing, or other combination known in the art. Other materials listed herein for use as flexible materials can be made in any manner known in the art.

The flexible materials used to make the containers disclosed herein can be formed in any manner known in the art, and can be joined together using any kind of joining or sealing method known in the art, including, for example, heat sealing (e.g. conductive sealing, impulse sealing, ultrasonic sealing, etc.), welding, crimping, bonding, adhering, and the like, and combinations of any of these.

Although two materials are shown being fed into the apparatus 20 shown in FIG. 1, it should be understood that the process described herein can be performed on a single material. Typically, however, the process will be performed on two or more (i.e., a plurality of) materials. In such cases, the first and second materials 22 and 24 may be brought into proximity with one another so that at least a portion of the first and second materials 22 and 24 overlap at an overlapping region 50.

Figure 2:
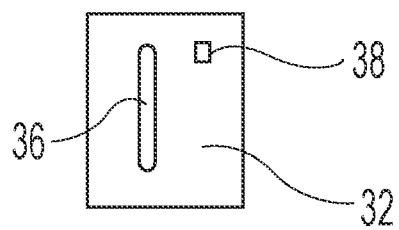
FIG. 2 is a schematic plan view of a component having raised portions for forming a seal and an eye mark.
Figure 3:
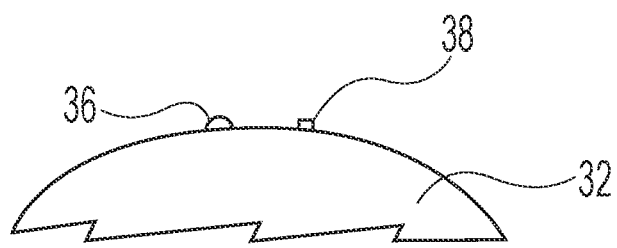
FIG. 3 is a partially fragmented side view of a component in the form of a roll having raised portions for forming a seal and an eye mark.

The sealing mechanism 30 and the seal-forming components 32 and 34 can be any suitable mechanism that is capable of forming a discrete seal and an eye mark in one or more materials. The sealing mechanism 30 and the seal-forming components 32 and 34 can be in any suitable form including, but not limited to in the form of plates, or rollers. In the embodiment shown in FIG. 1, one of the seal-forming components 32 is a sealing member that comprises a surface that has a first projection 36 that is in a configuration to form the discrete seal, and a second projection 38 with a sharp edge for forming the eye mark. The first and second projections 36 and 38 may be contiguous, or as shown in FIGS. 2 and 3, spaced apart. Non-limiting examples of a discrete seal 56 and an eye mark 60 are shown in FIGS. 4 and 4A.

The eye mark 60 can be formed in any suitable manner. The eye mark 60 can be formed by a printing mechanism; a marking mechanism; a sealing mechanism; by deforming a portion of the materials; by forming holes or other features in one or more of the materials; or in any other manner suitable for accurate detection by a detection device. The eye mark-forming mechanism should be such that the eye mark 60 is formed at the same time as the discrete seal, and is in a fixed position relative to the discrete seal. Thus, the eye mark-forming mechanism may comprise part of the same mechanism used to form the discrete seal, or a separate mechanism adjacent thereto. If the eye mark-forming mechanism is an adjacent mechanism that cooperates with the seal-forming mechanism, it may be in a fixed position relative to the seal-forming mechanism, and travel with the seal-forming mechanism when the seal-forming mechanism contacts the material(s). In the particular embodiment shown, the eye mark is formed by a sealing mechanism.

Figure 4:
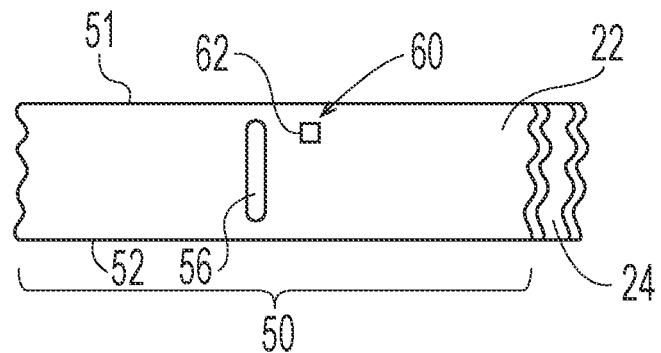
FIG. 4 is a partially fragmented plan view of two webs that have a discrete seal formed therebetween and an eye mark therein.
Figure 4A:
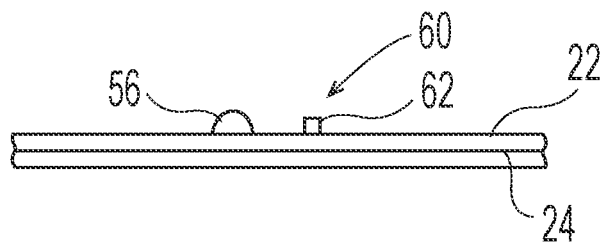
FIG. 4A is a side view of the webs shown in FIG. 4.

FIGS. 4 and 4A show that the sealing step will simultaneously form: (i) a discrete seal 56 between the first and second materials 22 and 24 in the overlapping region 50; and (ii) an eye mark 60 in at least one of the first and second materials 22 and 24. The eye mark has edges 62 that are sufficiently well-defined so that they can be located with a detection device 40, and the eye mark 60 is registered with the discrete seal 56.

The discrete seal 56 may be a hermetic or leak-proof seal. As shown in FIG. 4A, in such cases, the discrete seal 56 may be a domed seal (convex curvature in cross-section) with a soft edge, so it does not leak. The detection system 40, however, needs an eye mark with a crisp, sharp edge to enable the detection device 40 to accurately detect the location of the eye mark 60. Therefore, the discrete seal 56 is often not suitable for use as an eye mark, and an eye mark 60 as described herein is provided.

There can be any suitable number of eye marks 60. The eye mark(s) 60 can be provided in at least one material. If there are two or more materials, the eye mark 60 can be formed on one or more, or all, of such materials. For example, if there are two or more materials, the eye mark 60 need only be formed in one of such materials. Alternatively, the eye mark 60 can be formed in two or more materials, or in all of the materials.

Figure 15:
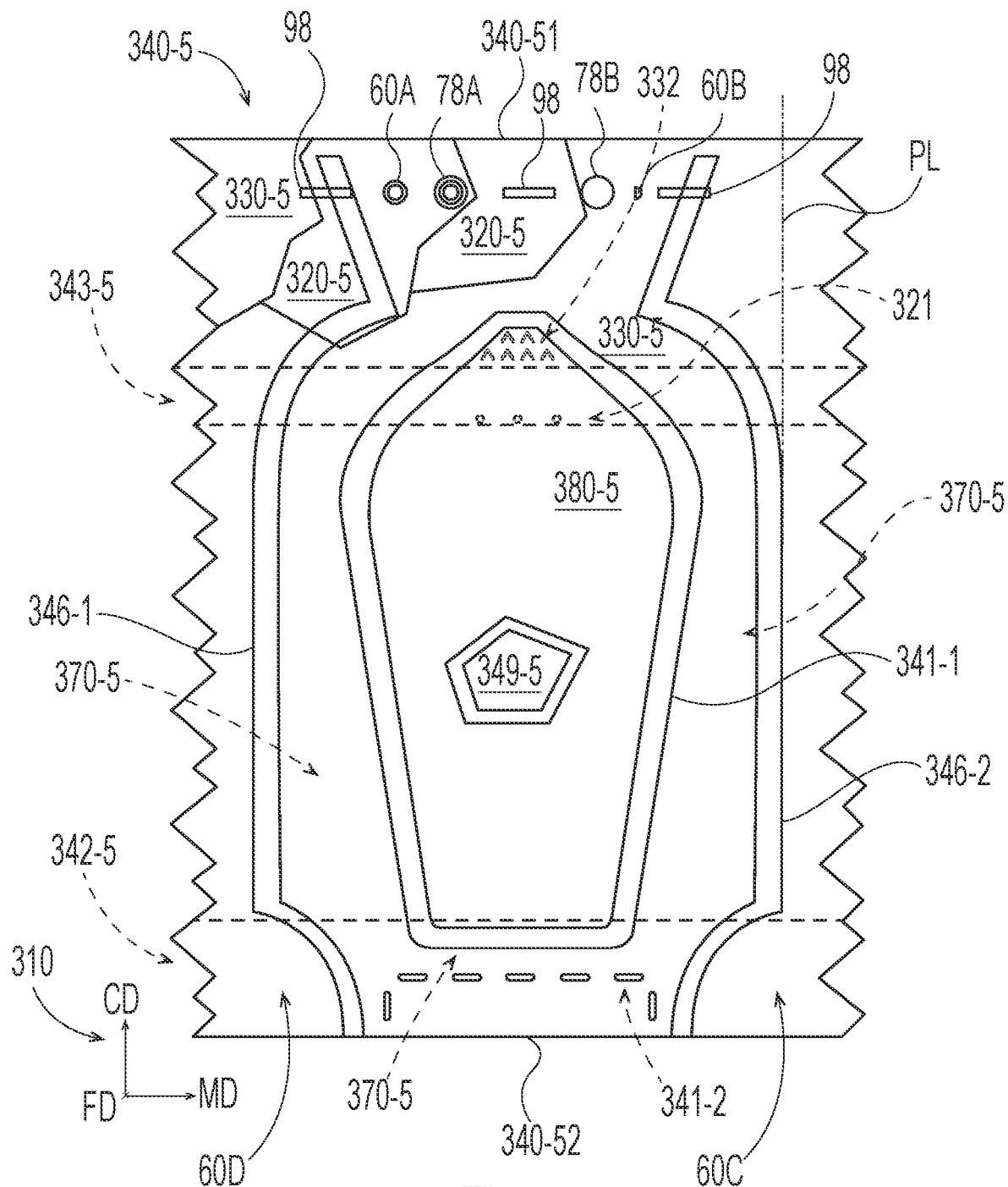
FIG. 15 illustrates a fragmented, front view of the gusseted structure from FIG. 13, which is further sealed.

The eye mark(s) 60 can be of any suitable size and configuration (provided that the eye mark provides a crisp, sharp edge for the detection system). Suitable configurations for the eye mark 60 include, but are not limited to geometric shapes such as circles, polygons (e.g., triangles, squares, rectangles, etc.), lines, crosses, and combinations of all or parts thereof. As shown in FIG. 15, in some cases, at least one of the eye marks 60A may be ring-shaped formed by concentric circles. In cases in which the eye mark(s) are made by a process that is similar to the process used to form the discrete seal, at least a portion of the material in which the eye mark(s) are formed may be melted and displaced to form thicker localized portions of material. For example, if the process used to form the eye marks(s) is the same as the sealing process, and the material in which the eye mark(s) are formed is a flowable polymer, portions of the material under localized stress may be displaced and pushed out toward the edges of a circular eye mark, creating a thicker (and/or optically distinct) ring around the outside of the circular shape. If there is more than one eye mark 60, they may be designated 60A, 60B, 60C, 60D, etc. When there is more than one eye mark, the various eye marks 60 may be of the same or different sizes and/or configurations.

The eye mark(s) 60 can be provided at any suitable location or locations on the material. For example in the case of making flexible containers described herein, the flexible containers may be formed from a continuous web of material which is subsequently singulated into individual flexible containers. In such a case, the material between the portions of the web that will be cut to form individual containers may be referred to as containing a "pitch line", PL. The eye marks 60 may be located on the pitch line. Alternatively, as shown in FIG. 15, the eye marks 60 may be located inboard of the pitch line PL on the portions of the web of material that will align with the containers to be cut from the continuous web. The eye mark(s) 60 can be formed on a portion of the web of material that will form the finished container such that they may be visible on the finished container. Alternatively, the eye mark(s) 60 can be formed on a portion or portions of the web of material that is removed during the process of cutting out the individual containers so that it they are not visible on the finished container.

It may be desirable to have more than one eye mark 60 on a moving web of material (particularly in the case of circular eye marks 60). This is particularly the case when it is necessary to monitor and make adjustments to account for the alignment of the web of material and/or any features associated with the web of material (such as printing, etc.). The "alignment of the web" refers to how closely the web is tracking relative to the machine direction, MD. In such cases, it may be desirable for the different eye marks 60 to be spaced as far apart from each other on the web as possible to so that the angle between the eye marks 60 can be measured with greater accuracy. For example, as shown in FIG. 15, in the case of a moving web, it may be desirable to have eye marks located adjacent to each edge 340-51 and 340-52 of the web that is formed into gusseted structure 340-5. Such spaced apart eye marks 60 can, as a result, provide input for "rotational" correction of a moving web (the angle of the web relative to the machine direction), as opposed to only translational correction. Alternatively, if the eye mark such as 60B and 60C has a configuration with at least one linear side, it may be possible for the detection device to detect the orientation of the web and or features thereon with respect to the linear side of the eye mark, and to use a single eye mark to track the same.

The detection device 40 may be any type of device that is capable of locating the eye mark(s) 60. The detection device 40 can include, but is not limited to: a vision system (which may include a camera), an electronic sensor, an ultrasonic sensor, and a photo eye. In cases in which the eye mark(s) are created by melting the material in which the eye mark(s) are formed, the detection system may include backlighting in order to make thicker melted and displaced portions of the eye mark(s) appear darker so that they are more easily located. There can be any suitable number of detection devices 40. For example, there may be one detection device 40 positioned in each location that corresponds to the location through which one of the edges 51 and 52 of the web(s) shown in FIG. 4 will pass. The detection device(s) 40 may be in communication in any suitable manner with the unit operation mechanism 42. Suitable manners of communication include, but are not limited to electrical communication, electronic communication, and analog and digital control communications.

The information relating to the location of the eye mark 60 is transmitted at least indirectly from the detection device 40 to the unit operation mechanism 42. The phrase "transmitted at least indirectly", as used herein with respect to transmitting information from the detection device 40 to the unit operation mechanism 42, includes configurations of the system in which the information is transmitted directly from the detection device 40 to the unit operation mechanism 42, as well as configurations in which the information is transmitted from the detection device 40 to some other component, and then to the unit operation mechanism 42. The transmission of information relating to the location of the eye mark 60 allows the unit operation mechanism 42 to perform an operation on the web of material at a location that is in close registration (e.g., within 1 mm, or less) with the seal 56. The close registration described herein does not require that the operation (e.g., a cut, etc.) be located within 1 mm or less of the seal 56. It is meant that the operation can be performed at a particular location on the material that is precisely located relative to the seal 56 (e.g., within 1 mm, or less) of the desired location relative to the seal 56.

The unit operation mechanism 42 can be any type of mechanism that is capable of performing an operation (a step in a process) on one or more materials and/or handling one or more materials. Types of unit operation mechanisms 42 include, but are not limited to any mechanisms for: at least partially separating one or more materials into different portions (as defined above); sealing; embossing; punching; piercing; decorating (including, but not limited to, printing); labeling; bar coding; transferring the materials (or articles created therefrom) between stations or pieces of equipment; opening and/or closing portions of structures formed by the materials; filling structures formed by the materials; expandable material dosing; and, adhering to another article or material. Thus, the unit operation can comprise any step in a process that takes place subsequent to the formation of the discrete seal, wherein the step is directly or indirectly dependent upon the location of the seal. In some cases, one of more of the aforementioned unit operation mechanisms may be excluded from a process.

Figure 5:
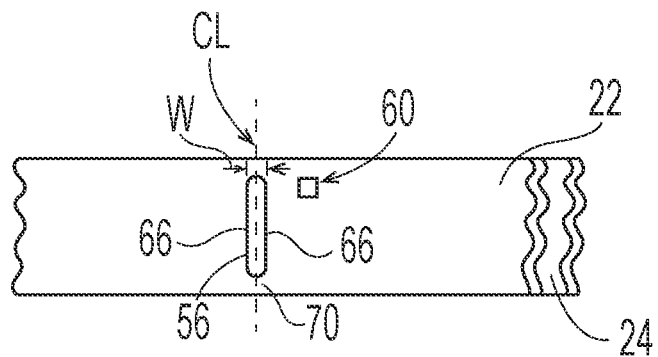
FIG. 5 is a partially fragmented plan view of two webs that have a discrete seal formed therein and a cut (or other at least partially separation) through the seal which is in registration with an eye mark.
Figure 6:
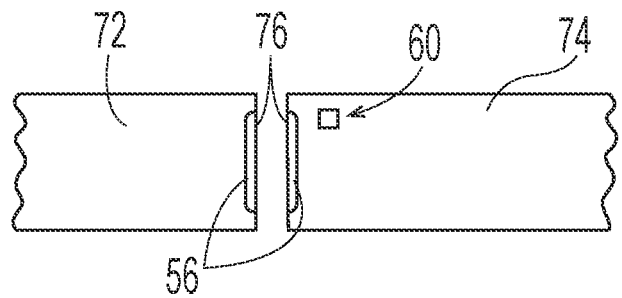
FIG. 6 is a partially fragmented plan view of the two webs shown in FIG. 5 which have been separated along a cut line through the seal.

Several examples of the performance of an operation on webs of material by unit operation mechanisms are shown in FIGS. 5, 5A-5C, and 6. FIG. 5 shows two webs 22 and 24 that have a discrete seal 56 formed therein and a cut (or other at least partially separation) 70 through the seal 56 which is in registration with the eye mark 60. FIG. 6 shows the two webs shown in FIG. 5 which have been separated into two portions 72 and 74 along a cut line 70 through the seal 56. The cut edges of the web are designated 76.

As shown in FIG. 5, the seal 56 has a width, W. The seal 56 may have any suitable width. In one non-limiting embodiment, and for purposes of discussion, the seal may be about 4 mm wide. In such an embodiment, it may be desirable to cut through the centerline, CL, of the seal 56 so that the seal 56 will be divided into equal 2 mm wide portions after cutting. In other cases, it may be desirable to cut through the seal 56 at some location other than through the centerline CL of the seal 56. For example, in a process of making flexible containers, which is further described herein, it may be desirable to make a cut that divides the seal so that portion of the seal 56 that forms the periphery of the flexible container is of a certain width (the "container side" of the seal), and the width of the container side of the seal is such that it differs from the width of the portion of the seal that forms part of the trim that is removed from the container (the "trim side" of the seal). In some cases, it may be desirable for the container side of the seal to be in a range that is greater than or equal to about 0.5 mm and less than or equal to about 2 mm, 1.5 mm, 1 mm wide. In other cases, it may be desirable for the container side of the seal to be greater than 2 mm wide. It may be desirable for the variation in the location of the cut to be reduced to less than or equal to about any of the following: 2.5 mm, 2 mm, 1.5 mm, 1 mm, 0.5 mm, or 0.1 mm. It should be appreciated that as the variation in the location of the cut is reduced, the width of the container side of the seal may be more closely controlled. The method described herein may be particularly useful in allowing the laser beam to target thinner portions (such as those portions that lie near the edges) of a domed seal. Cutting through the thinner portions of a seal will enable the laser to cut faster, and the overall process to run faster.

Figure 5A:
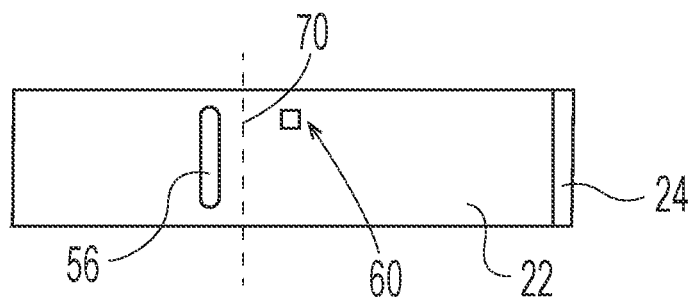
FIG. 5A is a partially fragmented plan view of two webs that have a discrete seal formed therein and a cut (or other at least partially separation) spaced apart from the seal which is in registration with the seal and an eye mark.
Figure 5B:
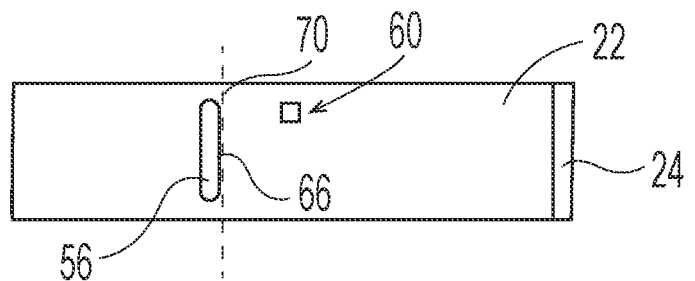
FIG. 5B is a partially fragmented plan view of two webs that have a discrete seal formed therein and a cut (or other at least partially separation) adjacent to the seal which is in registration with an eye mark.
Figure 5C:
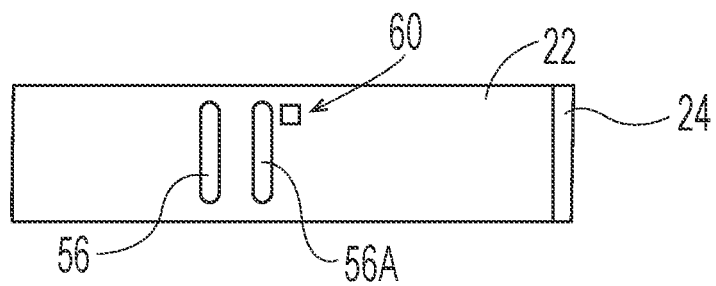
FIG. 5C is a partially fragmented plan view of two webs that have a discrete seal formed therein and a second seal which is in registration with the first seal and eye mark.

It is not necessary that the operation performed by the unit operation station be performed through or within the seal 56. For example, FIG. 5A shows two webs 22 and 24 that have a discrete seal 56 formed therein and a cut (or other at least partially separation) 70 spaced apart from the seal 56 which is in registration with the seal 56 and an eye mark 60. FIG. 5B shows two webs 22 and 24 that have a discrete seal 56 formed therein and a cut (or other at least partially separation) 70 adjacent to the seal 56 which is in registration with an eye mark 60. The unit operation mechanism 42 is also not limited to one which creates an at least partial separation in the material(s). For example, FIG. 5C shows two webs 22 and 24 that have a discrete seal 56 formed therein and a second seal 56A formed by the unit operation mechanism 42 which is in registration with the first seal 56 and eye mark 60.

Figure 7:
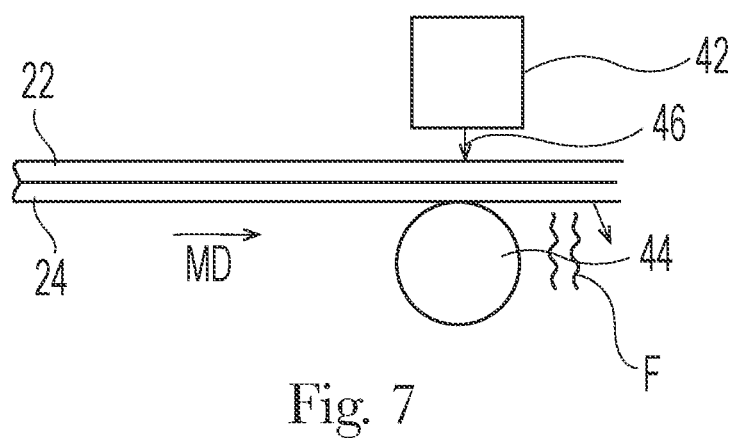
FIG. 7 is a schematic side view of a portion of an alternative process and apparatus in which the rotary cutting device is replaced with a laser cutting device.

The unit operation mechanism 42 used to form an at least partial separation in the material(s) can comprise any suitable mechanism. In some embodiments, as discussed above, the unit operation mechanism 42 may comprise a laser. Any suitable type of laser can be used including, but not limited to Class 4 lasers and $CO_2$ lasers. As shown in FIG. 7, if there is a backing component 44 behind the material (e.g., webs 22 and 24) when it is being at least partially separated by a laser, such a backing component 44 should be capable of absorbing, rather than reflecting the laser beam 46. In addition, the backing component 44 should be made of a material in which can be readily cleaned of any fumes, F, deposited on the same by the laser cutting process.

Further, it may be desirable to remove fumes F that result from the laser cutting in a direction that is opposite to the travel of the laser beam path 46. The direction of fume F removal is shown with an arrow in FIG. 7. This may be desirable because, if the fumes F are not removed (or if removed in the opposite direction), the fumes F can absorb laser energy. This fume energy absorption will require additional laser power or a slower laser beam speed in order to cut the flexible materials. This would result in a more expensive and slower process.

Figure 8:
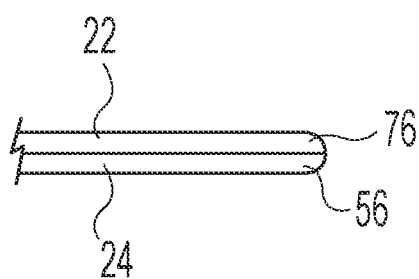
FIG. 8 is a partially fragmented schematic side view showing two materials that are sealed at the edge and have a cut along the edge formed by a laser cutting device.

One benefit of using laser cutting as shown in FIGS. 7 and 8, is that it may produce a rounded or "soft" edge 76 on the remaining cut portion of the seal 56. Without wishing to be bound by any particular theory, it is believed that the energy from the laser may melt the material of the seal 56 during the laser cutting, and that the material may then form the rounded edge 76 on the remaining portion of the seal 56 as the material cools and re-solidifies. This rounded edge 76 may have a radius of about 10 mm or less. In alternate embodiments the rounded edge 76 may have a radius of about 5 mm or less, about 1 mm or less, about 0.5 mm or less, about 0.1 mm or less or about 0.05 mm or less.

III. Flexible Containers.

Figure 9A:
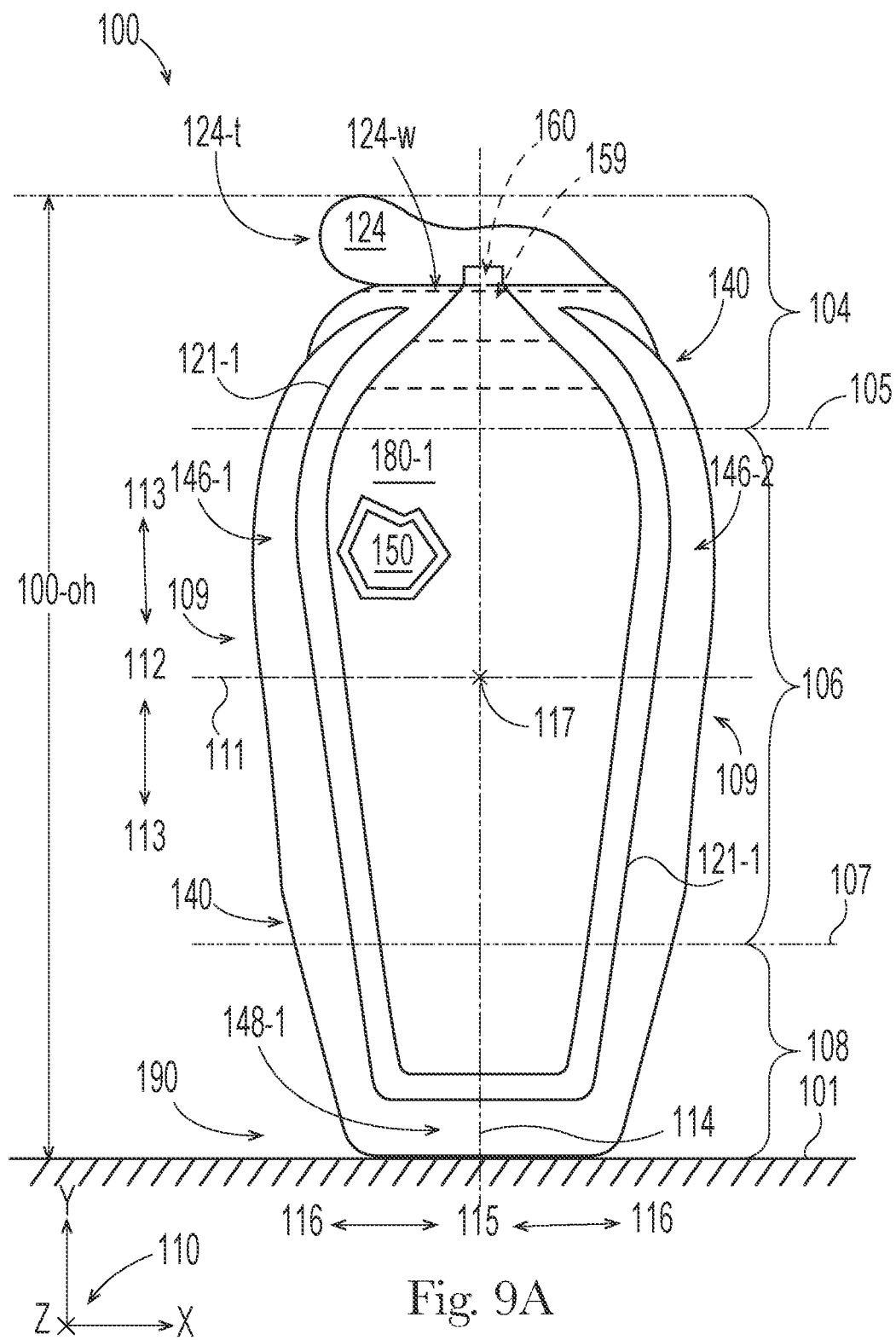
FIG. 9A illustrates a front view of an embodiment of a stand-up flexible container.
Figure 9B:
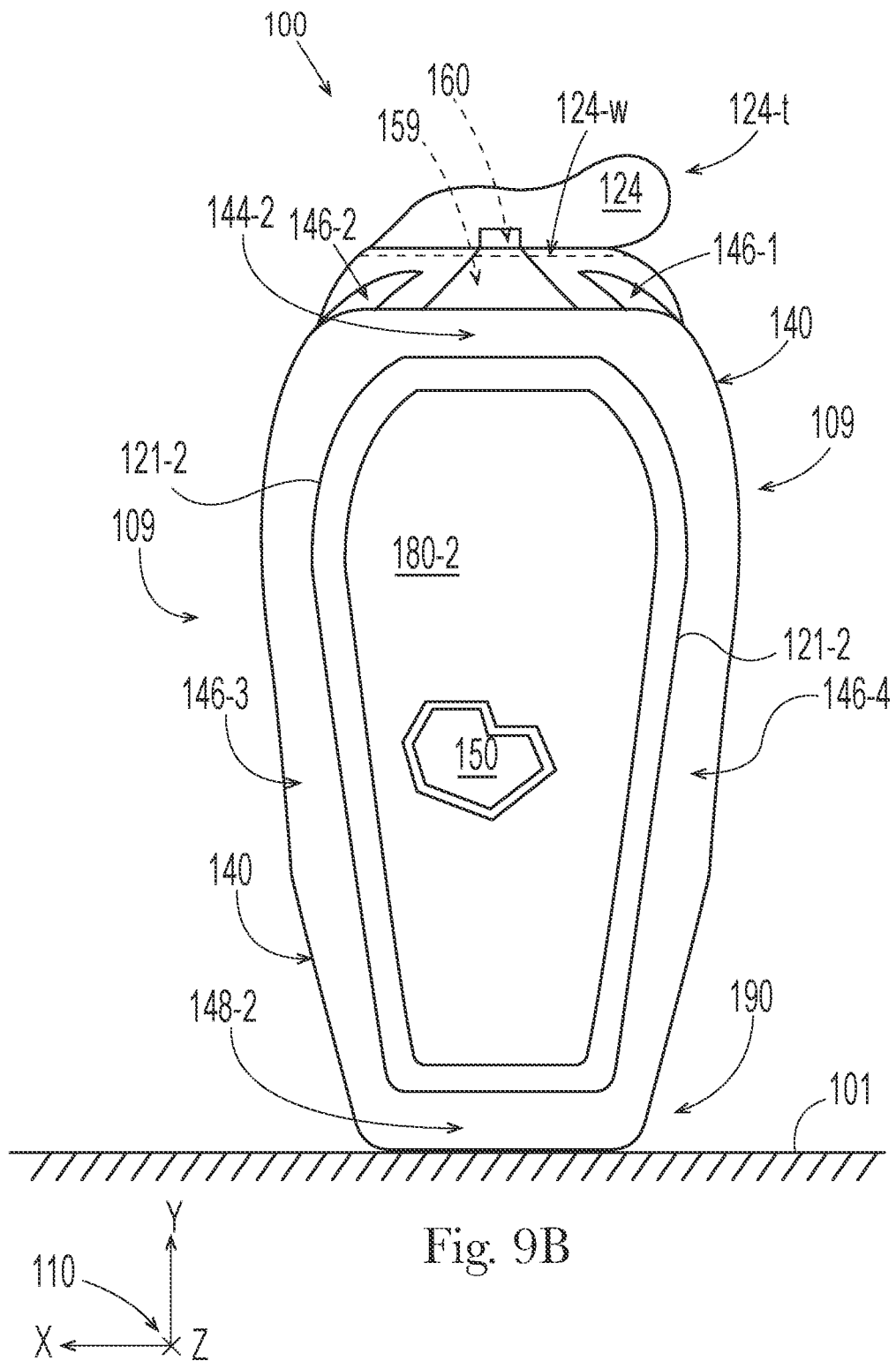
FIG. 9B illustrates a back view of the stand-up flexible container of FIG. 9A.
Figure 9C:
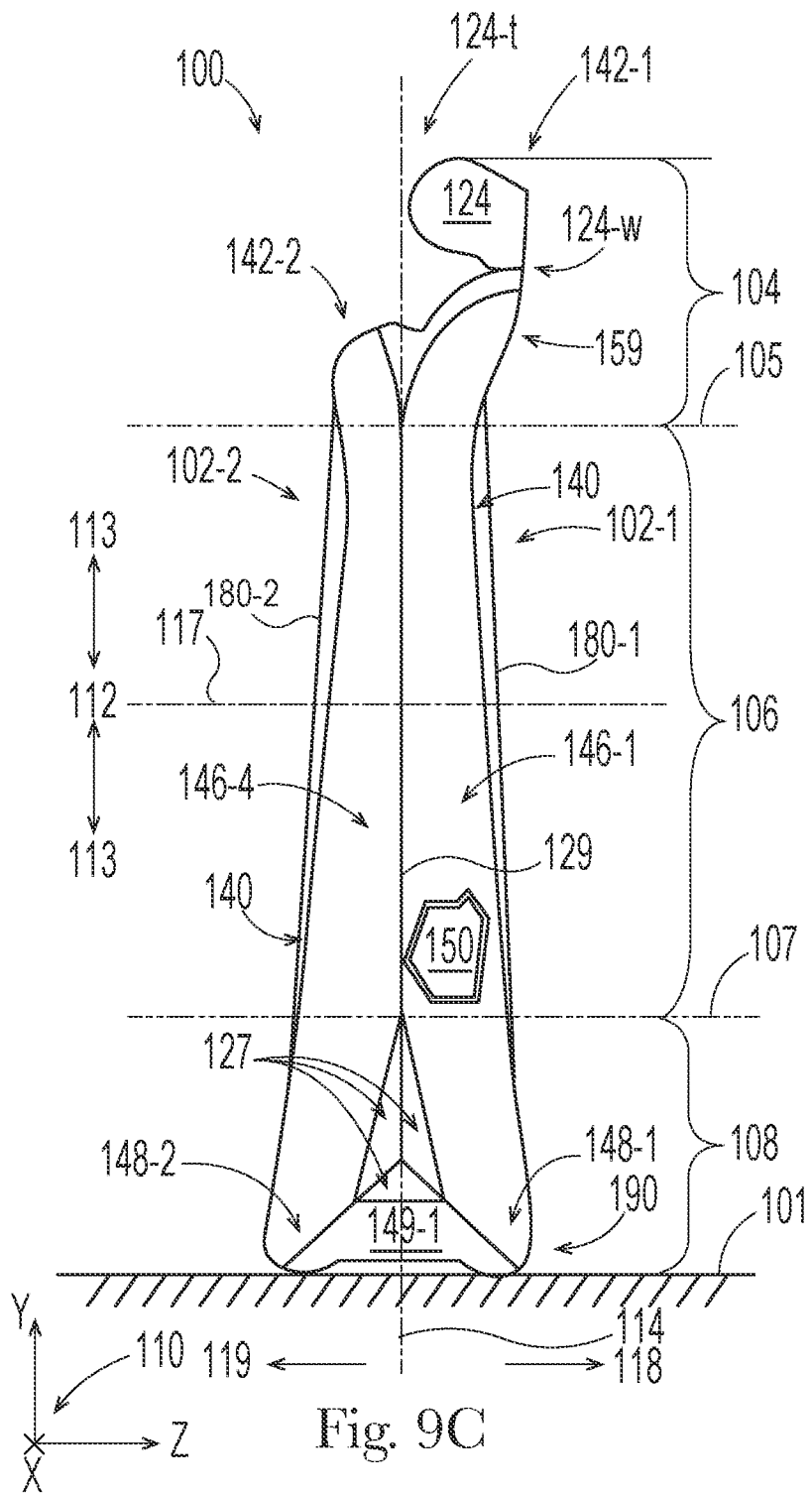
FIG. 9C illustrates a left side view of the stand-up flexible container of FIG. 9A.
Figure 9D:
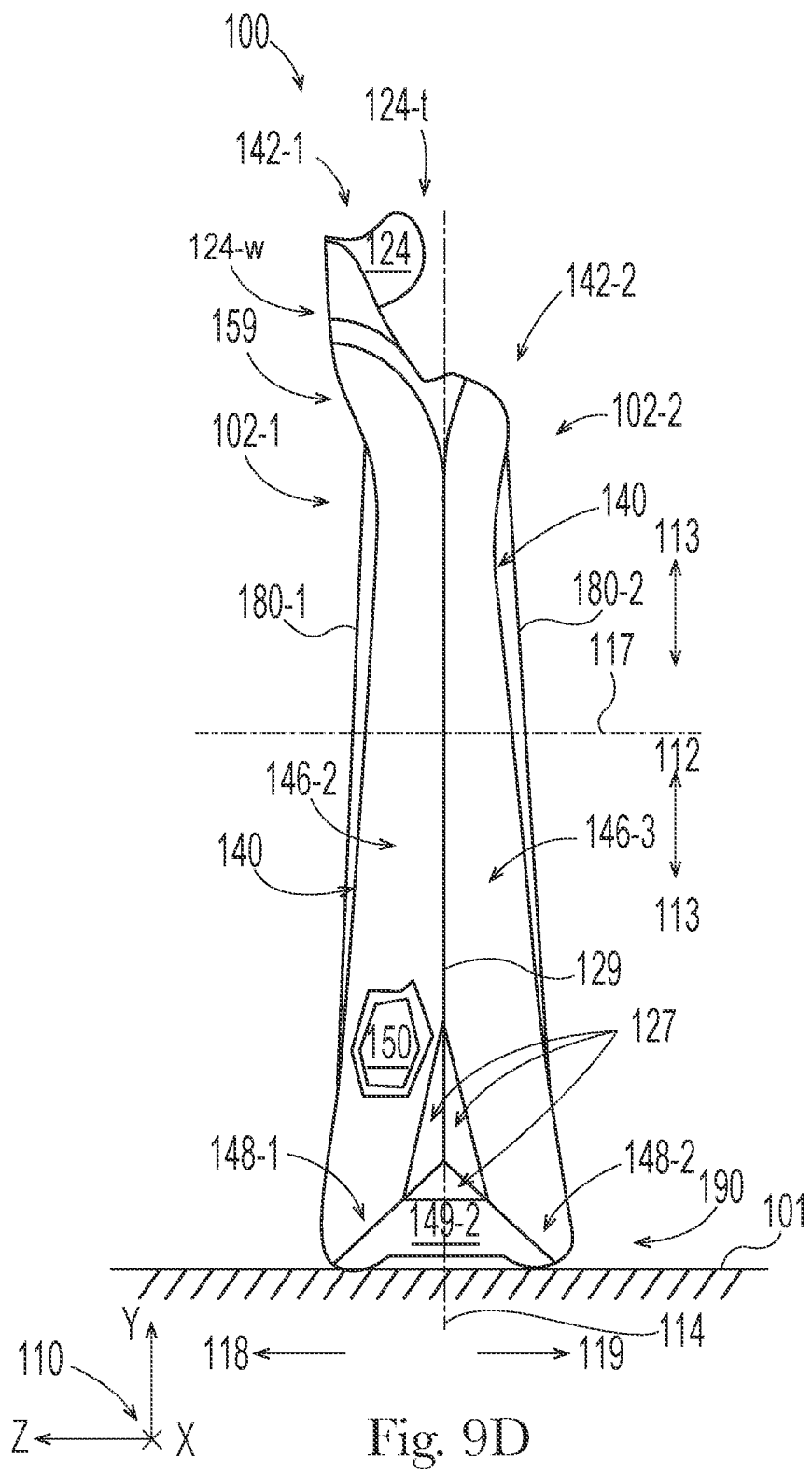
FIG. 9D illustrates a right side view of the stand-up flexible container of FIG. 9A.
Figure 9E:
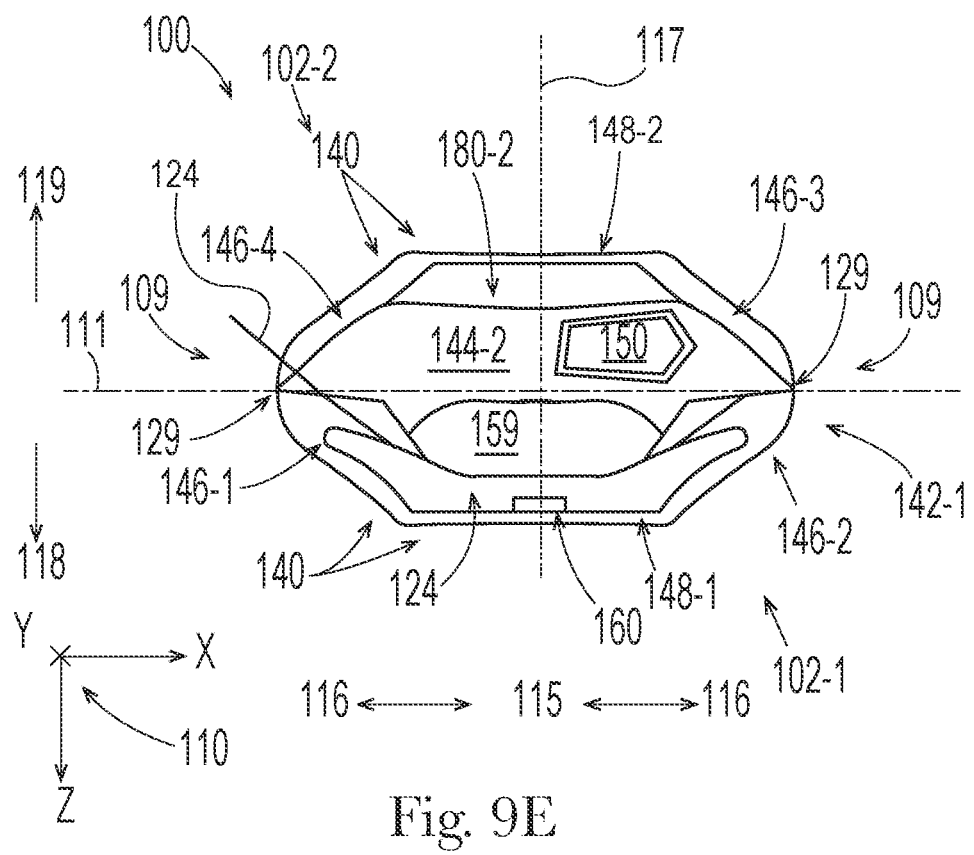
FIG. 9E illustrates a top view of the stand-up flexible container of FIG. 9A.
Figure 9F:
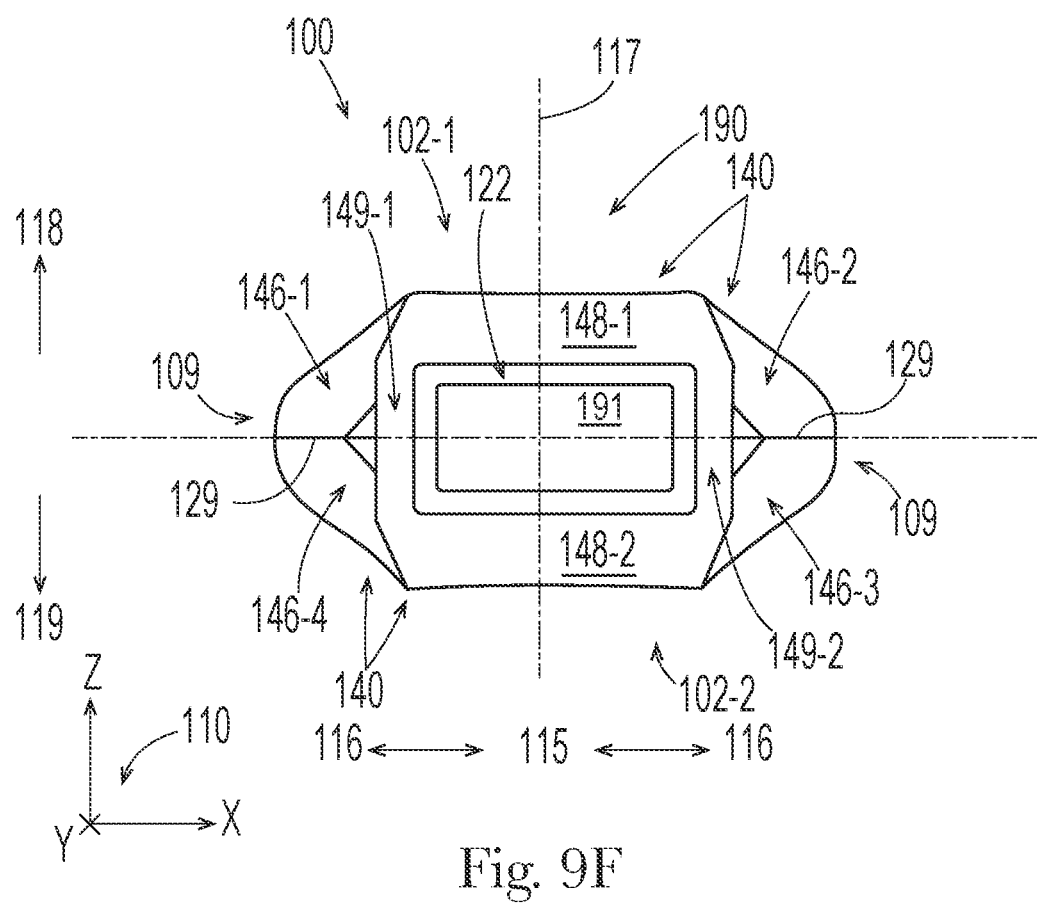
FIG. 9F illustrates a bottom view of the stand-up flexible container of FIG. 9A.
Figure 9G:
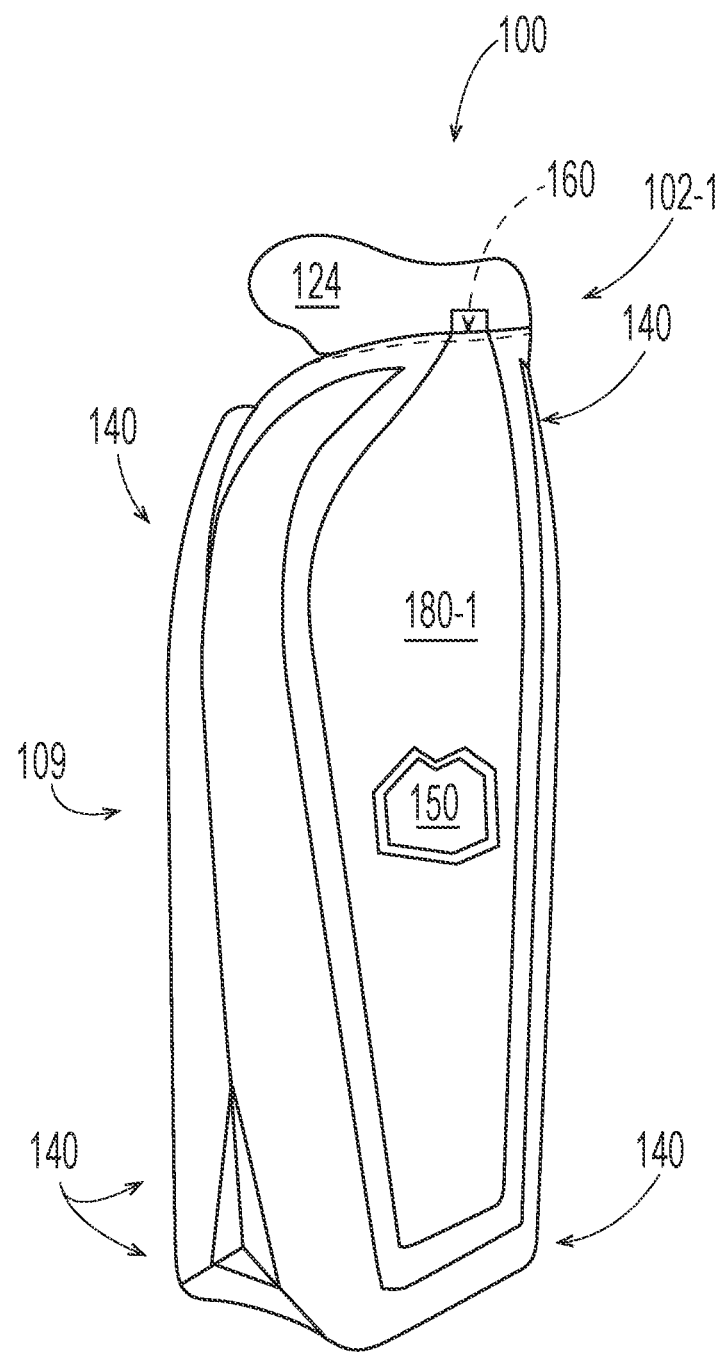
FIG. 9G illustrates a perspective view of the stand-up flexible container of FIG. 9A.

The method for performing a task in registration with a discrete seal in at least one material described above may comprise one or more of the steps in a process of making flexible containers. FIGS. 9A-9G illustrate various views of one non-limiting embodiment of a stand up flexible container 100 formed from one or more flexible materials. FIG. 9A illustrates a front view of the container 100 which has one particular overall shape. The container 100 is standing upright on a horizontal support surface 101. The flexible container 100 is a film-based container, made entirely of film laminates; however, in various alternative embodiments, one or more other flexible materials can also be used to make the flexible container.

In the embodiments of FIG. 9A-9G, a coordinate system 110, provides lines of reference for referring to directions in each of these figures. The coordinate system 110 is a three-dimensional Cartesian coordinate system with an X-axis, a Y-axis, and a Z-axis, wherein each axis is perpendicular to the other axes, and any two of the axes define a plane. The X-axis and the Z-axis are parallel with the horizontal support surface 101 and the Y-axis is perpendicular to the horizontal support surface 101.

FIGS. 9A-9G also include other lines of reference, for referring to directions and locations with respect to the container 100. A lateral centerline 111 runs parallel to the X-axis. An XY plane at the lateral centerline 111 separates the container 100 into a front half and a back half. An XZ plane at the lateral centerline 111 separates the container 100 into an upper half and a lower half. A longitudinal centerline 114 runs parallel to the Y-axis. A YZ plane at the longitudinal centerline 114 separates the container 100 into a left half and a right half. A third centerline 117 runs parallel to the Z-axis. The lateral centerline 111, the longitudinal centerline 114, and the third centerline 117 all intersect at a center of the container 100.

A disposition with respect to the lateral centerline 111 defines what is longitudinally inboard 112 and longitudinally outboard 113. A disposition with respect to the longitudinal centerline 114 defines what is laterally inboard 115 and laterally outboard 116. A disposition in the direction of the third centerline 117 and toward a front 102-1 of the container is referred to as forward 118 or in front of. A disposition in the direction of the third centerline 117 and toward a back 102-2 of the container is referred to as backward 119 or behind.

The container 100 includes a gusseted top 104, a middle 106, and a gusseted bottom 108, a front 102-1, a back 102-2, and left and right sides 109. The top 104 is separated from the middle 106 by a reference plane 105, which is parallel to the XZ plane. The middle 106 is separated from the bottom 108 by a reference plane 107, which is also parallel to the XZ plane. The container 100 has an overall height of 100-*oh*. In the embodiment of FIG. 9A, the front 102-1 and the back 102-2 of the container are joined together at an outer seal 129 (shown in FIG. 9C), which extends along portions of the sides 109 of the container 100. The container 100 includes a sealed tear tab 124, a structural support frame 140, a product space 150, a dispenser 160, panels 180-1 and 180-2, and a base structure 190. A portion of panel 180-1 is illustrated as broken away, in order to illustrate the product space 150. The product space 150 is configured to contain one or more fluent products.

The tear tab 124 is formed at the distal end of a sealed leg 142-1 of a top gusset, disposed in the top 104 of the container 100, and in the front 102-1. When the tear off portion 124 is removed, by pulling on a protruding tab 124-*t*, and causing separation along a line of weakness 124-*w*, the container 100 can dispense fluent product(s) from the product space 150 through a flow channel 159 then through the dispenser 160 at the end of the flow channel 159, to the environment outside of the container 100.

In the embodiment of FIGS. 9A-9D, the dispenser 160 is disposed in the top 104, however, in various alternative embodiments, the dispenser 160 can be disposed anywhere else on the top 140, middle 106, or bottom 108, including anywhere on either of the sides 109, on either of the panels 180-1 and 180-2, and on any part of the base 190 of the container 100. The structural support frame 140 supports the mass of fluent product(s) in the product space 150, and makes the container 100 stand upright.

The panels 180-1 and 180-2 are nonstructural panels that may be squeeze panels, made of layers of a film laminate. Panel 180-1 overlays a front of the product space 150. Substantially all of a periphery of the panel 180-1 is surrounded by a front panel seal 121-1. In various embodiments, about all, approximately all, nearly all, or all of a front panel can be surrounded by a front panel seal. Panel 180-2 overlays a back of the product space 150. Substantially all of a periphery of the panel 180-2 is surrounded by a back panel seal 121-2. In various embodiments, about all, approximately all, nearly all, or all of the back panel can be surrounded by a back panel seal. The panels 180-1 and 180-2 may have exterior surfaces that are about flat, suitable for displaying any kind of characters, graphics, branding, and/or other visual elements.

In various embodiments, a front or back panel can have an exterior surface that is approximately, substantially, nearly, or completely flat. However, in various embodiments, part, parts, or about all, or approximately all, or substantially all, or nearly all, or all of either or both of the panels 180-1 and 180-2 can include one or more curved surfaces. The base structure 190 is part of the structural support frame 140 and provides stability to the flexible container 100 as it stands upright.

The structural support frame 140 is formed by a plurality of structural support members, each of which includes an expanded structural support volume, made from one or more film laminates that are locally sealed together. The structural support frame 140 includes top structural support member 144-2, middle structural support members 146-1, 146-2, 146-3, and 146-4, bottom structural support members 148-1 and 148-2, as well as bottom middle structural support members 149-1 and 149-2.

The top structural support member 144-2 is formed in a folded leg 142-2 of a top gusset, disposed in the top 104 of the container 100, and in the back 102-2. The top structural support member 144-2 is adjacent to the sealed leg 142-1 of the top gusset that includes the flow channel 159 and the dispenser 160. The flow channel 159 allows the container 100 to dispense fluent product(s) from the product space 150 through the flow channel 159 then through the dispenser 160. In the embodiment of FIGS. 9A-9G, the flow channel 159 and the dispenser are formed entirely from the flexible materials of the flexible container 100; however, in various embodiments at least a portion of a flow channel and/or at least a portion of a dispenser may include or be formed by one or more rigid materials or components.

The top structural support member 144-2 is disposed above substantially all of the product space 150. Overall, the top structural support member 144-2 is oriented about horizontally, but with its ends curved slightly downward; however, these particular orientations and shapes are not required, and in various alternative embodiments can vary in any way desired. The top structural support member 144-2 has a cross-sectional area that is substantially uniform along its length but the cross-sectional areas at its ends are slightly larger than the cross-sectional area in its middle; however, in various alternative embodiments their cross-sections can be configured in any way desired.

The middle structural support members 146-1, 146-2, 146-3, and 146-4 are disposed on the left and right sides 109, from the top 104, through the middle 106, into the bottom 108. The middle structural support member 146-1 is disposed in the front 102-1, on the left side 109; the middle structural support member 146-4 is disposed in the back 102-2, on the left side 109, behind the middle structural support member 146-1. The middle structural support members 146-1 and 146-4 are adjacent to each other and in contact with each other along parts of their lengths, except that a lower portion of the middle structural support member 146-1 and a lower portion of the middle structural support member 146-4 are spaced apart from each other by a reinforcing seal 127. The middle structural support members 146-1 and 146-4 are not directly connected to each other. However, in various alternative embodiments, the middle structural support members 146-1 and 146-4 can be directly connected and/or joined together along at least portions of their overall lengths.

The middle structural support member 146-2 is disposed in the front 102-1, on the right side 109; the middle structural support member 146-3 is disposed in the back 102-2, on the right side 109, behind the middle structural support member 146-2. The middle structural support members 146-2 and 146-3 are adjacent to each other and in contact with each other along substantially all of their lengths, except that a lower portion of the middle structural support member 146-2 and a lower portion of the middle structural support member 146-3 are spaced apart from each other by a reinforcing seal 127. The middle structural support members 146-2 and 146-3 are not directly connected to each other. However, in various alternative embodiments, the middle structural support members 146-2 and 146-3 can be directly connected and/or joined together along at least portions of their overall lengths.

The middle structural support members 146-1, 146-2, 146-3, and 146-4 are disposed substantially laterally outboard from the product space 150. Overall, each of the middle structural support members 146-1, 146-2, 146-3, and 146-4 is oriented about vertically, but angled slightly, with its lower end straight and angled laterally outward, its middle gradually curved, and its upper end straight and angled laterally inward; however, these particular orientations and shapes are not required, and in various alternative embodiments can vary in any way desired. Each of the middle structural support members 146-1, 146-2, 146-3, and 146-4 has a cross-sectional area that varies along its length; however, in various alternative embodiments their cross-sections can be configured in any way desired.

The bottom structural support members 148-1 and 148-2 are disposed on the bottom 108 of the container 100, each formed in a folded leg of a bottom gusset. The bottom structural support member 148-1 is disposed in the front 102-1 and the bottom structural support member 148-2 is disposed in the back 102-2, behind the bottom structural support member 148-1. The bottom structural support members 148-1 and 148-2 are substantially parallel to each other but are offset from each other and not in contact with each other.

The bottom structural support members 148-1 and 148-2 are disposed below substantially all of the product space 150, and are part of the base structure 190. Overall, each of the bottom structural support members 148-1 and 148-2 is oriented horizontally and substantially laterally, with its outward facing ends curved slightly upward; however, these particular orientations and shapes are not required, and in various alternative embodiments can vary in any way desired.

Each of the bottom structural support members 148-1 and 148-2 has a cross-sectional area that is substantially uniform along its length; however, in various alternative embodiments their cross-sections can be configured in any way desired. For each of the bottom structural support members 148-1 and 148-2, substantially all of the overall length of the bottom structural support member is in contact with the horizontal support surface 101, when the container is standing up on the horizontal support surface 101. However, in various embodiments, about all, or approximately all, or substantially all, or nearly all, or all of a bottom structural support member may contact a horizontal support surface.

The bottom structural support members 148-1 and 148-2 are connected to each other by bottom middle structural support members 149-1 and 149-2, which are also part of the base structure 190. Overall, each of the bottom middle structural support members 149-1 and 149-2 is oriented horizontally and substantially parallel to a third centerline of a container; however, these particular orientations are not required, and in various alternative embodiments can vary in any way desired. Each of the bottom middle structural support members 149-1 and 149-2 has a cross-sectional area that is smaller in its middle and larger at its ends; however, in various alternative embodiments their cross-sections can be configured in any way desired. Each of the bottom middle structural support members 149-1 and 149-2 is in contact with the horizontal support 101 surface at its ends, but not at its middle, when the container is standing up on the horizontal support surface 101. However, in various embodiments, other portions of a bottom middle structural support member may contact a horizontal support surface.

In the base structure 190, the right end of the bottom structural support member 148-1 is joined to the front end of the bottom middle structural support member 149-2; the back end of the bottom middle structural support member 149-2 is joined to the right end of the bottom structural support member 148-2; the left end of the bottom structural support member 148-2 is joined to the back end of the bottom middle structural support member 149-1; and the front end of the bottom middle structural support member 149-1 is joined to the left end of the bottom structural support member 148-1.

The structural support members 148-1, 149-2, 148-2, and 149-1, are joined together around a bottom panel seal 122, which fully surrounds and defines a bottom panel 191. The bottom panel 191 has an overall shape that is substantially rectangular, with rounded corners. In various embodiments, structural support members in a base structure may surround about all, or approximately all, or substantially all, or nearly all of a bottom panel. In alternative embodiments, any number of structural support members can be used to partially or fully surround a bottom panel having any shape. The bottom panel is made of a film laminate and is disposed below and adjacent to a bottom portion of the product space 150. In the embodiment of FIGS. 9A-9G, no part of the bottom panel 191 contacts the horizontal support surface 101 but all of the bottom panel 191 is raised off of the horizontal support surface 101; however, in various embodiments, approximately all, or substantially all, or nearly all, of a bottom panel may be raised off of a horizontal support surface while part, parts, or all of a bottom panel may contact a horizontal support surface.

Each of the reinforcing seals 127 is formed by sealed portions that are bounded by edges that are shared with the bottom portions of middle structural support members and a middle portion of a bottom middle structural support member, on each side, such that each reinforcing seal 127 has an overall shape that is substantially triangular. On the left side 109 of the container 100, the reinforcing seal 127 is formed by sealed portions that are bounded by edges that are shared with the bottom portion of middle structural support members 146-1 and 146-4 and a middle portion of a bottom middle structural support member 149-1. On the right side 109 of the container 100, the reinforcing seal 127 is formed by sealed portions that are bounded by edges that are shared with the bottom portion of middle structural support members 146-2 and 146-3 and a middle portion of a bottom middle structural support member 149-2.

In the front portion of the structural support frame 140, the upper end of the middle structural support member 146-1 is a free end (not connected to another structural support member) disposed toward one side 109 of the container 100, curving laterally inward; the lower end of the middle structural support member 146-1 is joined to the left end of the bottom structural support member 148-1; the right end of the bottom structural support member 148-1 is joined to the lower end of the middle structural support member 146-2; and the upper end of the middle structural support member 146-2 is a free end (not connected to another structural support member) disposed toward another side 109 of the container 100, curving laterally inward. The structural support members 146-1, 148-1, and 146-2, together surround substantially all of the panel 180-1, except for a gap between the upper end of the middle structural support member 146-1 and the upper end of the middle structural support member 146-2, which are not connected by a structural support member, to provide an unobstructed pathway for the flow channel 159. In various embodiments, any portion of the front panel of a flexible container can be surrounded by a plurality of structural support members.

Similarly, in the back portion of the structural support frame 140, the left end of the top structural support member 144-2 is joined to the upper end of the middle structural support member 146-4; the lower end of the middle structural support member 146-4 is joined to the left end of the bottom structural support member 148-2; the right end of the bottom structural support member 148-2 is joined to the lower end of the middle structural support member 146-3; and the upper end of the middle structural support member 146-3 is joined to the right end of the top structural support member 144-2. The structural support members 144-2, 146-2, 148-2, and 146-2, together surround all of the panel 180-2. In various embodiments, any portion of the back panel of a flexible container can be surrounded by a plurality of structural support members.

In the structural support frame 140, the ends of the structural support members, which are joined together, are directly connected, around the periphery of their walls, such that their expanded structural support volumes are in fluid communication. However, in various alternative embodiments, any of the structural support members 144-2, 146-1, 146-2, 146-3, 146-4, 148-1, 148-2, 149-1, and 149-2 can be joined together in any way desired.

In alternative embodiments of the structural support frame 140, adjacent structural support members can be combined into a single structural support member, wherein the combined structural support member can effectively substitute for the adjacent structural support members, as their functions and connections are described herein. In other alternative embodiments of the structural support frame 140, one or more additional structural support members can be added to the structural support members in the structural support frame 140, wherein the expanded structural support frame can effectively substitute for the structural support frame 140, as its functions and connections are described herein. Also, in some alternative embodiments, a flexible container may not include a base structure made of structural support members, but may include an attached (or detachable) base structure made from one or more rigid elements, as known in the art.

IV. Process of Making Flexible Containers Using the Process and Apparatus for Performing a Task in Registration with a Seal.

Figure 10:
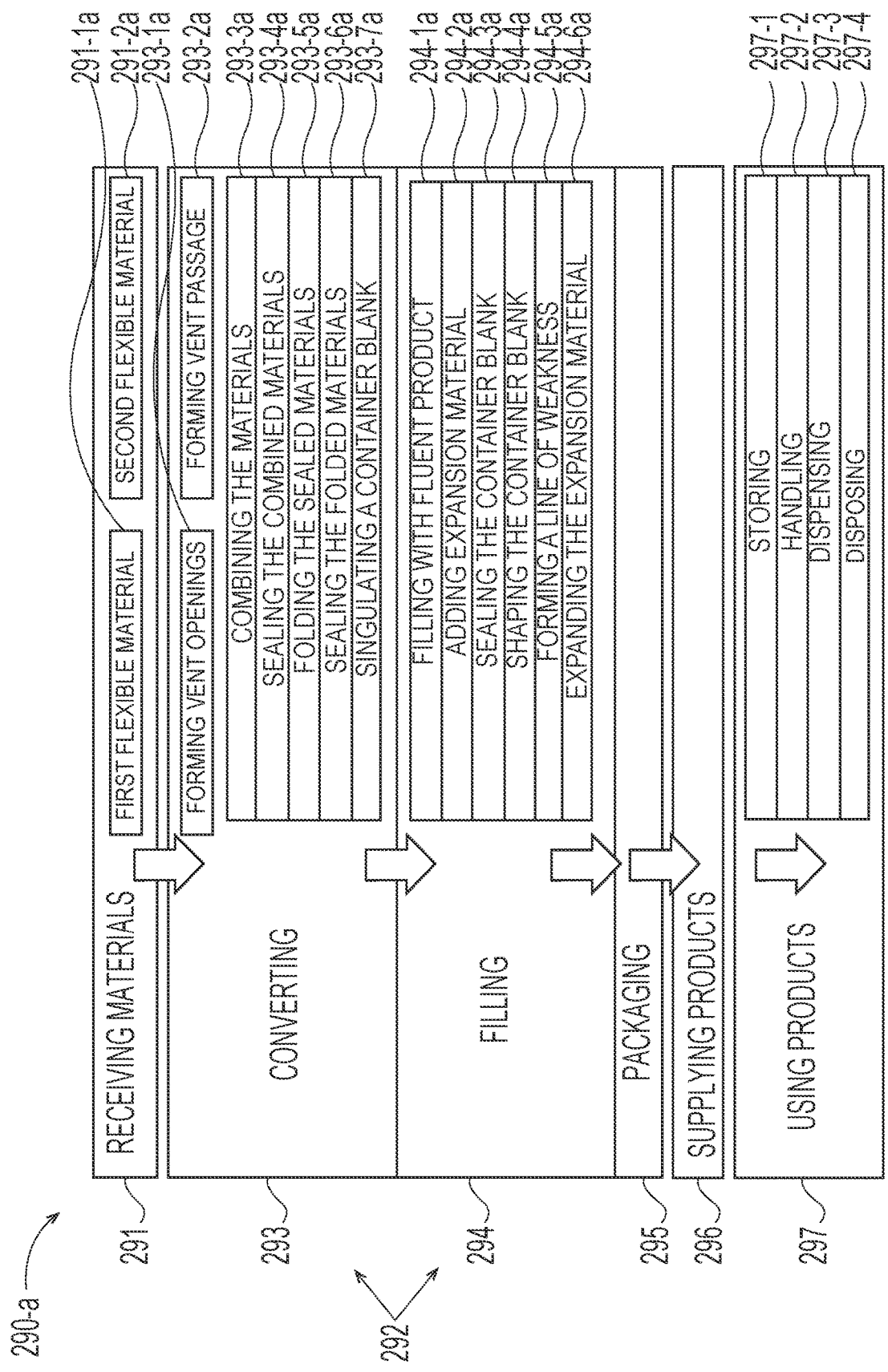
FIG. 10 is a flowchart illustrating a process of how a flexible container is made, supplied, and used.

FIG. 10 is a flowchart illustrating a process 290-a of how a product in a flexible container is made, supplied, and used. The process 290 begins with receiving materials 291, then continues with the making 292 of the flexible container filled with fluent product, followed by supplying 296 the finished flexible container filled with the fluent product, and finally ends with one or more end users using 297 the product. In FIG. 10, the processes are performed from top to bottom in the order listed and/or with arrows illustrating the flow from one process to another.

The receiving 291 of materials includes receiving a first flexible material 291-1a and a second flexible material 291-2a, which are used in the making 292 of the flexible container; however, in various embodiments, any number of flexible materials may be received, for use in making a flexible container. The first flexible material 291-1a and/or the second flexible material 291-2a can be any kind of suitable flexible material, as disclosed herein or as known in the art of flexible containers. The first flexible material 291-1a can be received from feed unit one 291-1b, and the second flexible material 291-2a can be received from feed unit two 291-2b, as described in connection with the embodiment of FIG. 11. The first flexible material 291-1a and the second flexible material 291-1b can correspond to the first and second materials 22 and 24, respectively, in FIG. 1. In alternative embodiments, the receiving 291 of materials can also include receiving one or more semi-rigid, or rigid materials (e.g. reinforcing elements) and/or components (e.g. a dispenser), which can also be added to the flexible materials in the process of making 292 the flexible container. The receiving 291 of materials also includes receiving one or more fluent products with which product space(s) of the flexible container can be filled. The receiving 291 of materials further includes receiving one or more expansion materials with which structural support volume(s) of the flexible container can be expanded, as disclosed herein.

The making 292 includes the processes of converting 293, filling 294, and (optionally) packaging 295. The converting 293 process is the process of transforming one or more flexible materials and/or components into one or more (partially or fully completed) container blanks, as described herein. In the embodiment of FIG. 10, the converting 293 includes the following processes performed in order: forming 293-1a vent openings, forming 293-2a a vent passage, combining 293-3a the flexible materials, sealing 293-4a the combined flexible materials, folding 293-5a the sealed flexible materials, further sealing 293-6a the folded flexible materials, and singulating 293-7a the flexible materials to form a partially completed container blank.

For any or all of the converting 293 processes described below, if the flexible materials are discrete sheets, then before or while the process is performed, the process may include aligning the flexible materials in the lateral direction (X-axis) and/or the longitudinal direction (Y-axis) and/or Z-axis direction of the flexible container being made. For any or all of the converting 293 processes described below, if the flexible materials are continuous webs, and for any of the filling 294 processes described below, then before or while the process is performed, the process may include aligning the flexible materials in the machine direction (MD) and/or the cross direction (CD) and/or the face direction (FD) of the converting processes. Such aligning (e.g. registration) may be performed any number of times, intermittently and/or continuously with respect to absolute or relative references on the flexible material(s), on the (partially or fully completed) container blank(s), and/or on the equipment performing the process(es), in any workable way known in the art. As examples, references on flexible materials and/or container blanks may be in any of the following forms: part, parts, or all of any artwork (e.g. graphics, branding, and/or visual elements), reference marks, or physical features such as cuts and seals, disposed on one or more portions of the flexible material(s) that form the flexible container or disposed on one or more portions of the flexible material(s) that are trimmed away during the making 292 of the flexible container.

The converting 293 process may also include the process of forming 293-1a one or more vent openings in the first flexible material 291-1a, for use with a vent passage in the flexible container. In the embodiment of FIG. 10, the forming 293-1a of the one or more vent openings includes forming a plurality of holes through a portion of the first flexible material 291-1a at a location in between a vent passage and a product space in the flexible container being made. The vent openings can at least assist in providing fluid communication between a headspace in the flexible container and an environment outside of the flexible container. The forming 293-1a of the vent openings can be performed by using forming unit one 293-1b as described in connection with the embodiment of FIG. 11. In an alternative embodiment, a first flexible material may be supplied to the converting 293 process, with one or more vent openings already formed in the first flexible material, so long as the holes or other openings can be located and aligned to subsequent processing. In another alternative embodiment, a process of forming vent openings may be omitted from the converting 293; for example, such forming may not be required for a flexible container that does not include a flexible dispenser with a vent passage.

The converting 293 process may include the process of forming 293-2a a vent passage on the second flexible material 291-2a, for use with a flexible dispenser in the flexible container. In the embodiment of FIG. 10, the forming 293-2a of the vent passage includes forming one or more stand-offs on one or more portions of the second flexible material 291-2a at one or more locations that correspond with an interior of a vent passage in the flexible container being made. The stand-offs can at least assist in providing (continuous or intermittent) separation between the flexible materials and thus can improve the flow of air through the vent passage. The forming 293-2a of the vent passage can be performed by using forming unit two 293-2b as described in connection with the embodiment of FIG. 11. Additionally or alternatively, but for the same purpose, the converting 293 process can include the process of forming stand-offs on the first flexible material, at one or more locations that correspond with the interior of the vent passage in the flexible container being made.

In various embodiments, the process of forming 293-1a one or more vent openings and the process of forming 293-2a a vent passage may be performed in order, or in reverse order, or at the same time, or at overlapping times.

The converting 293 process further includes the process of combining 293-3a the first flexible material 291-1a with the second flexible material 291-2a to form combined flexible materials in preparation for subsequent processing. In the embodiment of FIG. 10, the process of combining 293-3a is performed after the process of forming 293-1a the vent opening(s) and after the process of forming 293-2a the vent passage with one or more vent stand-offs. In the embodiment of FIG. 10, the combining 293-3a of the flexible materials includes bringing the first flexible material 291-1a and the second flexible material 291-2a into direct, face-to-face contact with each other, by positioning/moving/directing either or both of the materials. The combining 293-3a includes bringing the flexible materials together so they are aligned with each other, in particular, so that the formed vent passage (with the vent stand-offs) and the formed vent openings are appropriately aligned with each other in fixed relation and the vent openings create fluid communication between the vent passage and the headspace of the flexible container being made, as described in connection with the embodiments of FIGS. 13, 14, and 15. Aligning the vent stand-offs and the vent openings in fixed relation, ensures that the vent stand-offs and the vent openings are set in their correct positions (relative to each other and relative to other structures) when the flexible materials are permanently connected (e.g. sealed together) by downstream processing, such that the vent works properly in the finished flexible container. The combining 293-3a can be performed by using a combining unit 293-3b, as described in connection with the embodiment of FIG. 11. Alternatively, if a single flexible material is used in place of the first and second flexible materials, then a combining process may be replaced by a process of folding the single material onto itself, to bring its portions into contact with each other in preparation for subsequent processing.

The converting 293 process includes the process of locally sealing 293-4a the combined flexible materials by sealing portions of the first flexible material 291-1a to portions of the second flexible material 291-2a to form sealed flexible materials. In the embodiment of FIG. 10, the local sealing 293-4a of the combined flexible materials includes creating seals that are permanent connections between the first flexible material 291-1a and the second flexible material 291-2a, while the materials are in aligned contact with each other, such as the alignment provided as part of the combining 293-3a, as described above. The local sealing 293-4a is performed before the combined flexible materials are folded, so the local sealing 293-4a is used to form the seals that connect a single layer of the first flexible material 291-1a to a single layer of the second flexible material 291-2a. In the embodiment of FIG. 10, the local sealing 293-4a creates at least the following seals for the flexible container being made: first, in the front of the flexible container being made, a front panel seal in a closed shape that defines the periphery of a front panel of the flexible container as well as at least parts of the inside edges of structural support volumes around the front panel; second, on the bottom of the flexible container being made, a bottom panel seal in a closed shape that defines the periphery of a bottom panel of the flexible container as well as at least parts of the inside edges of structural support volumes around the bottom panel; third, in the back of the flexible container being made, a back panel seal in a closed shape that defines the periphery of a back panel of the flexible container as well as at least parts of the inside edges of structural support volumes around the back panel; and fourth, in parts of the bottom of the flexible container being made, portions of a reinforcing seal that defines at least parts of the edges of structural support volumes in the bottom.

The eye mark can be formed at any of the sealing steps described herein. An eye mark, or more than one eye mark, can be formed at only one of the sealing steps described herein. Alternatively, one or more eye marks can be formed at more than one of the sealing steps described herein. Typically, the eye mark(s) will be formed at the same time as the discrete seal with relation to which it is desired to register a task in a subsequent operation.

The local sealing 293-4a can be performed by using sealing unit one 293-4b, as described in connection with the embodiment of FIG. 11. Additionally or alternatively, for forming at least some seals, the converting process 293 can include the process of joining portions of the first flexible material to portions of the second flexible material using adhesive and/or other joining chemistries. Alternatively, if a single flexible material is used in place of the first and second flexible materials, then a local sealing process may be replaced by a process of sealing portions of the single material to itself in preparation for subsequent processing.

The converting 293 process also includes the process of folding 293-5a the locally sealed flexible materials after the local sealing 293-4a to form folded flexible materials. In the embodiment of FIG. 10, the folding 293-5a of the locally sealed flexible materials includes creating a gusseted structure from the combined flexible materials, while these materials are locally sealed to each other. The folding 293-5a is performed before the combined flexible materials are further sealed, so the folding 293-5a is used to arrange the combined first flexible material 291-1a and second flexible material 291-2a into a gusseted structure with portions that are four or eight layers thick. In the embodiment of FIG. 10, the folding 293-5a creates at least the following gussets in the flexible container being made: first, in the bottom of the flexible container being made, a bottom gusset having a front bottom folded gusset leg and a back bottom folded gusset leg; second, in the top of the flexible container being made, a top gusset having a front top open gusset leg and a back top folded gusset leg. The folding 293-5a can be performed by using folding unit 293-5b, as described in connection with the embodiment of FIG. 11.

The converting 293 process further includes the process of locally sealing 293-6a the folded flexible materials by sealing portions of the first flexible material 291-1a to portions of the second flexible material 291-2a to form further sealed flexible materials. In the embodiment of FIG. 10, the local sealing 293-6a of the folded flexible materials includes creating seals that are permanent connections between adjacent layers of the first flexible material 291-1a and/or the second flexible material 291-2a, while the materials are in folded condition (e.g. forming a gusseted structure), having portions with four layers or eight layers. The local sealing 293-6a is performed before the combined flexible materials are singulated; however, in various alternative embodiments this local sealing can be performed after the combined flexible materials are singulated. In the embodiment of FIG. 10, the local sealing 293-6a creates at least the following seals for the flexible container being made: first, in parts of the bottom of the flexible container being made, bottom portions of an outside seal (through eight layers) that define at least parts of the outside edges of structural support volumes in the bottom parts; second, in parts of the middle of the flexible container being made, middle portions of an outside seal (through four layers) that define at least parts of the outside edges of structural support volumes in the middle parts; third, in parts of the top of the flexible container being made, top portions of an outside seal (through four layers and eight layers) that define at least parts of the outside edges of structural support volumes in the top parts; and fourth, in parts above the top of the flexible container being made, portions of trim seal (through four layers) that connect portions of the flexible materials that are subsequently trimmed away. The local sealing 293-6a can be performed by using sealing unit two 293-6b, as described in connection with the embodiment of FIG. 11. Additionally or alternatively, the converting process 293 can include some steps of joining portions of adjacent layers of flexible material using adhesive and/or other joining chemistries (that is, using non-autogenous seals). Alternatively, if a single flexible material is used in place of the first and second flexible materials, then a local sealing process may be replaced by a process of sealing portions of the single material to itself in preparation for subsequent processing.

The local sealing step can, as described in conjunction with FIGS. 1-4, simultaneously form: (i) at least one discrete seal between the first and second materials 22 and 24 (which may correspond to first and second materials 291-1a and 291-2a, respectively, in FIG. 10) in an overlapping region of the same; and (ii) an eye mark 60 in at least one of the first and second materials. The eye mark has edges 62 that are sufficiently well-defined so that they can be located with a detection device, and since the discrete seal and the eye mark 60 are formed simultaneously, the eye mark 60 is registered with the discrete seal 56. As shown in FIG. 15, in the method of making flexible containers, one or more eye marks, such as 60A, 60B, 60C, and 60D, can be formed simultaneously with local sealing 293-6a by sealing unit two 293-6b which sealing unit forms first and second portions 346-1 and 346-2, respectively, of the second seal (as further described below). In such a case, the second seal comprises the discrete seal described herein.

The converting 293 process further includes the process of singulating 293-7a the folded and sealed flexible materials by separating portions of the flexible materials to form partially completed container blanks. In the embodiment of FIG. 10, the singulating 293-7a of the flexible materials includes cutting away a single, partially completed container blank to separate the blank from surrounding portions of the flexible materials and to prepare the container blank for the filling process 294. In the embodiment of FIG. 10, the singulating 293-7a results in partially completed container blanks that are complete except for the further changes made in the filling process 294. In various embodiments, singulating can result in a container blank having various degrees of completeness. The singulating 293-7a includes cutting away the blank with precision cutting that also effectively trims away portions of the excess flexible materials; however, this is not required and, in various embodiments, the singulating may be a rough cut process with trimming performed as a separate, subsequent process. The singulating 293-7a can be performed by using a singulating unit 293-7b, as described in connection with the embodiment of FIG. 11.

The flexible materials may also have optional enlarged "transfer holes" 78A and 78B formed therein as shown in FIG. 15. These transfer holes 78A and 78B may be formed during the singulation process. The transfer holes 78A and 78B may be provided for the dual purposes of transporting the singulated container blanks and locating the CD-direction package position of the singulated container blanks. The transfer holes 78A and 78B may be laser cut along with the laser singulation cut. The location of the transfer holes 78A and 78B may be based on the location of the eye mark(s). In some cases, the transfer holes 78A and 78B can formed in the same area as the upper eye marks, such as eye marks 60A and 60B (since once the laser cuts are made, the eye marks may no longer be necessary). The container blanks can be held by and transferred by rod-shaped projections that are substantially thinner than the diameter of the transfer holes 78A and 78B. The transfer holes 78A and 78B locate the container blank position for subsequent steps such as: the product filling, inflation of the structural support frame, and formation of the valve seal. The container blanks can be transferred with an initially high degree of variation via large transfer holes. The container blank can then settle on the curved upper edge of the transfer holes 78A and 78B in order the center the container blank to a much tighter position tolerance.

For the transfer hole creation, it is desirable to avoid formation of a "chad" or small piece of plastic scrap in order to preserve general manufacturing cleanliness around the equipment and to avoid product contamination. One way of creating a through hole with no chad is to have the laser cut follow a spiral line (as shown in conjunction with transfer hole-to-be formed 78A) to vaporize all the plastic in the region for the hole as opposed to forming a cut having a configuration that leaves a chad remaining. This enables a complete hole to be created with no physical waste left behind. Another way of vaporizing all the plastic in the region of the hole is by forming a series of concentric circular cuts that start with a small inner circle, followed by circular cuts that become progressively larger as the outer circular cuts are formed.

In some embodiments of making a flexible container, the converting process and the filling process may not be performed as part of a continuous sequence; for example, partially completed container blanks from the converting can be accumulated in any number and for any length of time before being filled. And, in some embodiments, the converting process and the filling process may not be performed at the same location; for example, partially completed container blanks can be converted at one location and then shipped to another location for filling. Further, any of the processes for making flexible containers, as described herein, can be performed using any kind of manufacturing set-up known in the art.

In addition to the converting 293, the making 292 includes the process of filling 294. The filling 294 process is the process of transforming one or more (partially or fully completed) container blanks into filled flexible containers, which are ready for packaging, supply, and use, as described herein. In the embodiment of FIG. 10, the filling 294 includes the following processes performed in order: filling 294-1a the container blank with fluent product(s), adding 294-2a expansion material(s) to the container blank, sealing 294-3a the container blank, shaping 294-4a the container blank, forming 294-5a a line of weakness in the container blank, and expanding 294-6a the expansion material(s) in the container blank.

The filling 294 process includes the process of filling 294-1a the partially completed container blank from the converting 293 with one or more fluent products for the filled flexible container. In the embodiment of FIG. 10, the filling 294-1a of the container blank includes dispensing a particular amount of the fluent product(s) into a space that becomes the product space within the flexible container being made. The filling 294-1a of the container blank can be performed by using filling unit 294-1b as described in connection with the embodiment of FIG. 11.

The filling 294 process also includes the process of adding 294-2a to the filled container blank one or more expansion materials to be used in the flexible container being made. In the embodiment of FIG. 10, the process of adding 294-2a the expansion material(s) is performed after the process of filling 294-1a with the fluent product(s). Any kind of expansion material(s) disclosed herein may be added as part of the process of adding 294-2*a* the expansion material(s). In the embodiment of FIG. 10, the adding 294-2*a* of the expansion material(s) includes dispensing a particular amount of liquid nitrogen into a space that becomes one or more structural support volumes of a structural support frame within the flexible container being made. The space that becomes the structural support volume(s) is separate from the space that becomes the product space. The adding 294-2*a* of the expansion material(s) can be performed by using dosing unit 294-2*b* as described in connection with the embodiment of FIG. 11.

The filling 294 process further includes the process of locally sealing 294-3*a* the filled container blank by sealing portions of the first flexible material 291-1*a* to portions of the second flexible material 291-2*a* to finish sealing the filled container blank. In the embodiment of FIG. 10, the local sealing 294-3*a* of the filled container blank includes creating seals that are permanent connections between adjacent layers of the first flexible material 291-1*a* and/or the second flexible material 291-2*a*, while the materials are in the form of a folded and sealed gusseted structure. The local sealing 294-3*a* is performed before the combined flexible materials are shaped; however, in various alternative embodiments this local sealing can be performed after the combined flexible materials are shaped. In the embodiment of FIG. 10, the local sealing 294-3*a* creates at least the following seals for the flexible container being made: first, in parts of the top of the flexible container being made, top portions of an outside seal (through four layers) that define at least parts of the edges of structural support volumes in the top parts; second, in parts of the top of the flexible container being made, a cap seal (through four layers) that seals off the product space by enclosing a dispenser opening; and third, in parts of the top of the flexible container being made, a tab seal (through four layers) that joins together the layers of flexible materials, to create a sealed-through structure of films that is suitable for use as a tear tab with portion(s) to be torn off by an end user. The local sealing 294-3*a* can be performed by using sealing unit three 294-3*b*, as described in connection with the embodiment of FIG. 11.

The filling 294 process includes the process of shaping 294-4*a* the filled container blank by cutting away portions of the flexible material(s) to finish forming the overall shape of the flexible materials of the filled container blank. In the embodiment of FIG. 10, the shaping 294-4*a* of the filled container blank includes precision cutting that trims away portions of the excess flexible materials. The shaping 294-4*a* is performed after the container blank is finally sealed; however, in various alternative embodiments this shaping can be performed before the container blank is finally sealed. In the embodiment of FIG. 10, the shaping 294-4*a* creates parts of the top of the flexible container being made, including the shape of the top and sides of the tear tab and its tear off portion(s). The shaping 294-4*a* can be performed by using shaping unit three 294-4*b*, as described in connection with the embodiment of FIG. 11.

The filling 294 process may also include the process of forming 294-5*a* a line of weakness in the filled container blank by scoring and/or partially cutting part, parts, or all of (either or both sides of) the flexible material(s) to at least assist in enabling the tear tab and its tear off portion(s) to be torn off by an end user. The forming 294-5*a* is performed after the container blank is shaped; however, in various alternative embodiments this forming can be performed before the container blank is shaped or at the same time that the container blank is being shaped. The forming 294-5*a* of the line of weakness can be performed by using scoring unit 294-5*b*, as described in connection with the embodiment of FIG. 11. In an alternative embodiment, the forming of the line of weakness may be combined with the local sealing 294-3*a*, by forming a weakening seal along the line of weakness. In another alternative embodiment, forming of the line of weakness may be omitted from the filling 294; as an example, a line weakness may not be required if the flexible materials can be easily torn off without scoring or partially cutting; as another example, a line of weakness may not be required for a flexible container that is designed to be opened in another way.

The filling 294 process also includes the process of expanding 294-6*a* the one or more expansion materials in the filled container blank, such that the structural support volume(s) are expanded and the flexible container takes its final overall shape. The expanding 294-6*a* can begin at any time after the adding 294-2*a* of the expansion material(s) has begun and the expanding can end any time at or after the sealing 294-4*a* has finally sealed the structural support volume(s) and the flexible container is unconstrained from taking its final overall shape. In the embodiment of FIG. 10, the process of expanding 294-6*a* occurs automatically since the (refrigerated) liquid nitrogen naturally evaporates at ambient temperature and expands into gaseous form; thus, no separate equipment is required to cause this expansion. However, in alternative embodiments, the expanding may be partly or fully caused (or at least induced) by an activation process, such as the application of heat and/or pressure, which can cause a chemical reaction within the expansion materials, leading to their expansion.

The packaging 295 process includes placing the filled flexible container (i.e. the product), from the filling 294, into one or more packages (e.g. cartons, cases, shippers, etc.) as known in the art of packaging. In various embodiments of the process 290-*a*, the packaging 295 process may be omitted.

The process 290-*a* includes supplying 296 the product, which includes transferring the product from the making 292 through one or more distribution channel(s) to product purchasers and/or end users. The using 297 of the product can include the processes of storing 297-1 the filled flexible container, handling 297-2 the filled flexible container, dispensing 297-3 fluent product(s) from the flexible container, and disposing 297-4 of the used flexible container, as described herein and as known in the art.

In various embodiments, parts, or all of the process 290-*a* can be used to make filled flexible containers according to embodiments of the present disclosure. In various alternative embodiments: part, parts, or all of one or more of the processes within the making process 290 (including converting 293, filling 294, and packing 295) can be performed in various orders, at separate times, at overlapping times, or at the same time, in any workable way; part, parts, or all of one or more of the processes within the making process 290 can be can be performed as a continuous process, or as intermittent processes, or as a combination of continuous and intermittent processes; part, parts, or all of one or more of the processes within the process 290 can be can be performed in multiple steps; part, parts, or all of one or more of the processes within the overall process 290 can be omitted; part, parts, or all of one or more of the processes within the overall process 290 can be modified according to any process known in the art of processing flexible materials; and additional and/or alternative steps known in the art of processing flexible materials can be added to the process 290. In addition, any part or parts of one or more of any of the making 290 processes can be performed according to any of the embodiments for making flexible containers disclosed in: U.S. patent application Ser. No. 13/957,158 filed Aug. 1, 2013, entitled "Methods of Making Flexible Containers," published as US 2014/0033654; and/or U.S. patent application Ser. No. 13/957,187 filed Aug. 1, 2013, entitled "Methods of Making Flexible Containers," published as US 2014/0033654; in any workable combination.

Figure 11:
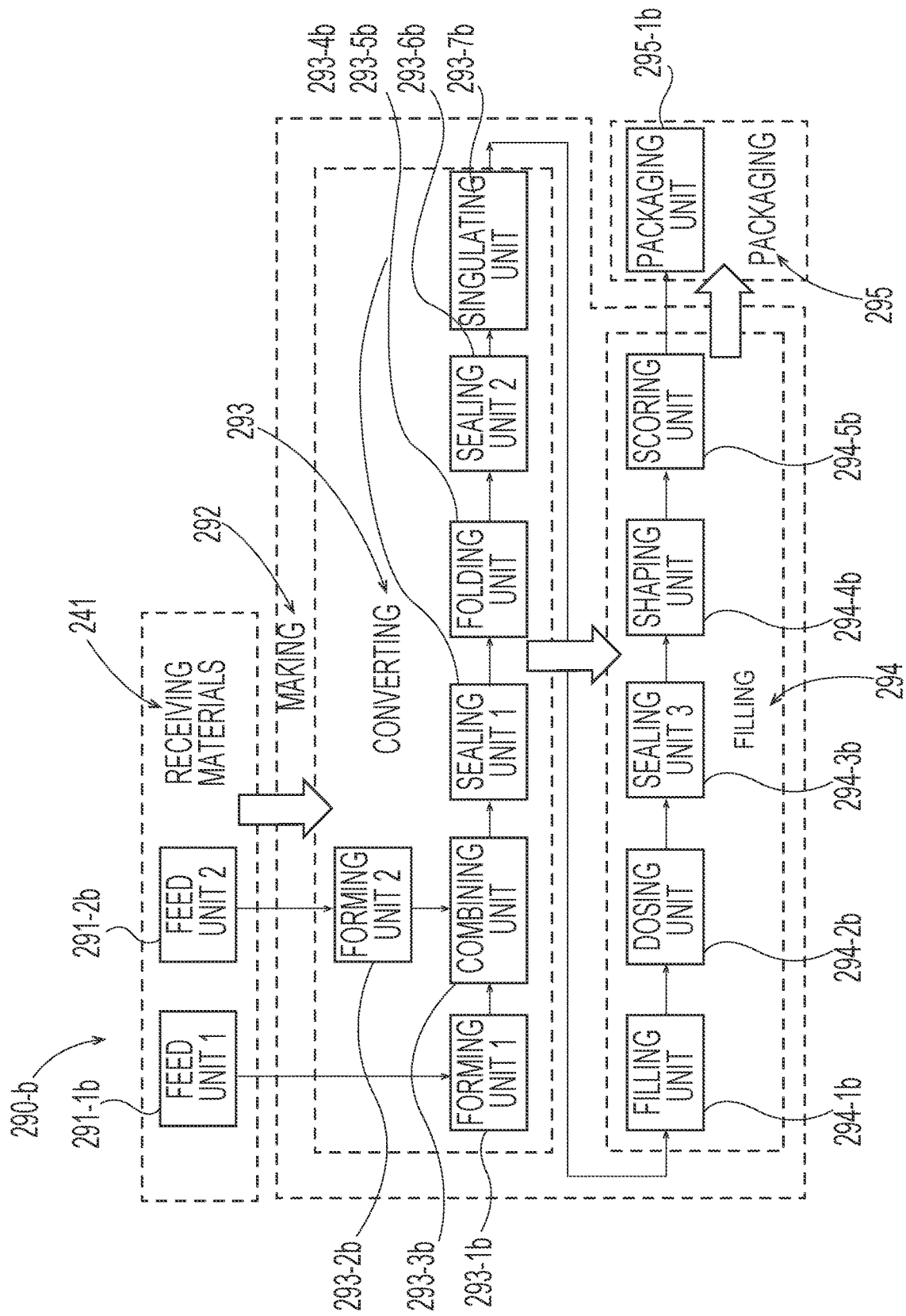
FIG. 11 is a block diagram illustrating equipment used to make a flexible container.

FIG. 11 is a block diagram illustrating equipment used to make a flexible container. The equipment of FIG. 11 is grouped according to processes described and illustrated in connection with the embodiment of FIG. 10, including the processes of receiving 291 flexible materials, making 292 the flexible container (by converting 293 and filling 294), and packaging 295 the filled flexible container. In FIG. 11, the flexible materials used to form the flexible container move through the equipment units according to the arrows in the figure.

In various embodiments, any of the equipment units in FIG. 11 can be manually operated equipment units, or semi-automatic equipment units, or fully automatic equipment units; alternatively, any of the equipment units in FIG. 11 can be replaced by a hand-making station, where processing is performed by one or more people using hand-operated tools. In various embodiments: any of the equipment units in FIG. 11 can be configured to make flexible containers from discrete sheets of flexible material or from continuous webs of flexible material; any of the equipment units in FIG. 11 can be configured to manually, or semi-automatically, or automatically transfer their output to one or more subsequent equipment units (e.g. by using one or more holders, clamps, trays, pucks, etc.); any of the equipment units can be configured to process a stationary flexible material (e.g. using a reciprocating action on a stationary sheet) and any of the equipment units can be configured to process a moving flexible material (e.g. using a repeating/recirculating/rotating motion on a moving web); any of the equipment units can be a stand-alone unit or connected directly or indirectly to one or more of the other equipment units, with each connected equipment unit becoming a unit operation within a larger machine. Any of these embodiments can be combined together in any workable combination.

In various alternative embodiments, the flow of flexible material(s) through some or all of the equipment units in FIG. 11 can be changed in any of the following ways: the flexible material(s) can flow through the equipment units in a different order (in series and/or in parallel), including any order that corresponds with an alternative order of processing mentioned in connection with the embodiment of FIG. 10; one or more of the equipment units can be combined, including any combinations that correspond with a combination of processing mentioned in connection with the embodiment of FIG. 10; one or more of the equipment units can be modified, including any modifications that correspond with a modification of processing mentioned in connection with the embodiment of FIG. 10; and one or more of the equipment units can be omitted, including any omissions that correspond with an omission of processing mentioned in connection with the embodiment of FIG. 10.

In FIG. 11, feed unit one 291-1*b* and feed unit two 291-1*b* correspond with the process of receiving 291, as described in connection with the embodiment of FIG. 10. The first flexible material 291-1*a* is received from feed unit one 291-1*b* and the second flexible material 291-2*a* is received from feed unit two 291-2*b*. Either or both of these feed units can take any of the following forms: an unwind stand (for continuous webs of flexible material), a sheet feeder (for discrete sheets of flexible material), or any other kind of equipment known for providing/feeding flexible materials.

In FIG. 11, forming unit one 293-1*b*, forming unit two 293-2*b*, a combining unit 293-3*b*, sealing unit one 293-4*b*, a folding unit 293-5*b*, sealing unit two 293-6*b*, and a singulating unit 293-7*b* all correspond with the process of converting 293, as described in connection with the embodiment of FIG. 10. The first flexible material 291-1*a* from feed unit one 291-1*b* is provided to forming unit one 293-1*b*, which can take any of the following forms: mechanical equipment for cutting, piercing, and/or punching, laser cutting equipment, water jet cutting equipment, or any other kind of equipment known in the art for forming openings through a flexible material, as described herein. The second flexible material 291-2*a* from feed unit two 291-2*b* is provided to forming unit two 293-2*b*, which can take any of the following forms: embossing equipment, stamping equipment, laser etching equipment, printing equipment, or any other kind of equipment known in the art for forming stand-off structures on a flexible material, as described herein. The formed first flexible material from forming unit one 293-1*b* and the formed second flexible material from forming unit two 293-2*b* are provided to the combining unit 293-3*b*, which can take any of the following forms: a web guide (active or passive, with rollers and/or boards), a jig, or any other kind of equipment known in the art for bringing flexible materials into aligned, direct, face-to-face contact, as described herein. The combined flexible materials from the combining unit 293-3*b* are provided to sealing unit one 293-4*b*, which can take any of the following forms: a conductive sealer (e.g. hot bar, or sealing plates), an impulse sealer, an ultrasonic sealer, a laser sealer, or any other kind of equipment known in the art for forming permanent connections between flexible materials, as described herein. The sealed flexible materials from sealing unit one 293-4*b* are provided to the folding unit 293-5*b*, which can take any of the following forms: folding boards, folding surfaces, folding fingers, folding bars, rollers, etc. or any other kind of equipment known in the art for forming folds in flexible materials, as described herein, including any folding equipment described in: U.S. patent application Ser. No. 14/534,210 filed Nov. 6, 2014, entitled "Flexible Containers and Methods of Forming the Same," published as US 2015/0125099; and U.S. patent application Ser. No. 15/148,395 filed May 6, 2015, entitled "Methods of Forming Flexible Containers with Gussets."

The folded flexible materials from the folding unit 293-5*b* are provided to sealing unit two 293-6*b*, which can take any of the forms suitable for sealing unit one 293-4*b*. If sealing plates are used at sealing unit two 293-6*b*, it has been found that sealing plates work best when they are parallel to each other to ensure consistent contact across the sealing plates. When the seal surface is not a common thickness due to material layer differences (e.g., where different portions of the material to be sealed vary between 2, 4, 6, or 8 layers thick), a high force gradient is created across the sealing plates at the thicker material points. This force gradient can locally deflect or bend the sealing plates resulting in uneven seals. To overcome this problem, air cylinders can be used which are loaded to various pressures to help keep the sealing plates parallel. Alternatively, the sealing plates can be kept parallel to each other using springs having different spring stiffnesses across the length of a sealing plate. Air cylinders, however, offer the advantage of decoupling the sealing force from the seal plate deflection. That is, unlike springs, air cylinders can apply a constant seal force regardless of sealing plate deflection.

The further sealed flexible materials from sealing unit two 293-6*b* are provided to the singulating unit 293-7*b* (for separating the web into individual package blanks). The singulation step can be carried out using any suitable mechanism for separating the web into individual container blanks. The singulating unit 293-7*b* can take any of the following forms: mechanical equipment for cutting (e.g. die-cutting), and/or shearing, laser cutting equipment, water jet cutting equipment, or any other kind of equipment known in the art for cutting flexible material, as described herein. In some embodiments, the singulation step can be carried out using laser cutting equipment. In some cases, the technology used may be referred to as laser cutting on-the-fly. This process requires an extremely high level of precision and speed, placing high demands on the laser. The laser machine must be designed for continuous industrial use, while producing precise cuts. To enable the precision cutting, the laser requires position feedback of the cut part that is "on-the-fly" or moving (in this case, the moving web of flexible material). The laser can also be used for carrying out the following operations "on-the-fly": marking, scoring, perforating, or the like.

In addition, in some embodiments, the stretching of the flexible webs may result in variability in the seal pitch (that is, the distance between portions of the second seal (e.g. first and second portions 346-1 and 346-2) from container blank to container blank). In such cases, it may be desirable to provide a detection system such as a machine vision system to identify the pitch error or centerline of every container blank (which is variable over time) after the formation of the second seal. This may also require that there be a mechanism for accommodating this variation in seal pitch when handling the individual package blanks that exit the singulating unit 293-7*b*.

Figure 20:
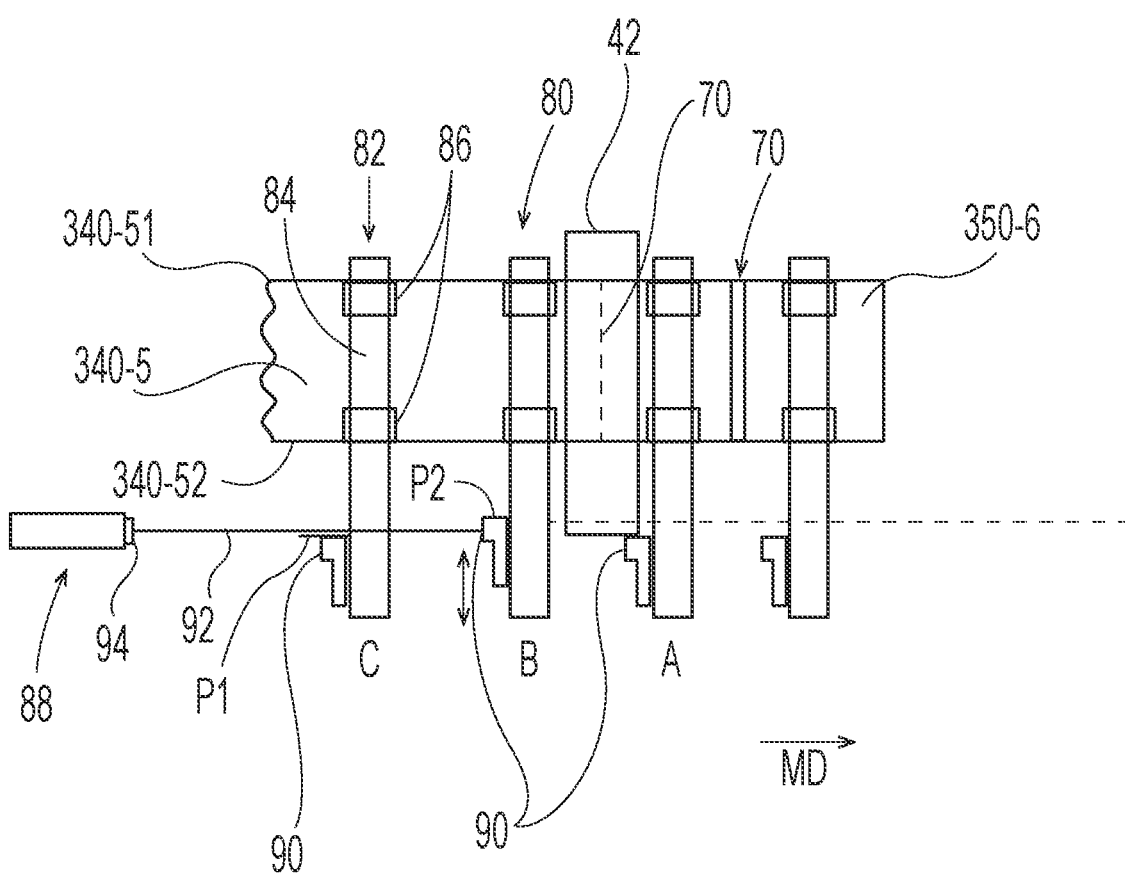
FIG. 20 is a fragmented schematic side view showing a system for laser cutting a moving web into discrete articles.

In such cases, it may be desirable to provide a gripping system during singulation ("singulation gripping system") that has a variable pitch capability. One suitable variable pitch gripping system can utilize a linear motor motion system (such as Rockwell Automation's iTRAK® intelligent track system). One non-limiting example of such a variable pitch gripping system 80 is shown in FIG. 20. The variable pitch gripping system (or "variable pitch gripper") 80 may comprise a plurality of carts 82 that comprise a chassis 84 that has a pair of grippers 86 joined thereto, such as one gripper to hold the web of flexible container blanks (such as in the form of gusseted structure 340-5) adjacent to the top edge 340-51, and one gripper to hold the web of flexible container blanks adjacent to the bottom edge 340-52. The carts 82 may travel in a circular track, a closed track, or a track having any other suitable configuration. After cutting the web of flexible material into individual container blanks, the carts 82 will carry the singulated flexible container blanks 350-6. The variable pitch gripper 80 may be capable of frequently changing pitch and velocity of the carts 82 based on process requirements. Thus, in some cases, the grippers 86 may each be of a fixed width and the pitch may be varied between adjacent container grippers 86, such as when the grippers holding a container blank 350-6 are sped up or slowed down relative to grippers 86 holding an adjacent container blank 350-6.

The variable pitch gripping system 80 may also be configured so that the grippers 86 are adjustable so that they can handle articles (e.g., container blanks) having the smallest and largest pitches therebetween that are expected to be encountered. In certain embodiments, the grippers 86 may have a repitchable front end (the front end is the end of the gripper 86 that is upstream in the machine direction) and a fixed back end (downstream end). In other embodiments, the grippers 86 may have a fixed front end and a repitchable back end. In still other embodiments, both ends of the grippers 86 may be repitchable. Providing adjustable grippers 86 may reduce the number of change parts for the converter instead of having change parts for the entire line for container size and shape changes. This enables container size and shape agility at minimal capital cost while maximizing process reliability due to reduced change overs. For example, such a configuration may allow container size and shape changes by only changing the components that form the valve seal and/or the third seal.

As discussed above, it is desirable to provide a detection system such as a machine vision system to identify the pitch error or centerline of every container blank (which may vary between successive container blanks and over time). The detection system can be present at any suitable location in the process, such as after the formation of the second seal. Such a detection system should provide this information to the variable pitch gripping system 80 so that the container blanks will be gripped in alignment with their centerlines before and after singulating the same. This can be used to ensure that there is minimal to zero error relative to the centerlines of the container blanks through the remainder of the process. Any suitable type of detection system can be used. Suitable detection systems may comprise (among other things) a camera that is used to determine the pitch based on the location of the eye mark(s), which is then used to ensure that the grippers 86 grip the web of material in alignment with their centerlines.

The position of the individual carts 82 may also need to be provided to the laser 42. This position feedback may be provided from the carts 82 to the laser 42 by an encoder. Encoders are electronic devices that are used to provide position versus time or speed feedback for various industrial machine applications. Typical carrier systems for carrying articles in manufacturing processes include a linear cart, motor driven belt or chain, where magnetic or optical encoders can be fixed on the carrier device. However, as discussed above, in a variable pitch gripping system 80, the carts 82 used to carry the singulated flexible container blanks may frequently change pitch and velocity based on process needs. In such a case, placing an encoder magnetic strip on the carts 82 will not meet the variable pitch needs of the current process (and in particular, the desire to be able to change the size and shape of the containers to be formed). Since the on-the-fly laser system must have a single continuous encoder feedback signal during the entire cut after the laser is triggered, each cart 82 must be able to provide a unique continuous encoder signal.

A novel position feedback system, as shown in FIG. 20, was developed for this process. As shown in FIG. 20, there are a plurality of carrier carts 82, which may be referred to as carts A, B, C, etc., that are gripping a portion of the web of flexible material. The web of flexible material is moving in the machine direction (MD) from left to right in FIG. 20. The feedback system comprises an encoder 88, such as a Renishaw HS20™ laser encoder available from Renishaw plc of Gloucestershire, United Kingdom. The Renishaw HS20™ laser encoder is a non-contact interferometric based encoder system for long axis, high accuracy, linear position feedback applications. The Renishaw HS20™ laser encoder obtains its information via laser feedback. The laser cutter 42 is shown schematically as positioned between the carrier carts. It should be understood, however, that the laser cutter 42 may be of any suitable size, provided that the laser beam is positionable between the carrier carts 82 to cut the web of flexible material. The laser cutter 42 may be stationary, or it may be movable inward and outward (perpendicular to the drawing sheet) to when cutting and when not cutting, respectively.

As shown in the drawing, a mirror 90 is placed on each of the carrier carts 82, carts A, B, C, etc. Each of the mirrors is movable from a first position P1 to a second position P2 (in the embodiment shown, the first position P1 is downward, and the second position P2 is upward). The second position P2 is in the path of the beam 92 from the encoder 88 to one of the mirrors when the mirror is in the second position. The mirror reflects the beam 92 back to a receiver 94 associated with the encoder 88. The mirror 90 is moved in the path of the beam 92 connected to the desired cart (A) where the cutting is taking place. As shown in FIG. 20, after the portion of the web associated with the (A) cart cut is done, then the (B) cart mirror 90 moves in front of the beam 92 while the container blank associated with B cart is being cut. Then C cart mirror 90 moves in front of the beam, etc. The laser cutting process and apparatus described herein provide the advantage that the (e.g., rapidly) moving web is capable of being cut in the desired locations, with cuts of the desired configuration, despite the fact that the pitch between the specific portions of the material to be cut varies. The cutting is, thus, able to match the velocity of the portion of the material that is being cut. Without such a system, the laser would likely produce a jagged cut and/or lose registration to the container blank.

In FIG. 11, a filling unit 294-1b, a dosing unit 294-2b, sealing unit three 294-3b, a shaping unit 294-4b, and a scoring unit 294-5b all correspond with the process of filling 294, as described in connection with the embodiment of FIG. 10. The partially completed container blank from the converting 293 is provided to the filling unit 294-1b, which, when the fluent product to be filled is a liquid, can take the form of any kind of liquid filling equipment (gravity fed and/or pressurized), such as a benchtop filler, an inline filler, a monoblock filler, a turret-based filler, an integrated filling system, or any other kind of equipment known in the art for filling containers with liquid, as described herein. In alternative embodiments wherein the fluent product to be filled is a pourable solid, a filling unit can take any of the following forms: a vibratory filler, a weigh filler, a volumetric filler, an auger filler, a piston filler, a tablet dispenser, a granules dispenser, or any other kind of equipment known in the art for filling containers with pourable solid material, as described herein. The filled container blank from the filling unit 294-1b is provided to the dosing unit 294-2b, which can take any of the forms suitable for the filling unit 294-1b, so long as the equipment includes an appropriate dispenser (e.g. for liquids, an elongated fill needle), which can dispense to a precise location within a container blank (e.g. an opening that leads to one or more structural support volumes). The filled and dosed container blank from the dosing unit 294-2b is provided to sealing unit three 294-3b, which can take any of the forms suitable for sealing unit one 293-4b. The sealed container blank from sealing unit three 294-2b is provided to the shaping unit 294-4b, which can take any of the forms suitable for the singulating unit 293-7b. The shaped container blank from the shaping unit 294-4b is provided to the scoring unit 294-5b, which can take any of the following forms: scoring equipment, perforating equipment, or cutting equipment, or any other kind of equipment known in the art for creating a line of weakness in flexible material.

In FIG. 11, a packaging unit 295-1b corresponds with the process of packaging 295, as described in connection with the embodiment of FIG. 10. The filled and finished flexible container (i.e. the product), from the filling 294 portion of the making 292 is provided to the packaging unit 295-1b, which can take any of the following forms: a cartoning system, a case packer (e.g. side-loading or top-loading), a robotic case packing system, a tray packer, a wrapper, a sleever, a palletizer, or any other kind of equipment for packaging flexible containers.

Thus, some or all of the equipment units in block diagram 290-b can be used to make filled flexible containers according to embodiments of the present disclosure.

FIGS. 12-19 illustrate flexible materials in various states of processing as they are being made into a filled and finished flexible container, as described herein. In the embodiments of FIGS. 12-19, the flexible materials are described and illustrated in the form of continuous webs although this is not required and the flexible materials may be processed in the same or similar manner, when either or both are provided as discrete sheets. In the embodiment of FIGS. 12-19, the flexible materials are illustrated with exaggerated thicknesses for the purpose of clearly showing different layers in relation to each other.

In the embodiments of FIGS. 12-19, a coordinate system 310, provides lines of reference for referring to directions in each of these figures. The coordinate system 310 is a three-dimensional Cartesian coordinate system with an MD-axis, a CD-axis, and a FD-axis, wherein each axis is perpendicular to the other axes, and any two of the axes define a plane. The MD-axis corresponds with an overall machine direction for equipment that is processing the flexible materials, if the flexible materials are provided in the form of a continuous web; a positive direction along the MD-axis points toward downstream processing and a negative direction along the MD-axis points toward upstream processing. The CD-axis corresponds with a cross-machine direction for equipment that is processing the flexible materials. The FD-axis corresponds with a face-direction that is typically about normal to one or more major surfaces of the flexible material during processing. In the embodiments of FIGS. 12-19, a disposition or direction toward the environment outside of the flexible container is generally referred to as outer or outward while a disposition or direction away from the outside environment is generally referred to as inner or inward.

In the embodiments of FIGS. 12-19, the MD-axis is about horizontal; however, this is not required, and, for each process, the coordinate system 310 can have any convenient orientation with respect to external references, such as horizontal and vertical directions. In the embodiments of FIGS. 12-19, the flexible materials are processed "side-saddle" such that, for the container being made, its lateral direction is about aligned with the MD-axis during processing; however this is not required, and for each process, either or both of the flexible materials may be processed in one or more of any convenient orientations. For example, in an alternative embodiment, the flexible materials may be processed "end-to-end" such that, for the container being made, its longitudinal direction is about aligned with the MD-axis during processing.

FIGS. 12-19 illustrate flexible materials being processed into a container blank by the converting 293 process of the making 292, as described in connection with the embodiment of FIG. 10.

Figure 12:
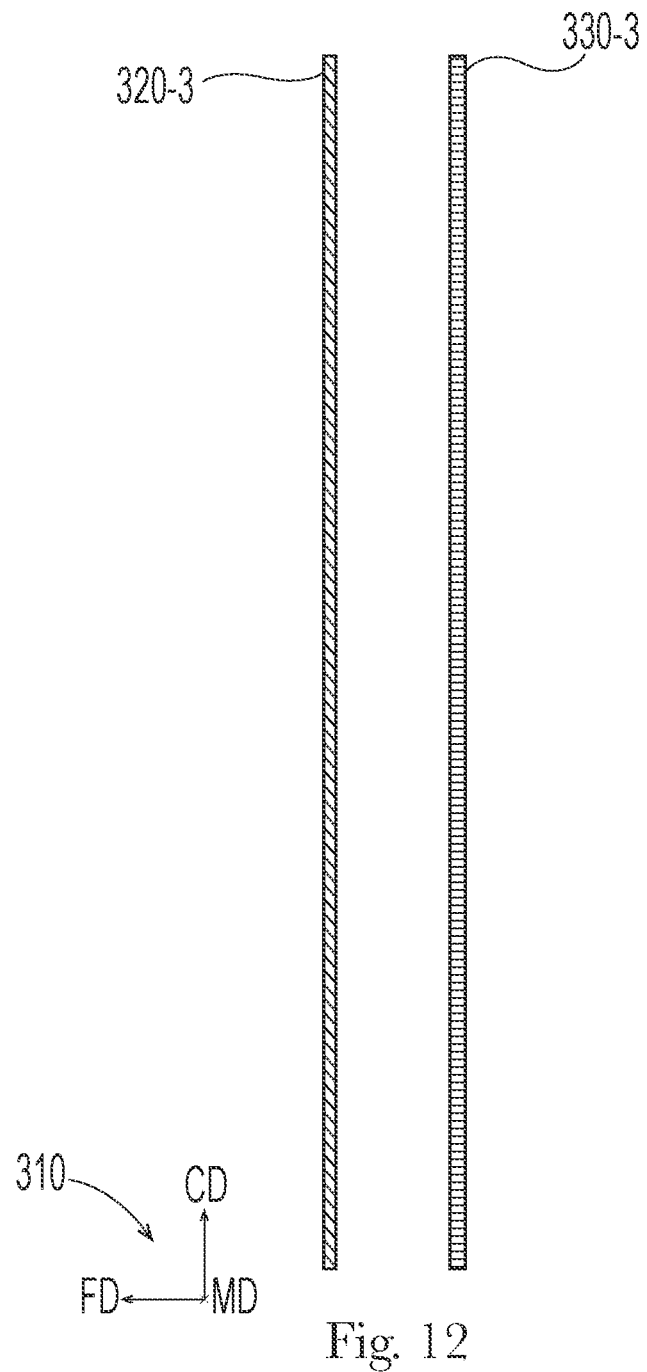
FIG. 12 illustrates a cross-sectional side view of a first flexible material and a second flexible material for use in making a flexible container.

FIG. 12 illustrates a cross-sectional side view of a first flexible material 320-3 and a second flexible material 330-3 for use in making a flexible container, as described herein. The first flexible material 320-3 can be used as the first flexible material 291-1a of the embodiments of FIGS. 10 and 11; the second flexible material 330-3 can be used as the second flexible material 291-2a of the embodiments of FIGS. 10 and 11. The first flexible material 320-3 and the second flexible material 330-3 can be any kind of suitable flexible material, as disclosed herein, as known in the art of flexible containers, or as disclosed in any of the following: U.S. patent application Ser. No. 13/889,061 filed May 7, 2013, entitled "Flexible Materials for Flexible Containers" published as US20130337244; U.S. patent application Ser. No. 13/889,090 filed May 7, 2013, entitled "Flexible Materials for Flexible Containers" published as US20130294711; U.S. patent application Ser. No. 14/534,209 filed Nov. 6, 2015, entitled "Flexible Containers for use with Short Shelf-Life Products and Methods for Accelerating Distribution of Flexible Containers" published as US2015012557; and/or U.S. patent application Ser. No. 15/198,472 filed Jun. 30, 2016 entitled "Flexible Containers with Removable Portions;" in any workable combination. As an example, a flexible material that is a film laminate can have at least the following: one or more sealable layers (such as linear low-density polyethylene) forming one or more exterior layers, one or more reinforcing layers (such as nylon), and one or more gas barrier layers (such as ethyl vinyl alcohol). In any flexible container disclosed herein, a first flexible material and a second flexible material can have any combination of materials, structures, and/or construction, as described herein.

In the embodiment of FIGS. 12-19, the first flexible material 320-3 becomes a flexible inner sheet, which defines an inside surface for at least portions of the following parts of a flexible container: a product space, one or more structural support volumes, a flow channel, a dispenser, and a vent passage. Since the first flexible material 320-3 becomes an inside surface of the flexible container being made, in various embodiments, part, parts, or all of a first flexible material can be a web of transparent and/or translucent film, although this is not required, and in various embodiments, part, parts, or all of a first flexible material can be decorated to display characters, graphics, branding, and/or other visual elements. In the embodiment of FIGS. 12-19, the second flexible material 330-3 becomes a flexible outer sheet, which defines an outside surface for at least portions of the following parts of a flexible container: a product space, a nonstructural panel such as a squeeze panel, one or more structural support volumes, a flow channel, and a dispenser; the second flexible material 330-3 also defines an outside surface for at least portions of a vent passage. The one or more structural support volumes are formed between adjacent portions of the first flexible material 320-3 (the flexible inner sheet) and the second flexible material 330-3 (the flexible outer sheet). Since the second flexible material 330-3 becomes an outside surface of the flexible container being made, in various embodiments, part, parts, or all of a second flexible material can be decorated to display characters, graphics, branding, and/or other visual elements, although this is not required, and in various embodiments, part, parts, or all of a second flexible material can be a web of transparent and/or translucent film. The first flexible material 320-3 and/or the second flexible material 330-3 can be provided to the making process as a decorated (e.g. pre-printed) film, and/or can be decorated as part of the making (e.g. with the addition of one or more printing processes). In any flexible container disclosed herein, a flexible inner sheet and a flexible outer sheet can have any combination of decoration, translucence, and/or transparency, as described herein.

The first flexible material 320-3 and the second flexible material 330-3 can each have any convenient size and shape. In the embodiment of FIGS. 12-19, for the first flexible material 320-3 and the second flexible material 330-3, each has the same overall dimension (in the direction of the CD-axis) and each has straight side edges that are parallel to the MD-axis, although these sizes and shapes are not required.

The first flexible material 320-3 and the second flexible material 330-3 can be the same, similar, or different. The first flexible material 320-3 and the second flexible material 330-3 can have the same structure, similar structures, or different structures (such as a different construction of layers). The first flexible material 320-3 and the second flexible material 330-3 can have the same decoration, similar decorations, or different decorations (such as a different graphics, branding, and/or visual elements).

Figure 13:
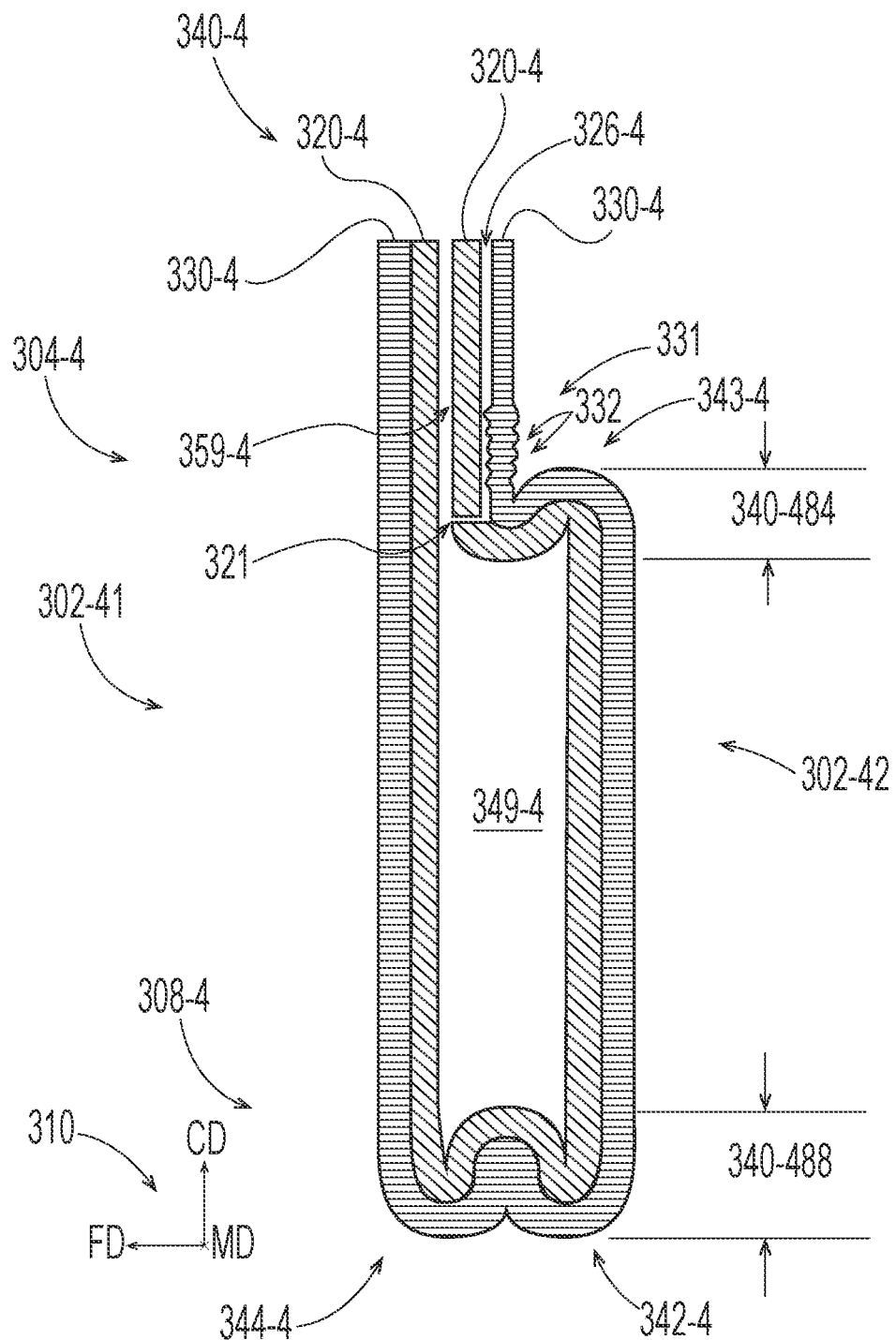
FIG. 13 illustrates a cross-sectional side view of a gusseted structure made from the combined, locally sealed, and folded flexible materials from FIG. 12.
Figure 14:
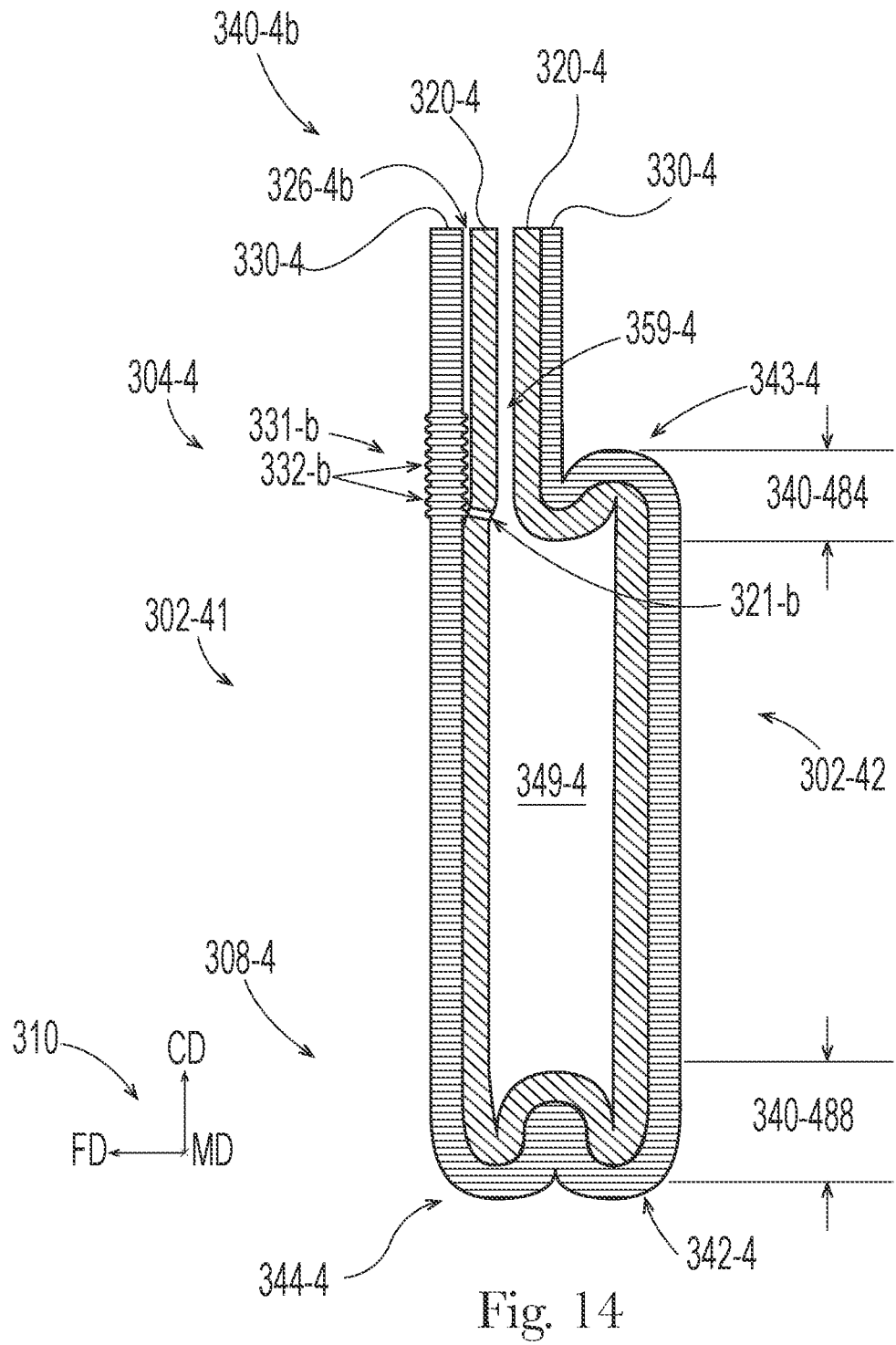
FIG. 14 illustrates an alternative embodiment of FIG. 13.

In the embodiment of FIGS. 13, 14, and 15, gusseted structures 340-4 and 340-5 represent portions of a continuous web of the combined flexible materials being processed (i.e. the flexible materials continuously extend in the MD direction); however, in embodiments wherein the flexible materials are discrete sheets, the same gusseted structures can be formed, but with the flexible materials extending for discrete lengths in the MD direction.

FIG. 13 illustrates a cross-sectional side view of the gusseted structure 340-4 made from the flexible materials from FIG. 12, which are formed, combined, locally sealed, and folded, as described below. The gusseted structure 340-4 includes a first flexible material 320-4 (i.e. the flexible inner sheet), which is a further processed version of the first flexible material 320-3 from the embodiment of FIG. 12. The gusseted structure 340-4 also includes a second flexible material 330-4 (i.e. the flexible outer sheet), which is a further processed version of the second flexible material 330-3 from the embodiment of FIG. 12.

In the first flexible material 320-4 of FIG. 13: a portion of the first flexible material 320-3 (from FIG. 12) that is disposed on an inner side of the open gusset leg, toward the back 302-42 is formed with vent openings 321, which are through holes, as described in connection with the forming 293-1a process of the embodiment of FIG. 10; the first flexible material 320-3 is combined with the second flexible material 330-3 (from FIG. 12) in aligned, direct, face-to-face contact, as described in connection with the combining 293-3a process of the embodiment of FIG. 10; and the first flexible material 320-3 is locally sealed to the second flexible material 330-3, as described in connection with the sealing 293-4a process of the embodiment of FIG. 10, and as shown with a first seal described in connection with the embodiment of FIG. 15.

In the second flexible material 330-4 of FIG. 13: a portion 331 of the second flexible material 330-3 (from FIG. 12) that is disposed on an inner side of the open gusset leg, toward the back 302-42 is formed with stand-offs 332, which are surface formations, for a vent passageway 326-4, as described in connection with the forming 293-2a process of the embodiment of FIG. 10; the second flexible material 330-3 is combined with the first flexible material 320-3 in aligned, direct, face-to-face contact, as described in connection with the combining 293-3a process of the embodiment of FIG. 10; and the second flexible material 330-3 from FIG. 12 is locally sealed to the first flexible material 320-3, as described in connection with the sealing 293-4a process of the embodiment of FIG. 10, and as shown with a first seal described in connection with the embodiment of FIG. 5.

The gusseted structure 340-4 of FIG. 13 includes the first flexible material 320-4 and the second flexible material 320-4, as described above, wherein these formed, combined, and sealed flexible materials are folded with the folding 293-5a process of the embodiment of FIG. 10, which results in the gusseted structure 340-4, which includes: a top 304-4 (toward the CD positive portion of the gusseted structure 340-4), which includes the top of the flexible container being made; a bottom 308-4 (toward the CD negative portion of the gusseted structure 340-4), which becomes the bottom of the flexible container being made; a Z-fold 342-4 in the bottom 308-4; a reverse Z-fold 343-4 in the top; a V-fold 344-4 in the bottom 308-4; and an open portion 359-4 (disposed in the top 304-4, between portions of the first flexible material 320-4 that are not directly connected to each other), wherein parts of the open portion 359-4 become the flow-channel and the dispenser of the flexible container being made. The gusseted structure 340-4 includes a front 302-41 (toward the FD positive side of the gusseted structure 340-4) that corresponds with a front of the flexible container being made as well as a back 302-42 (toward the FD negative side of the gusseted structure 340-4) that corresponds with a back of the flexible container being made.

The opening and the folds in the gusseted structure 340-4 form the gusset legs in the flexible container being made. The Z-fold 342-4, which is disposed in the back 302-42 and the bottom 308-4 becomes a back bottom folded gusset leg in the flexible container being made. The reverse Z-fold 343-4, which is disposed in the back 302-42 and the top 304-4 becomes a back top folded gusset leg in the flexible container being made. The V-fold, which is disposed in the front 302-41 and the bottom 308-4 becomes a front bottom folded gusset leg in the flexible container being made. The open portion 359-4, which is disposed toward the front 302-41 and in the top 304-4 becomes a front top open gusset leg in the flexible container being made.

In the top 304-4 and the front 302-41 of the gusseted structure 340-4 (the open gusset leg), the upper edges of the first flexible material 320-4 and the second flexible material 330-4 are aligned in the positive CD direction, however this is not required; the upper edge of one or more of the layers of these materials may be offset from one or more of the other upper edges. In the top 304-4 and the back 302-42 of the gusseted structure 340-4 (the back top folded gusset leg), the upper extent of the reverse Z-fold is disposed below (in the negative CD direction) the upper edges of the layers in the open gusset leg, however this is not required. In the bottom 308-4, in the front 302-41 and the back 302-42 of the gusseted structure 340-4, the lower extents of the second flexible material 330-4 for the Z-fold 342-4 and the V-fold 344-4 are aligned in the negative CD direction, however this is also not required; either the Z-fold 342-4 (the back bottom folded gusset leg) or the V-fold 344-4 (the front bottom folded gusset leg) may extend farther in the negative CD direction, than the other.

The opening and the folds in the gusseted structure 340-4 also form portions with four or eight layers of thickness, with respect to the FD direction. Due to the Z-fold 342-4 and the V-fold 344-4, the gusseted structure 340-4 has a bottom portion 340-488 with eight layers (with respect to the FD direction). Due to the reverse Z-fold 343-4 and the layers of flexible material forming the open portion 359-4, the gusseted structure has a top portion 340-484 with eight layers (with respect to the FD direction). In a middle portion of the gusseted structure 340-4, between the top portion 340-484 and the bottom portion 340-488, the gusseted structure 340-4 has four layers; two connected layers in the front 302-41 and two connected layers in the back 302-42 (with respect to the FD direction). In an uppermost portion of the gusseted structure 340-4, above the top portion 340-484, the gusseted structure 340-4 also has four layers; two connected layers in the front 302-41 and two connected layers in the back 302-42 (with respect to the FD direction).

The gusseted structure 340-4 includes an interior space 349-4, the extent of which is defined by the first flexible material 320-4, which is considered the flexible inner sheet. In FIG. 13, for clarity, the interior space 349-4 is illustrated with an exaggerated gap (in the FD direction) between portions of the flexible material 320-4 disposed in the front 302-41 and in the back 302-42; however, this gap is not required during processing, and in various embodiments, part, parts, or all of these portions of the flexible material 320-4 may be in contact with each other. For each flexible container being made, the interior space 349-4 is subsequently divided into one or more separate structures (e.g. one or more product spaces) when the gusseted structure 340-4 is further sealed (and thus divided in the MD direction), as described in connection with the embodiment of FIG. 15. The outside of the gusseted structure 340-4 is formed by the second flexible material 330-4, which is considered the flexible outer sheet.

FIG. 14 illustrates a gusseted structure 340-4b, which is the same as the gusseted structure 340-4 of FIG. 13, except as described below. In the gusseted structure 340-4 of FIG. 13, the vent passage 326-4 is disposed in the open gusset leg, toward the back 302-42, on the side proximate to the reverse Z-fold 343-4, while in the gusseted structure 340-4b of FIG. 14, a vent passage 326-4b is disposed in the open gusset leg, toward the front 302-41, on the side opposite from the reverse Z-fold 343-4. In FIG. 14, vent openings 321-b are configured in the same way as the vent openings 321 of FIG. 13, except that the vent openings 321-b are disposed on a portion of the first flexible material 320-4 that is on the outer side of the open gusset leg. In FIG. 14, a portion 331-b of the second flexible material 330-4 is formed with stand-offs 332-b, which are the same as the stand-offs 332 of FIG. 13, except that the portion 331-b with the stand-offs 332-b is disposed on a portion of the first flexible material 320-3 that is on the outer side of the open gusset leg.

FIG. 15 illustrates a broken, front view of a gusseted structure 340-5 made from the gusseted structure 340-4 from FIG. 13, which is further sealed, as described below. The gusseted structure 340-5 includes a first flexible material 320-5, which is a further processed version of the first flexible material 320-4 in the gusseted structure 340-4 from the embodiment of FIG. 13. The gusseted structure 340-5 also includes a second flexible material 330-5, which is a further processed version of the second flexible material 330-4 in the gusseted structure 340-4 from the embodiment of FIG. 13. The layers of these flexible materials are shown as partially broken, to illustrate their relative positions within the gusseted structure 340-5. The gusseted structure 340-5 includes, from front to back: a layer of the second flexible material 330-5 (i.e. the flexible outer sheet), two layers of the first flexible material 320-5 (i.e. the flexible inner sheet), and another layer of the second flexible material 330-5 (i.e. the flexible outer sheet).

The gusseted structure 340-5 includes a top edge 340-51, which is formed by the aligned upper edges of the flexible materials, and is oriented in the MD direction. The gusseted structure 340-5 also includes a bottom edge 340-52, which is formed by the lower extent of the bottom folds of the flexible materials, and is parallel to the top edge 340-51. The sides of the gusseted structure 340-5 are shown as broken, since the flexible materials are shown as a portion of a continuous web of indefinite length, extending in both the positive MD direction and the negative MD direction; the portion shown corresponds with flexible materials that become a container blank.

FIG. 15 shows that the gusseted structure 340-5 includes a top gusset 343-5, which is a further processed version of the reverse Z-fold 343-4 of FIG. 13. In FIG. 15, the top gusset 343-5 is an inward fold illustrated by two parallel hidden lines, each extending continuously in the MD direction, separated from each other by a uniform distance in the CD direction. FIG. 15 also shows that the gusseted structure 340-5 includes a bottom gusset 342-5, which is a further processed version of the Z-fold 342-4 and the V-fold 344-4 of FIG. 13. In FIG. 15, the bottom gusset 342-5 is an inward fold illustrated by a hidden line extending continuously in the MD direction, separated from the bottom edge 340-52 by a uniform distance in the CD direction.

FIG. 15 also shows that the gusseted structure 340-5 includes the vent openings 321, as described in connection with the embodiment of FIG. 13. The vent openings 321 are three small, round holes, aligned in the MD direction, and laterally centered on the partially formed container blank; however, in various embodiments, vent openings can have any number, any size(s), any shape(s), any pattern, and can be disposed in any convenient arrangement. The vent openings 321 are shown as hidden since they are disposed on a layer of the first flexible material 320-5 in the flexible container being made. The vent openings 321 are disposed on a portion of the top gusset 343-5, at or proximate to a bottom extent (in the negative CD direction) of the reverse Z-fold of the top gusset 343-5, such that (when the container stands upright) any fluent product that enters the vent passage can drain (by gravity) to the bottom of the vent passage, through the vent openings 321, and back into the product space of the flexible container; however, in various embodiments, vent openings can be disposed in any convenient location that provides fluid communication between the vent passage and the product space of the flexible container being made.

FIG. 15 further shows that the gusseted structure 340-5 includes the vent stand-offs 332, as described in connection with the embodiment of FIG. 13. The vent stand-offs 332 are shown as a pattern of small, inverted V-shaped formations, aligned in two rows, with each row of formations linearly arrayed in the MD direction, the overall pattern laterally centered on the partially formed container blank, and the pattern having an overall shape that is triangular, having a top in the positive CD direction and a bottom in the negative CD direction; however, in various embodiments, vent stand-offs can have any number, any size(s), any shape(s), any pattern, and can be disposed in any convenient arrangement. The vent stand-offs 332 are shown as hidden since they are disposed on a layer of the second flexible material 330-5 in the flexible container being made. The vent stand-offs 332 are disposed above (in the positive CD direction) the reverse Z-fold of the top gusset 343-5 and on a portion of the second flexible material 330-5 that overlays the vent passage. The shapes formed by the vent stand-offs 332 extend through the second flexible material 330-5 (in the FD direction), such that the shapes of the stand-offs can at least assist in providing separation between the adjacent flexible materials (i.e. the layer of the flexible inner sheet and the layer of the flexible outer sheet); however, in various alternate embodiments, part or parts of some or all of the vent stand-offs 332 can be disposed on only the inward facing side of the second flexible material 330-5.

In the gusseted structure 340-5 of FIG. 15, portions of layers of the first flexible material 320-5 and portions of layers of the second flexible material 330-5 are sealed together, as described in connection with the local sealing 293-4*a* process of the embodiment of FIG. 10 (performed before the folding 293-5*a*), and as shown with a first seal, described below. The gusseted structure 340-5 includes a first portion 341-1 of a first seal, a second portion 341-2 of the first seal (shown as hidden), as well as third and fourth portions of the first seal (not shown), wherein all portions of the first seal are made by the local sealing 293-4*a*. The first portion 341-1 of the first seal is a front panel seal in a closed shape that defines the periphery of a front panel 380-5 of the flexible container being made as well as at least parts of the inside edges of structural support volumes around the front panel 380-5; the first portion 341-1 of the first seal has an overall shape like a top part of an hourglass and is laterally centered on the flexible container being made. The second portion 341-2 of the first seal (shown as hidden), is a bottom panel seal in one or more closed shapes that define the periphery of a bottom panel of the flexible container being made as well as at least parts of the inside edges of structural support volumes around the bottom panel; the second portion 341-2 of the first seal has an overall shape that is rectilinear and is laterally centered on the flexible container being made. The third portion of the first seal (not shown) is a back panel seal in a closed shape that defines the periphery of a back panel of the flexible container being made as well as at least parts of the inside edges of structural support volumes around the back panel; the third portion of the first seal has an overall shape that is same as the overall shape of the first portion and is also laterally centered on the flexible container being made. The fourth portion of the first seal (not shown) includes portions of a reinforcing seal that is a continuously sealed area that defines at least parts of the edges of structural support volumes in the bottom of the flexible container being made. In various alternate embodiments, the size, shape, number, and location of each portion of a first seal can be adjusted, according to the design of the flexible container being made; for example, the design can be any embodiment of the flexible container of FIGS. 9A-9G (including any alternative embodiment disclosed herein). Together, the portions of the first seal and portions of the bottom edge 340-52 form edges of part of a structural support space 370-5 that becomes part of a structural support frame formed by a plurality of structural support volumes in the flexible container being made, wherein the structural support space 370-5 is disposed between adjacent layers of the first flexible material 320-5 and the second flexible material 330-5.

In the gusseted structure 340-5 of FIG. 15, portions of layers of the first flexible material 320-5 and portions of the layers of the second flexible material 330-5 are sealed together, as described in connection with the local sealing 293-6*a* process of the embodiment of FIG. 10 (performed after the folding 293-5*a*), and as shown with a second seal, described below. The gusseted structure 340-5 includes a first portion 346-1 of the second seal, a second portion 346-2 of the second seal, as well as third and fourth portions of the second seal (not shown), wherein all portions of the second seal are made by the local sealing 293-6*a*.

The first portion 346-1 of the second seal is shown on a left side of FIG. 15 and is part of a front frame seal that is a shaped line with multiple parts connected end-to-end, wherein the first seal includes: first, in part of the bottom of the flexible container being made, a curved part that curves laterally outward (in the negative MD direction) from its bottom to its top, wherein about all of the curved part is sealed through eight layers of the flexible materials in the bottom gusset 342-5, and the curved part defines at least parts of the outside edges of structural support volumes in the bottom parts; second, in part of the bottom and middle of the flexible container being made, a straight part, oriented in about the CD direction from its bottom to its top, wherein about all of the straight part is sealed through four layers of the flexible materials, and the straight part defines at least parts of the outside edges of structural support volumes in the bottom and middle parts; third, in part of the middle and top of the flexible container being made, another curved part that curves laterally inward (in the positive MD direction) from its bottom to its top, wherein part of this curved part is sealed through four layers of the flexible materials and part of this curved part is sealed through eight layers of the flexible materials (in the top gusset 343-5), and this curved part defines at least parts of the outside edges of structural support volumes in the middle and top parts; and fourth, in part of the top of the flexible container being made, another straight part, oriented at an angle between the positive CD direction and the negative MD direction, angled laterally outward (in the negative MD direction) from its bottom to its top, wherein all of this straight part is sealed through four layers of the flexible materials, and this straight part defines a connection between top portions of the flexible materials that are subsequently trimmed away. Together, the parts of the first portion 346-1 of the second seal form a continuous outside edge on a left side of part of the structural support space 370-5 that becomes a structural support frame formed by a plurality of structural support volumes in the flexible container being made, wherein this part of the structural support space 370-5 is disposed: first, in the front, in the space between the first portion 346-1 of the second seal and the left side of the first portion 341-1 of the first seal (i.e. the front panel seal) and also between the first flexible material 320-5 and the second flexible material 330-5; and second, in the back, in the space between the first portion 346-1 of the second seal and the left side of the third portion of the first seal (i.e. the back panel seal) and also between the first flexible material 320-5 and the second flexible material 330-5.

The second portion 346-2 of the second seal is shown on a right side of FIG. 15 and is part of a front frame seal that is a shaped line with multiple parts connected end-to-end, wherein the first seal includes parts that are the same as the parts on the first portion 346-1 of the second seal, but mirrored by a mirror line (not shown) that is oriented in the CD direction and disposed laterally (in the MD direction) at the center of the flexible container being made. Together, the parts of the second portion 346-2 of the second seal form a continuous outside edge on a right side of part of the structural support space 370-5 that becomes a structural support frame formed by a plurality of structural support volumes in the flexible container being made, wherein this part of the structural support space 370-5 is disposed: first, in the front, in the space between the second portion 346-2 of the second seal and the right side of the first portion 341-1 of the first seal (i.e. the front panel seal) and also between the first flexible material 320-5 and the second flexible material 330-5; and second, in the back, in the space between the second portion 346-2 of the second seal and the right side of the third portion of the first seal (i.e. the back panel seal) and also between the first flexible material 320-5 and the second flexible material 330-5.

The gusseted structure 340-5 includes a partially complete product space 349-5 (shown in broken portion), which is a further processed version of the interior space 349-4 from the embodiment of FIG. 13, but bounded on the left (negative MD direction) by the first portion 346-1 of the second seal and bounded on the right (positive MD direction) by the second portion 346-2 of the second seal.

For the flexible container being made, the gusseted structure 340-5 of FIG. 15 is subsequently separated from surrounding portions of the flexible materials by precision cutting that also effectively trims away excess portions, as described in connection with the singulating 293-7a process of the embodiment of FIG. 10, thus forming a partially completed container blank, as described in connection with the embodiment of FIG. 16.

FIGS. 16-19 illustrate a container blank being processed into a filled flexible container by the filling 294 process of the making 292, as described in connection with the embodiment of FIG. 10.

Figure 16:
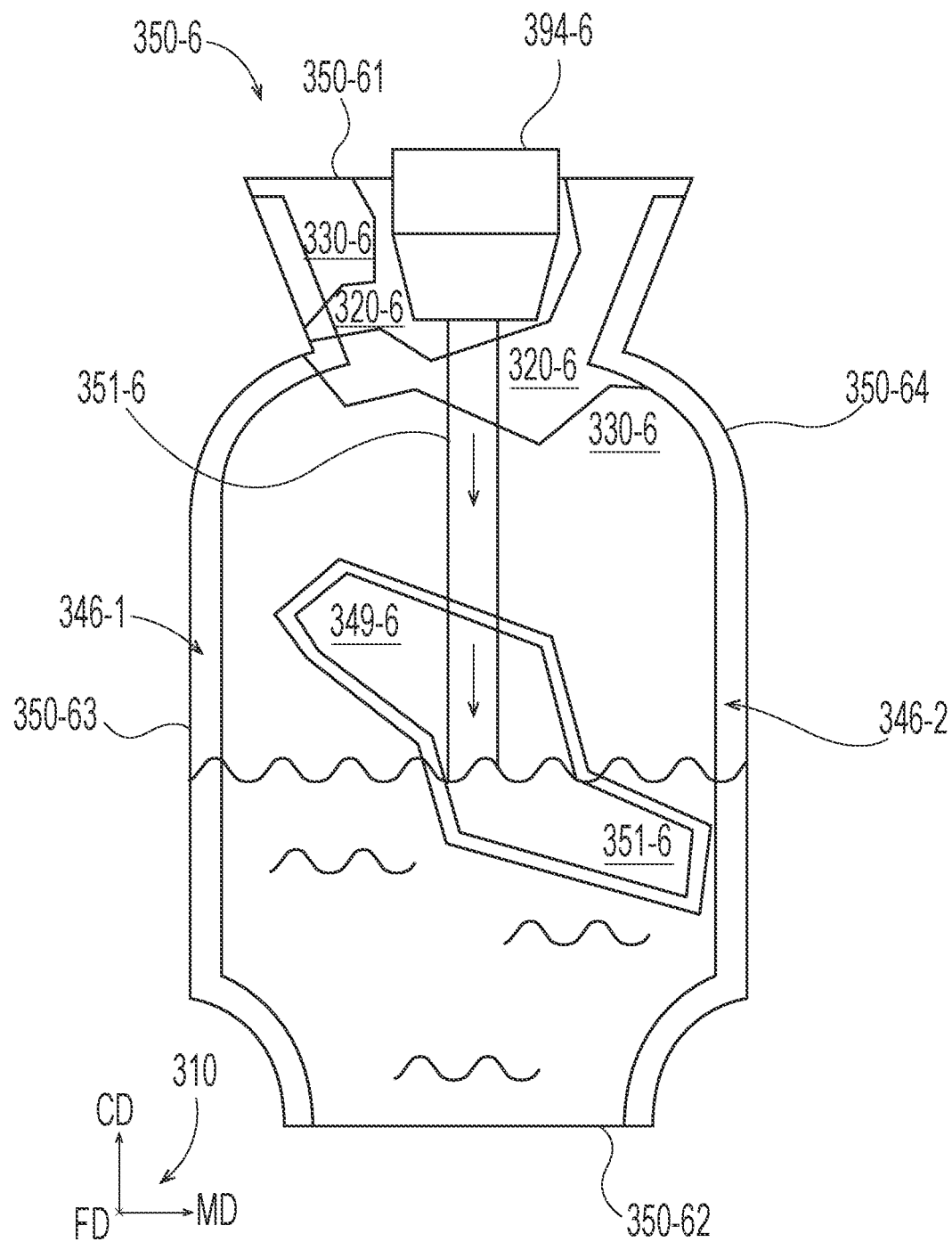
FIG. 16 illustrates a front view of the gusseted structure from FIG. 15 singulated into a partially completed container blank and being filled with a fluent product.

FIG. 16 illustrates a broken, front view of a partially completed container blank 350-6 made from the gusseted structure 340-5 from FIG. 15, which is singulated and being filled with a fluent product 351-6, as described below. For the purpose of clarity, FIG. 16 does not show the vent openings, the vent stand-offs, or portions of the first seal; also, the flexible materials are illustrated as transparent. However, FIG. 16 does show the first portion 346-1 of the second seal and the second portion 346-2 of the second seal, which are the same as in the embodiment of FIG. 15.

The partially completed container blank 350-6 includes a first flexible material 320-6, which is a further processed version of the first flexible material 320-5 in the gusseted structure 340-5 from the embodiment of FIG. 15. The partially completed container blank 350-6 also includes a second flexible material 330-6, which is a further processed version of the second flexible material 330-5 in the gusseted structure 340-5 from the embodiment of FIG. 15. The layers of these flexible materials are shown as partially broken, to illustrate their relative positions within the partially completed container blank 350-6. The gusseted structure 350-6 includes, from front to back: a layer of the second flexible material 330-6 (i.e. the flexible outer sheet), two layers of the first flexible material 320-6 (i.e. the flexible inner sheet), and another layer of the second flexible material 330-6 (i.e. the flexible outer sheet).

The partially completed container blank 350-6 includes a bottom edge 350-62, which is a further processed version of the bottom edge 340-52 from the embodiment of FIG. 15, wherein the flexible materials along the bottom edge 350-62 are cut through on both sides, as part of the singulating, to a final width (in the MD direction) for the flexible container blank. The partially completed container blank 350-6 also includes a top edge 350-61, which is a further processed version of the top edge 340-51 from the embodiment of FIG. 15, wherein the flexible materials along the top edge 350-61 are cut through on both sides, as part of the singulating (with portions of the flexible materials proximate to the top edge 350-61 subsequently trimmed away). The partially completed container blank 350-6 includes a left side edge 350-63, which is a further processed version of the gusseted structure 340-5 of FIG. 15, wherein the flexible materials are cut through, as part of the singulating, at a distance that is proximate to but offset outward (generally in the negative MD direction) from the first portion 346-1 of the second seal, all along the first portion 346-1, from the bottom edge 350-62 to the top edge 350-61. The partially completed container blank 350-6 also includes a right side edge 350-64, which is a further processed version of the gusseted structure 340-5 of FIG. 15, wherein the flexible materials are cut through, as part of the singulating, at a distance that is proximate to but offset outward (generally in the positive MD direction) from the second portion 346-2 of the second seal, all along the second portion 346-2, from the bottom edge 350-62 to the top edge 350-61. Together, the top edge 350-61, the left side edge 350-63, the bottom edge 350-62, and the right side edge 350-64 define an outer extent of the partially completed container blank 350-6.

In the embodiment of FIG. 16, a dispenser 394-6 is dispensing the fluent product 351-6 into a partially complete product space 349-6, such that the fluent product 351-6 is filling 294-1*a* the partially complete container blank 350-6, as described in connection with the embodiment of FIG. 10. The partially complete product space 349-6 is the same as the partially complete product space 349-5 of the embodiment of FIG. 15, except that the flexible materials are changing shape as the partially complete product space 350-6 is filled.

The filling station may be configured to have a fixed pitch between fillers that is larger than the largest pitch between articles that is expected to be encountered. In other embodiments, filling station may be configured to have a variable pitch between fillers so that it can be adjusted to handle articles having the smallest and largest pitches therebetween that are expected to be encountered.

The dispenser 394-6 is part of a filling unit, such as the filling unit 294-1*b*, as described in connection with the embodiment of FIG. 11. In the embodiment of FIG. 16, the dispenser 394-6 extends downward (in the negative CD direction) as shown, past the top edge 350-61 and into a top portion of the partially completed container blank 350-6, between the adjacent layers of the first flexible material 320-6 (i.e. the flexible inner sheet), to a position that is above (in the positive CD direction) the partially complete product space 349-5. However, in alternate embodiments, one or more dispensers can be used with each dispenser positioned at various orientations, locations, and/or distances, with respect to one or more product spaces within a flexible container blank. As the dispenser 394-6 approaches past the top edge 350-61, prior to dispensing the fluent product, the dispenser may optionally dispense (e.g. blow) compressed air (or another gas, such as nitrogen) from its open end, toward the layers, in order to facilitate their further separation from each other. The fluent product 351-6 travels in a stream out from the dispenser, downward (in the negative CD direction) as indicated by the arrows, and fills the partially complete product space 349-5 from its bottom up (in the positive CD direction).

Figure 17:
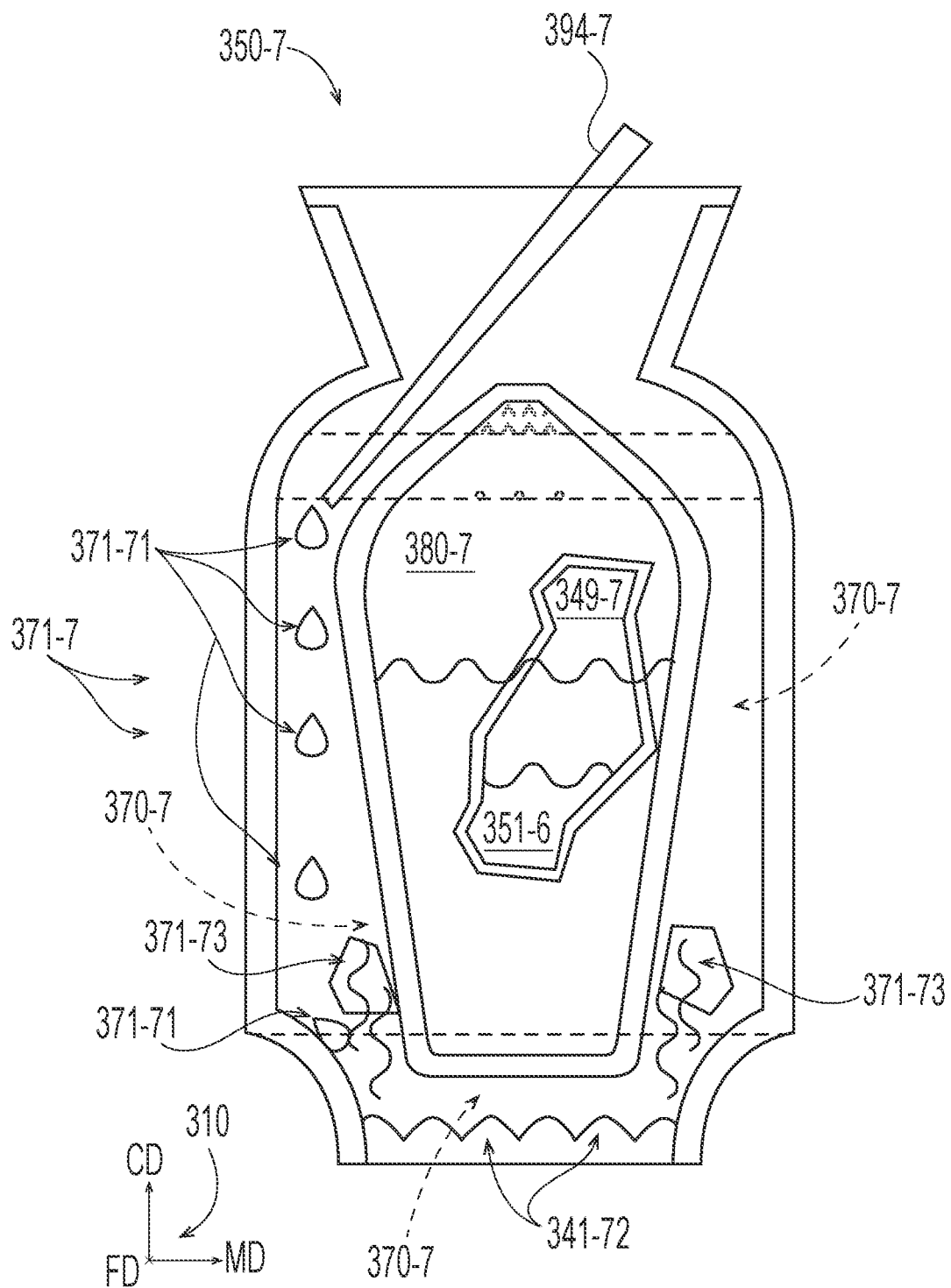
FIG. 17 illustrates a front view of the filled container blank from FIG. 16 with an expansion material being added.

FIG. 17 illustrates a front view of a partially completed container blank 350-7, which is the same as the partially completed container blank 350-6 from FIG. 16, which is filled with the fluent product 351-6 from FIG. 16, and is being dosed with an expansion material 371-7, as described below. For the purpose of clarity, in FIG. 17 portions of the flexible materials are illustrated as transparent.

The partially completed container blank 350-7 includes a front panel 380-7, which overlays a partially complete product space 349-7, and which is at least partially surrounded by a structural support space 370-7. The partially complete product space 349-7 is the same as the partially complete product space 349-6 of the embodiment of FIG. 16, except that the flexible materials have a changed shape from the product space 350-6 being filled with the fluent product 351-6. The structural support space 370-7 is about the same as the structural support space 370-5 of FIG. 15, except that the flexible materials have a changed shape from the expansion material 371-7 being added to the structural support space 370-7.

In some cases, prior to the steps of filling the container blanks with fluent product and adding the expansion material 371-7 to the structural support space 370-7, it may be desirable to form tack seals that seal together certain layers of a multi-layer container blank in certain locations. This may be done in order to ensure that the fluent product and expansion materials are added between the desired layers, and are not inadvertently injected between the wrong layers. For example, and with reference to FIG. 14, when looking at the top of the container blank from left to right, it is desirable to separate layers 330-4 and 320-4 on the left side (which may be thought of as layers 1 and 2) from layers 320-4 and 330-4 on the right side (which may be thought of as layers 3-4) so that fluent product can be filled between layers 2-3. A misfill and large mess will occur if the fluent product is attempted to be filled between layers 1 and 2 or between layers 3 and 4. Layers 3-4 can be sealed together with tack seals 98 (shown in FIG. 15) to mitigate the likelihood of the fluent product being filled therebetween. However, the expansion material (e.g., liquid nitrogen) is filled between layers 1-2, so the tack seals 98 should be located outside the path of the expansion material dispenser to enable filling of the expansion material while keeping layers 1-2 sealed for the fluent product filling.

An elongated dispenser 394-7 is dosing (i.e. adding) the expansion material 371-7 into the partially complete container blank 350-7, as described in connection with the adding 294-2*a* process of the embodiment of FIG. 10. The dispenser 394-7 is part of a dosing unit, such as the dosing unit 294-2*b*, as described in connection with the embodiment of FIG. 11. In the embodiment of FIG. 17, the dispenser 394-7 extends both downward and outward at an angle (between the negative MD direction and the negative CD direction) as shown, past a top edge and into a top portion of the partially completed container blank 350-7, between adjacent layers of the first flexible material (i.e. the flexible inner sheet) and the second flexible material (i.e. the flexible outer sheet), to a position that is substantially above (in the positive CD direction) the structural support space 370-5; however, in alternate embodiments, one or more dispensers can be used with each dispenser positioned at various orientations, locations, and/or distances, with respect to one or more structural support spaces within a flexible container blank. The expansion material 371-7 can be added into the partially complete container blank 350-7 between the first flexible material and the second flexible material on the inner side (toward the back) of the open gusset leg, on the outer side (toward the front) of the open gusset leg, or on both sides. In various embodiments, before and/or during the positioning of a dispenser of expansion material, the dosing unit can separate the adjacent layers of the first and second flexible materials, so that the dispenser can move between those layers. The expansion material 371-7 is added as a liquid expansion material 371-71 (shown as drops), which may form a pool 371-72 within a bottom part (in the negative CD direction) of the structural support space 370-7, and which then evaporates into a vaporous expansion material 371-73. As the expansion material 371-7 evaporates, the vaporous expansion material 371-73 begins expanding the structural support volumes of the structural support space 370-7, as described in connection with the expanding 293-6a process of the embodiment of FIG. 10.

Figure 18:
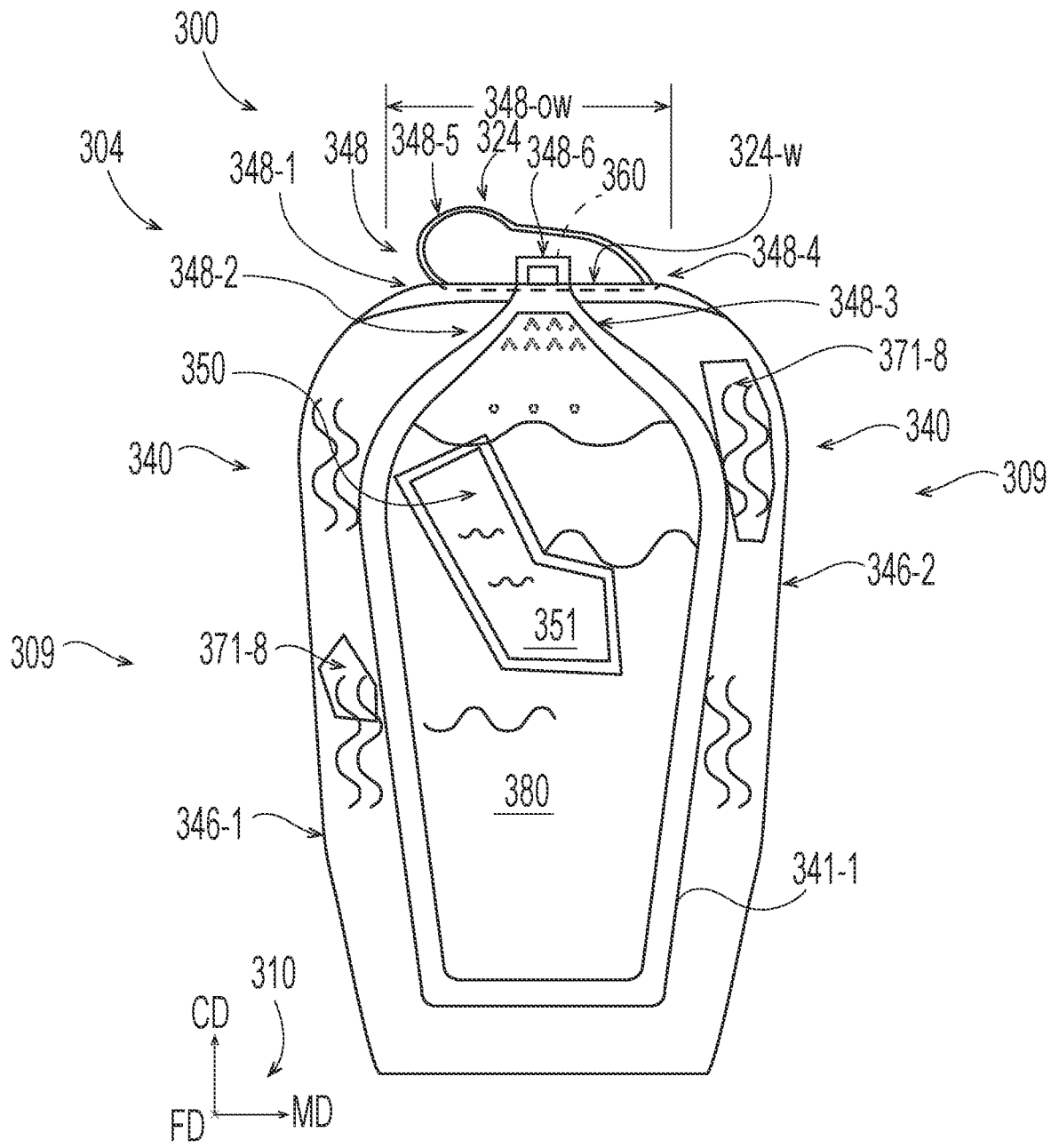
FIG. 18 illustrates a front view of the container blank from FIG. 17, which is further sealed, shaped, scored, and expanded to form a filled flexible container.

FIG. 18 illustrates a partially broken, front view of a further processed version of the partially completed container blank 350-7 from FIG. 17, which is further sealed, shaped, scored, and expanded, as described below, to form a filled flexible container 300, with a product space 350 that is filled with a fluent product 351, wherein the filled product space 350 is supported by a structural support frame 340 made from a plurality of structural support volumes that are expanded by an expansion material 371-8, and which at least partially surround a front panel 380. For the purpose of clarity, in FIG. 18 portions of the flexible materials are illustrated as transparent.

The further sealing includes sealing the partially complete container blank 350-7 with a third seal 348, which is the final seal, as described in connection with the sealing 294-3a process of the embodiment of FIG. 10. The shaping includes shaping a top 304 (disposed in the positive CD direction) of the finally sealed, partially complete container blank, by removing final excess portions of the flexible materials, as described in connection with the shaping 294-4a process of the embodiment of FIG. 10. The scoring includes forming a line of weakness 324-w in the top 304 of the finally sealed, partially complete container blank, as described in connection with the forming 294-5a process of the embodiment of FIG. 10. The expanding includes expanding the expansion material 371-7 that was added into the partially complete container blank 350-7, as described in connection with the expanding 294-6a process of the embodiment of FIG. 10.

The third seal 348 is primarily disposed in a front (open) gusset leg in the top 304 of the flexible container 300, through four layers of the flexible materials (i.e. one layer of the flexible outer sheet, two layers of the flexible inner sheet, and one layer of the flexible outer sheet), and connecting and/or overlapping with other seals. The third seal 348 includes a first portion 348-1, a second portion 348-2, a third portion 348-3, a fourth portion 348-4, a fifth portion 348-5, and a sixth portion 348-6. The third seal 348 has an overall width 348-ow. Details of the third seal 348 are described in connection with FIG. 19.

The outer extent of the top 304 of the flexible container 300, including a tear tab 324, is formed by the shaping, which cuts through all of the layers of the flexible materials and connects with the upper portions of the outer extents of sides 309, which were formed by the singulating. The shaping can also include cutting through part, parts, or all of one or more portions of the third seal 348. As an example, the shaping can include cutting through and trimming away outer portions of the fifth portion 348-5 of the third seal 348, such that the outer edge of the tear tab 324 is a clean, sealed edge. The tear tab 324 is configured in the same way as the tear tab 124 in the embodiment of FIGS. 9A-9G. The line of weakness 324-w extends laterally (in the MD direction) across the top 304, below (in the negative CD direction) the tear tab 324, over the dispenser 360, and above (in the positive CD direction) the product space 350; the line of weakness 324-w is configured in the same way as the line of weakness 124-w in the embodiment of FIGS. 9A-9G. The expanded structural support volumes of the structural support frame 340 are fully sealed-off spaces, in which all of the expansion material 371-8 is fully expanded into vapor form at its final pressure; the structural support frame 340 is configured in the same way as the structural support frame 140 in the embodiment of FIGS. 9A-9G.

Figure 19:
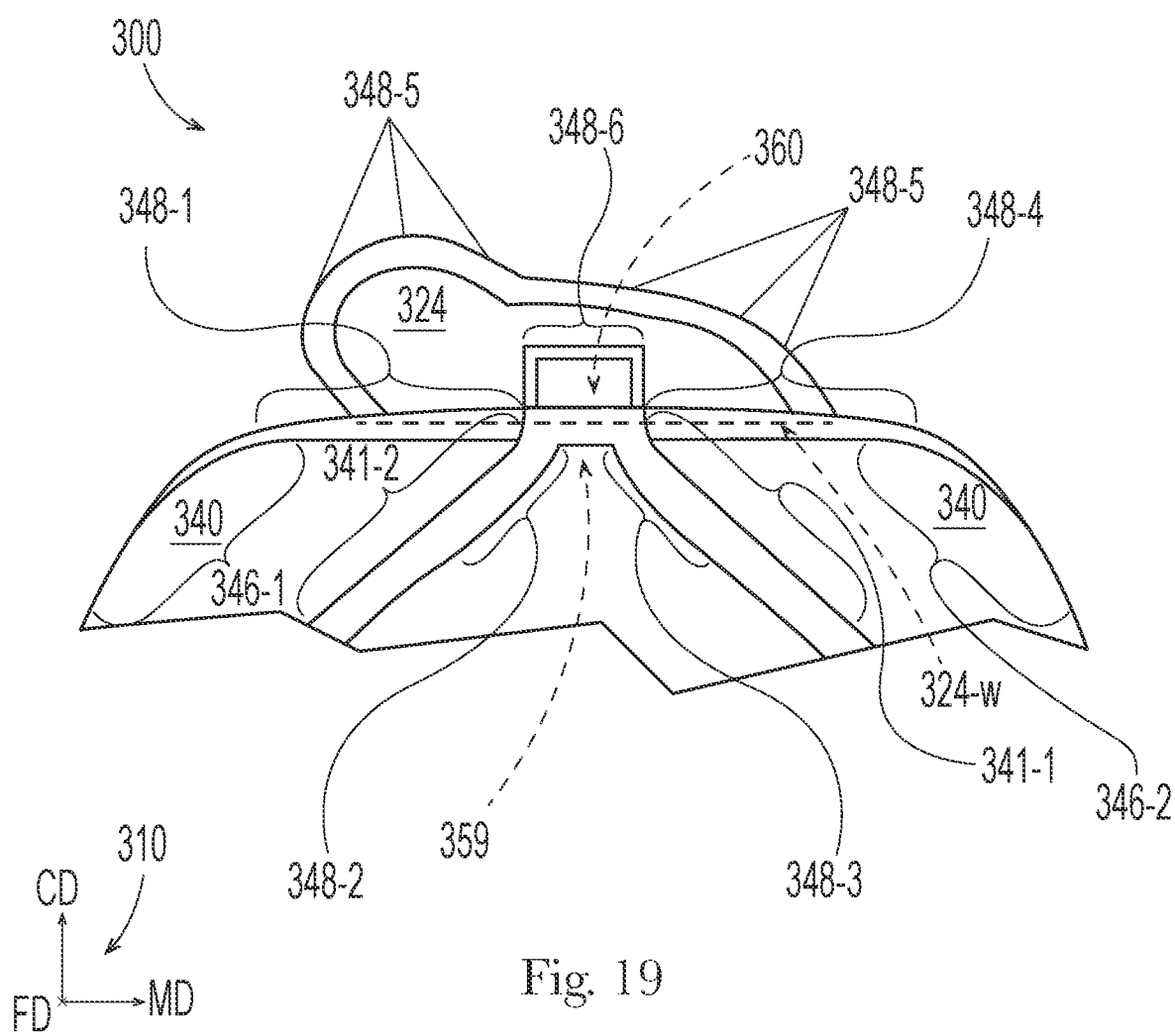
FIG. 19 illustrates an enlarged front view of a top portion of the container of FIG. 18.

FIG. 19 illustrates an enlarged front view of a top portion of the container of FIG. 18, with some details omitted, for the sake of clarity. The third seal 348 extends continuously to each of the following connections: the first portion 348-1 extends from an inner end outward (in the negative MD direction) to partially overlap and connect with a laterally inward upper extent of the first portion 346-1 of the second seal (on the left); the second portion 348-2 connects to the inner end of the first portion 348-1 and extends at an angle, downward and outward (in the negative MD direction and the negative CD direction), to partially overlap and connect with an upper left-side portion of the first portion 341-1 of the first seal; the third portion 348-3 connects to an inner end of a fourth portion 348-4 and extends at an angle, downward and outward (in the positive MD direction and the negative CD direction), to partially overlap and connect with an upper right-side portion of the first portion 341-1 of the first seal; the fourth portion 348-4, extends from its inner end outward (in the positive MD direction) to partially overlap and connect with a laterally inward upper extent of the second portion 346-2 of the second seal (on the right); the fifth portion 348-5 connects to the first portion 348-1 and extends upward and outward (in the positive CD direction and negative MD direction), then curves across (generally in the positive MD direction), then extends downward (in the negative CD direction and positive MD direction) to connect with the fourth portion 348-4, such that the fifth portion 348-5 is disposed around an upper portion of a periphery of the tear tab 324; the sixth portion 348-6 connects to and extends upward (in the positive CD direction) from an upper extent of the second portion 348-2, then extends across (in the positive MD direction), and then extends downward (in the negative CD direction) and connects to an upper extent of the third portion 348-3. The third seal 348 closes off about all of the front, top open gusset leg, except that the third seal 348 is sized and shaped to leave an unsealed gap (between the inward ends of the first portion 348-1 and the fourth portion 348-4), along a laterally central portion of the open gusset leg where the adjacent layers of the first flexible material (i.e. the flexible inner sheet) are not sealed together.

Each portion of the third seal 348 can overlap with a portion of another seal by various amounts. As examples, seals can overlap by 2-50 millimeters, or by any integer value for millimeters between 2 and 50, or within any range formed by any of these preceding values, such as: 2-20 millimeters, 3-15 millimeters, 4-10 millimeters, 5-40 millimeters, 10-30 millimeters, 10-50 millimeters, 20-50 millimeters, 30-50 millimeters, etc. As further examples, seals can overlap by a multiple of the width of the narrower seal, such as an overlap of 1-25 times the width, 1-10 times the width, 1-5 times the width, or 1-2 times the width.

Together, the first portion 348-1 and the second portion 348-2 of the third seal 348, seal off, define, and thus form an upper portion of a structural support volume on a left side in the structural support frame 340 of the flexible container 300. Together, the third portion 348-3 and the fourth portion 348-4 of the third seal 348, seal off, define, and thus form an upper portion of a structural support volume on a right side in the structural support frame 340 of the flexible container 300. In various embodiments, portions of a third seal may form relatively more or relatively less of the outer extent of one or more structural support volumes of a structural support frame.

Together, the second portion 348-2 and the third portion 348-3 of the third seal 348, seal off, define, and respectively form left and right sides of a flow channel 359. The flow channel 359 is formed between these portions of the third seal 348 and between the layers of the first flexible material (i.e. the flexible inner sheet). A bottom (inward) part of the flow channel 359 is in fluid communication with the product space 350 of the container 300. A top (outward) part of the flow channel 359 ends at the unsealed gap, which forms the dispenser 360 of the container 300, when the container 300 is unsealed (by removing the tear tab 324). Thus, the flow channel 359 can provide fluid communication between the product space 350 and the environment outside of the container 300. In various embodiments, portions of a third seal may form part, parts, or all of a flow channel.

Together, the fifth portion 348-5 along with part of the first portion 348-1, and part of the fourth portion define substantially all of a tab seal disposed around the periphery of the tear tab 324. In various embodiments, the fifth portion 348-5 may extend continuously over part, parts, or all of the tear tab 324. In other embodiments, part, parts, or all of a fifth portion of a third seal may be omitted; however, such an omission may allow separation between part, parts, or all of one or more of the layers of flexible material that form the tear tab, which may create an undesirable appearance to consumers.

The sixth portion 348-6 of the third seal 348 forms a cap seal that seals off the product space 350 by fully bounding the unsealed gap, from its left side to its right side. Since the sixth portion 348-6 is offset from the line of weakness 324-w, the cap seal extends partway into the tear tab 324. In various embodiments, a cap seal may extend into a tear tab by various degrees. In other embodiments, part, parts, or all of a sixth portion of a third seal may be omitted; however, such an omission may allow small amounts of fluent product from the product space to move farther within the tear tab and leak out upon its removal, which may lead to undesirable contact with the end users hands/fingers.

Thus, the filled flexible container 300 is a product that is ready for packaging, supply, and use, as described herein.

The methods and steps described herein may provide a number of advantages. It should be understood, however, that such advantages are not required to be present unless set forth in the appended claims.

The method is capable of precisely locating cuts and other types of at least partial separations in a fast moving web of material. The method is independent of the shape of the seal, and the shape of the flexible container or other article to be formed from the flexible materials. The method can be used to create cuts and other types of partial separations in any type of process that creates products from a moving web of material including, but not limited to absorbent articles, such as disposable diapers, adult incontinence pads, and feminine care pads. In the case of forming flexible containers having edges that have seals along their edges, the method can be used to minimize width of seal. For example, it is possible to form seals that are less than 3 mm wide. In addition, when the seal at the edge of the flexible container is formed by laser cutting, the melting of the flexible material by the laser provides a soft, rounded edge. This reduces and/or eliminates the tendency to form sharp edges (that may be created by other types of cutting processes) to provide a package that is more comfortable for a user to handle.

Forming the eye marks at the same time as the seal allows adjustment by the cutting device, such as the laser. Unlike separately printed eye marks which must be precisely registered with the seal in order to perform the subsequent operation (e.g., cut or partial separation) in the proper location, the eye marks are put in at the same time as the seal. As a result, there is no need to attempt to precisely register printed eye marks with the seal. Otherwise, further registration error would be added to the process with the production of each container blank, and such error would be cumulative. In the present process, the amount of cumulative error is reset with the production of each container blank.

In addition, the method of forming the eye mark(s) described herein provides a universal datum and inspection method for locating the discrete seal on every article (such as flexible containers) that is produced thereby. As a result, the method of forming the eye mark(s) and detection of the same is sufficiently flexible and agile that it can be used when it is desired to change the sizes and/or shapes of the articles being manufactured, without changing parts of the system or the detection algorithm.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for performing a task in registration with a seal in at least one thermoplastic material having a discrete seal therein, said method comprising the steps of:
   a. providing at least one thermoplastic material;
   b. providing a sealing mechanism;
   c. forming:
      i. at least two discrete seals in said at least one thermoplastic material with said sealing mechanism; and
      ii. at least two eye marks in said at least one thermoplastic material, wherein said eye marks have edges that are sufficiently well-defined so that they can be located with a detection device, wherein said eye marks are registered with at least one of the discrete seals; wherein at least one eye mark is ring-shaped formed by concentric circles; wherein at least one of the discrete seals is formed simultaneously with said at least one of the at least two eye marks, d. locating said eye marks with said detection device;
e. providing a unit operation mechanism, wherein said unit operation mechanism is a cutting mechanism that produces a remaining portion of at least one of the discrete seals having a rounded edge with a radius of about 10 mm or less;
f. transmitting information relating to the location of the eye marks at least indirectly to said unit operation mechanism; and
g. performing an operation on said at least one thermoplastic material relative to said seals at a location on said at least one thermoplastic material that is determined based upon the location of the eye marks, with said unit operation mechanism, wherein said eye marks are spaced apart from each other such that transmission of information relating to the location of an eye mark allows the unit operation mechanism to perform an operation on the thermoplastic material at a location that is within 1 mm or less to at least one of the discrete seals.

2. The method of claim 1 wherein the step of providing at least one thermoplastic material comprises providing at least two thermoplastic materials comprising a first thermoplastic material and a second thermoplastic material; said method further comprising bringing said first and second thermoplastic materials into proximity with one another so that at least a portion of said first and second thermoplastic materials overlap at an overlapping region, and at least one of the at least two discrete seals, seals together said first and second thermoplastic materials in at least a portion of said overlapping region.

3. The method of claim 1, wherein the seals have edges, and the edges of the eye marks are more well-defined for detection by said detection system than the edges of said seals.

4. The method of claim 1, wherein said discrete seals and said eye marks are both formed by said sealing mechanism.

5. The method of claim 1, wherein said discrete seals are formed by said sealing mechanism, and said eye marks are formed by a separate eye mark-forming mechanism that is adjacent to said sealing mechanism and travels with said sealing mechanism to form said eye marks simultaneously with said discrete seals.

* * * * *